(12) United States Patent
O'Connor et al.

(10) Patent No.: US 7,225,060 B2
(45) Date of Patent: May 29, 2007

(54) VEHICLE CONTROL SYSTEM WITH USER-GUIDED CALIBRATION

(75) Inventors: Michael L. O'Connor, Redwood City, CA (US); Michael L. Eglington, San Francisco, CA (US); Lars G. Leckie, San Francisco, CA (US); Robert C Melhorn, Jr., Mountain View, CA (US); Qinghe Chang, San Jose, CA (US); Brian G. Walter, Mountain View, CA (US); Glen Sapilewski, Redwood City, CA (US)

(73) Assignee: Novariant, Inc., Menlo Park, CA (US)

( * ) Notice: Subject to any disclaimer, the term of this patent is extended or adjusted under 35 U.S.C. 154(b) by 325 days.

(21) Appl. No.: 10/903,847

(22) Filed: Jul. 30, 2004

(65) Prior Publication Data

US 2006/0025894 A1 Feb. 2, 2006

(51) Int. Cl.
*G06F 7/00* (2006.01)
*G01D 18/00* (2006.01)

(52) U.S. Cl. .............................. 701/1; 701/36; 324/202; 702/85

(58) Field of Classification Search .................... 701/1, 701/36, 29, 31; 324/202; 702/85
See application file for complete search history.

(56) References Cited

U.S. PATENT DOCUMENTS

| 5,194,851 | A | 3/1993 | Kraning et al. |
| 5,572,218 | A | 11/1996 | Cohen et al. |
| 6,052,647 | A | 4/2000 | Parkinson et al. |
| 6,570,534 | B2 | 5/2003 | Cohen et al. |
| 6,643,576 | B1 | 11/2003 | O'Connor et al. |
| 6,698,018 | B1 | 2/2004 | Zimniewicz et al. |
| 2003/0229430 | A1 | 12/2003 | Beek |
| 2004/0002794 | A1 | 1/2004 | Pillar et al. |

OTHER PUBLICATIONS

"AutoFarm GPS 5001 AutoSteering System, Operating Manual, John Deere 7000W & 8000W Series Tractors," AutoFarm, A Division of IntegriNautics, 36 pages, Oct. 30, 2001.
"AutoFarm GPS 5001 AutoSteering System, Operational Quick Tips," AutoFarm, A Division of IntegriNautics, 14 pages, Jan. 7, 2003.
"AutoFarm GPS 5001 AutoSteering System, Hydraulic & Mechanical System, Installation & Electronic System, Calibration Manual, John Deere 7000W & 8000W Series Tractors," AutoFarm, A Division of IntegriNautics, 62 pages, Oct. 30, 2001.
Videotape "John Deere 7810—Installation/Calibration, AutoFarm GPS 5001 AutoSteering System," AutoFarm, A Division of IntegriNautics, 2001.

*Primary Examiner*—Y. Beaulieu
(74) *Attorney, Agent, or Firm*—Brinks Hofer Gilson & Lione

(57) ABSTRACT

A vehicle control system with user-guided calibration is presented. In one embodiment, a vehicle control system is presented comprising an output device and circuitry operative to provide an output, via the output device, that guides a user through a plurality of calibration steps in a particular order. The circuitry can additionally or alternatively be operative to determine which of the calibration steps, if any, to present as a next calibration step based on whether a given calibration step is successful. Other embodiments are provided, and each of the embodiments can be used alone or in combination with one another.

74 Claims, 71 Drawing Sheets

Hard-Left Hard-Right Test Overview

Now that the mechanical installation is complete, the next step is to test that the vehicle will respond to automatic steering commands. To do this, you will send commands from the cab box to the control valve or directly to the vehicle to turn the wheels or the entire vehicle.

What you should expect to see when the "LEFT" or "RIGHT" arrows are pressed is the wheels or the whole vehicle turn to the left or right respectively. REMEMBER: Pressing the "STOP" button, or the red "Kill" switch located on the monitor, will stop the wheels or the entire vehicle from turning.

Once you have completed the test and confirmed that the wheels or vehicle turn to the left and right when the commands are sent, press the "PASS" button. If the wheels or vehicle does not turn to the left or right press the "FAIL" button to view troubleshooting tips. Press the continue button to begin the test.

Cancel    Continue

Screen CW4    No disk plugged in    v5.4.15    AutoFarm

*Figure 6*

Wheel Angle Sensor Diagnosis

| Problem | Probable Cause |
|---|---|
| 1. Sensor values are less than 3000. | Linkage arm on sensor shaft too long, or linkage arm attached to vehicle too short. |
| 2. Steering wheel can still turn with no change in sensor value. | Problem with linkage arm installation, reposition linkage. |
| 3. No value from sensor | Problem with three pin connector on steering cable. Bad sensor. |
| 4. Sensor value jumps when wheels turn, sensor limits are not consistent. | Wheel angle sensor is moving in bracket, needs to be tightened. |

Back

Screen CW8 | No disk plugged in | v5.4.15 | AutoFarm

Enter X - Lever Arm Measurement

The X - Lever Arm Measurement measures the distance from the master antenna to the control point of the vehicle. The control point of a standard wheeled tractor is the center of the axle that does not steer. The control point of a tracked tractor is located at the pivot point of the tracks. This measurement allows the system to control the vehicle when it is being steered down the selected path. To begin this step start by measuring the distance from the master antenna to the control point of the vehicle to the nearest inch or centimeter.

To enter a new X - Lever Arm measurement:

1. Press the "Change" button next to the current value.
2. Or, press the "Accept Current Value" to keep the current value and continue on to the next step.

X: -0.500 meters

Screen: CW24  No disk plugged in  v5.4.15  AutoFarm

*Figure 21*

ATTENTION!

You have chosen not to perform Attitude Survey! If an Attitude Survey has not been completed for this vechicle, the system will not perform as expected and the system may experience problems with heading.

Do you wish to skip Attitude Survey?

*AutoFarm* v5.4.15

No disk plugged in

Screen CW28

*Figure 23*

Vehicle Sats 7 , Base Sats 7 , Qual 100

Vehicle WHEELED
Implement DEFAULT
User Level SUPERVISOR
Accuracy 1.0 inches

◐ Position
◐ Base Station
◐ Heading
◐ Steering
○ Ready for AutoSteer

Transducer Calibration

On systems with two pressure transducers: attempt to turn the steering wheel to the left and HOLD IT THERE.
On systems with one pressure transducer: LET GO of the steering wheel.
Press the 'Start' button to begin calibrating.

Pressure: 0

Cancel　　　　　　　　　　　　　　　　　　Start

Screen 120a　　　　No disk plugged in　　　v5.4.15　　AutoFarm

*Figure 24*

Wheeled Maximum Wheel Angle Calibration

Vehicle: WHEELED
Implement: DEFAULT
User Level: SUPERVISOR
Accuracy: 1.0 inches

○ Base Station
○ Heading
○ Steering
○ Ready for AutoSteer

Please confirm the polarity of the wheel-angle sensor.
The raw-wheel-angle should increase as you turn the steering wheel to the right and decrease as you turn to the left.
If so, press 'Normal', otherwise press 'Reversed'.

Raw Wheel Angle: 15

[Reversed] [Normal]

Cancel

Screen 117 | No disk plugged in | v5.4.15 AUTOFARM

Figure 25

Xtk

Vehicle Sats 7 , Base Sats 7 , Qual 100
Vehicle         WHEELED
Implement       DEFAULT
User Level      SUPERVISOR
Accuracy        1.0 inches ◐ Position
◐ Base Station
◐ Heading
◐ Steering
○ Ready for AutoSteer

Wheeled Maximum Wheel Angle Calibration

To begin calibrating the minimum raw wheel angle,
turn the front wheels hard left and press 'Start'.

Raw Wheel Angle: 15

Start

Cancel

Screen 117        No disk plugged in        v5.4.15    *AutoFarm*

*Figure 28*

Vehicle Sats 7 , Base Sats 7 , Qual 100
Vehicle          WHEELED
Implement        DEFAULT
User Level       SUPERVISOR
Accuracy         1.0 inches ◐ Position
◐ Base Station
◐ Heading
◐ Steering
○ Ready for AutoSteer

Wheeled Maximum Wheel Angle Calibration

Calibration complete – press 'Accept' to confirm.
(If necessary, you can later change these parameters by hand using SOFIA.)

Minimum raw wheel angle (WHS_MIN_RAW_ANG):   15
Maximum raw wheel angle (WHS_MAX_RAW_ANG):   15

Accept

Cancel

Screen 117            No disk plugged in            v5.4.15   *AutoFarm*

Figure 32

Follow these Steps:

1. Press the 'Big Left' button to move the red line as far left as it will move.
2. Start driving the vehicle at 3 mph / 5 kph and align the orange line with the red line.
3. Press the 'GO' button and continue to hold the steering wheel such that the orange line stays aligned with the red line.
4. When the red line turns green, press the 'STOP' button, then press the 'Big Right' button to move the red line one place to the right; turn the steering wheel to align the orange line with the red line and press the 'GO' button again.
5. Repeat Step 4 until the red line will no longer moves to the right and you are making a hard right turn.
6. Stop the vehicle, place it into park and examine the data points. Delete any 'bad' data points.
7. Press the 'Recalculate Calibration Curves' button to draw the blue line through the data. Look at the data points and delete any data points that DO NOT meet the following requirements: the data point is on the blue line, the data point is touching the blue line, the data point is no more than the width of a data point away from the blue line.
8. Remember to press the 'Recalculate Calibration Curves' button if you have deleted any data points and press the 'Accept New Calibration' button to complete the calibration.

*Figure 37*

Actuator Calibration Overview

The purpose of the actuator calibration is to determine the following control characteristics of the hydraulic control valve. These values are then used by the control system software to steer the vehicle. Below is a list of each characteristic and a short definition.

1. Dead-band - The range of voltages sent to the control valve that result in no turning of the wheels.
2. Max rate left - The maximum speed at which the wheels can turn from hard right to hard left.
3. Max rate right - The maximum speed at which the wheels can turn from hard left to hard right.
4. Calibration Curve - The line created by drawign a best line of fit through the data points collected.

Screen CW38    No disk plugged in    v5.4.15    AutoFarm

Figure 39

Actuator Calibration
What to expect

As you perform the actuator calibration you should expect the vehicle to move through the field along a zig-zag path as the wheels move from one side to the other. As each data point is collected, the wheels will move quickly to one side; full left or full right, and depending on the strength of the command sent to turn the wheels will move to the opposite side gradually or rapidly. You will continue to collect data points to define the calibration curve shown on the graph that you will see at the end of this tutorial. This will appear as a number of x's in the shape of a hockey stick up and to the right and down and to the left with a flat dead-band in between. As you move from each data point, the wheels will move faster and faster from one side to the next. Once you collected enough data points, you will need to evaluate the data points and calculate the new calibration values. The last task is to determine the max-left and max-right rates of the valve. To complete the actuator calibration you will save these calibration values.

Screen CW39   No disk plugged in   v5.4.15   AutoFarm

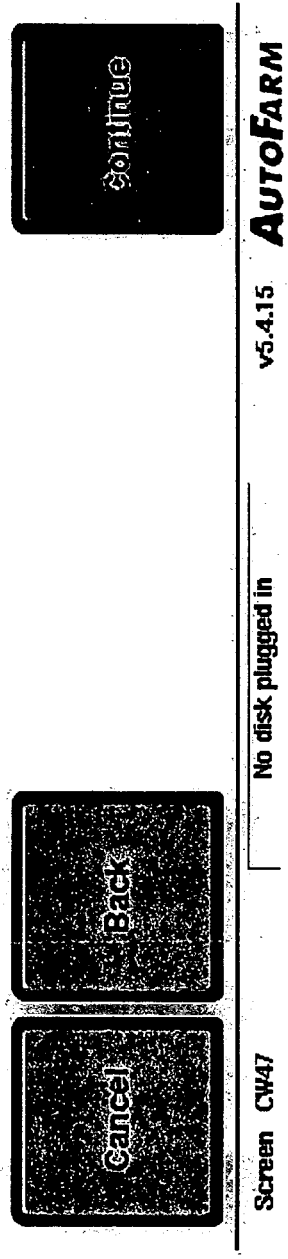

Figure 48

Follow these steps:

1. Put the vehicle into a low gear with the RPM's around 2000 and start moving. Make sure the vehicle is moving faster than 1.5 mph / 2.5 kph.
2. Begin collecting data points by choosing a side to begin with, and press the "Big Left" or "Big Right" button to move the red line. Next, press the "GO" button.
3. Each time the red line turns green, press the "Big Left" or "Big Right" button depending on the side you started with. Collect enough data points to define the "Hockey Stick" on the left and right side of the graph. If you are forced to stop, press the "STOP" button, turn the vehicle so you have room and press the "GO" button to resume the calibration.
4. Once you have collected all the data points, press the "STOP" button, then the "Max Left" button and then "GO". When the wheels move full left press the "Max Right" button to move the wheels full right to define the max-left and max-right rates of the control valve.
5. Next, Stop the vehicle, put it into park and reduce the RPM's of the engine.
6. Delete all data points that do not make up the handle of the "Hockey Stick" on the left and right sides of the graph. Press the "Recalculate Calibration Curves" button to draw the blue best line of fit through the data points.
7. Finally, press the "Accept New Calibration" button to save the calibration values and complete the calibration.

Line Acquisition Tuning General Help

- Before attempting Line-Acquisition Tuning
  - Vehicle must be properly calibrated
  - Steering, Heading, and Lateral-Error tuning must be complete
  - Vehicle must be driving well on the row (i.e. when in Turbo Mode)

- Field and Job Setup
  - Go to a field with room to drive the vehicle
  - Create a very wide new implement (e.g. 1000 feet wide)
  - Create a test field
  - Create a straight-row job with an A-B line somewhere in the middle of the field

- Procedure
  - In the Line Acquisition Screen adjust each parameter one at a time - starting at the top
  - Follow the help screen for each parameter

- Tips
  - Tune at or near the speed your customer will typically acquire the line at.
  - Try to test the vehicle in its typical configuration. E.g. if the customer will typically use a heavy implement on the three point hitch, then try to tune with that implement attached
  - Line-acquisition at higher speeds necessitates more gradual line acquisition
  - Heavy implements necessitate less aggressive line acquisition Screen 113   O R D   Disk Space: 100.0%   v5.4.19   *AutoFarm*

Vehicle Sats 7 , Base Sats 8 , Qual 100
Vehicle         DEFAULT
Implement       DEFAULT
User Level      SUPERVISOR
Accuracy        1.0 inches ○ Position
○ Base Station
○ Heading
○ Steering
○ Ready for AutoSteer

Deere Track Steering Wheel Calibration

Averaging pot values -- hold wheel hard left and wait.

Pot values: 0  65535  65535

45%

Cancel

Screen 103    No disk plugged in    v5.4.15    AUTOFARM

VEHICLE CONTROL SYSTEM WITH USER-GUIDED CALIBRATION

BACKGROUND

For the first time in history, microprocessor, control system, and satellite navigation technologies are being combined to put heavy machine control systems into the hands of agricultural users. In the year 2000, the first hands-free, sub-inch steering control systems were sold in North America. An example of such a system is the AutoFarm™ GPS 5001 AutoSteer™ System by IntergriNautics Corp., which is the assignee of the present invention. Today, thousands of farm vehicles are equipped with vehicle control systems to enable hands-free steering in operational fields.

Designing a system to control the motion of vehicles with non-linear sensors and actuators, varying vehicle dimensions, varying dynamic responses, and differing actuators (e.g., steering mechanisms) can be very difficult. Due to the complex nature of farm vehicles and the challenges of steering a huge vehicle to sub-inch precision, accurate system calibration is important to ensure the highest level of vehicle performance. The order in which calibration steps are performed is important to properly calibrate a vehicle control system, and it is not generally obvious which calibration steps must be performed before others. Although some vehicle control systems have a graphical user interface to make the calibration process more user-friendly, the person performing the calibration must still know which calibration steps to perform before others. Accordingly, the calibration of vehicle control systems typically requires a trained expert, such as an engineer or highly-trained technician, who knows the proper order of the calibration steps.

It is desired to simplify the installation and calibration procedures of vehicle control systems used on farm and other vehicles so calibration can be performed by a service mechanic or untrained user instead of an engineer or highly-trained technician.

SUMMARY

The present invention is defined by the following claims, and nothing in this section should be taken as a limitation on those claims.

By way of introduction, the preferred embodiments described below provide a vehicle control system with user-guided calibration. In one embodiment, a vehicle control system is provided, wherein calibration of the vehicle control system comprises a plurality of calibration steps and wherein at least one of the plurality of calibration steps must be performed before at least one other of the plurality of calibration steps in order for the vehicle control system to control state trajectory of a vehicle within a degree of performance. The vehicle control system comprises an output device and circuitry operative to provide an output, via the output device, that guides a user through the plurality of calibration steps in a particular order to ensure that the at least one of the plurality of calibration steps is performed before the at least one other of the plurality of calibration steps. The circuitry can additionally or alternatively be operative to determine which of the calibration steps, if any, to present as a next calibration step based on whether a given calibration step is successful. Other embodiments are provided, and each of the embodiments can be used alone or in combination with one another.

The embodiments will now be described with reference to the attached drawings.

BRIEF DESCRIPTION OF THE DRAWINGS

FIGS. 5-12 are illustrations of screen displays from a calibration wizard of an embodiment guiding a user through a system test.

FIGS. 13-16 are illustrations of screen displays from a calibration wizard of an embodiment guiding a user through a GPS master antenna location entry calibration step.

FIGS. 18-21 are illustrations of screen displays from a calibration wizard of an embodiment guiding a user through a GPS multi-antenna self-calibration step.

FIGS. 22-23 are illustrations of screen displays from a calibration wizard of an embodiment guiding a user through a pressure transducer calibration step.

FIGS. 24-28 are illustrations of screen displays from a calibration wizard of an embodiment guiding a user through a wheel angle sensor limit detection calibration step.

Figure 32:
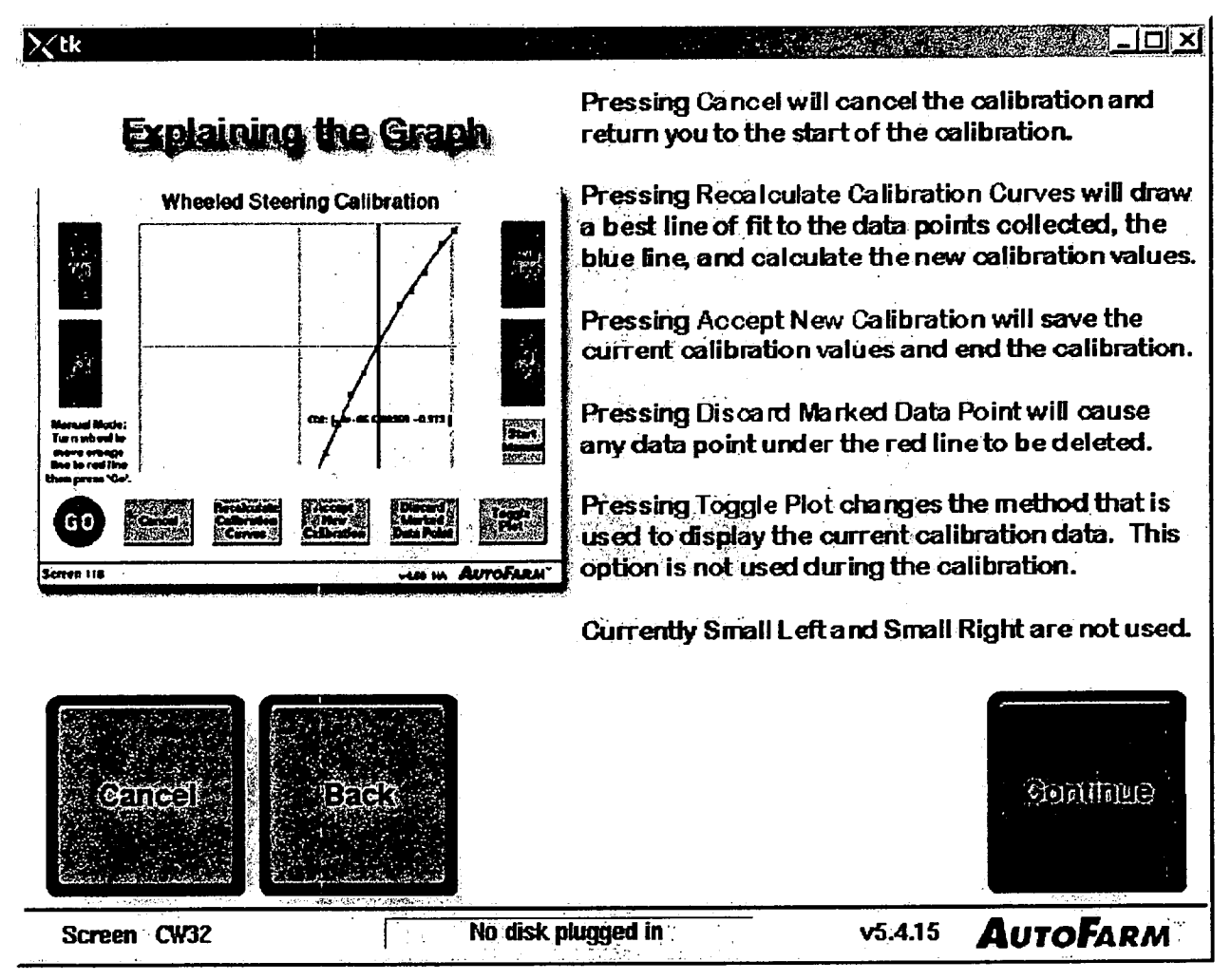

FIGS. 29-38 are illustrations of screen displays from a calibration wizard of an embodiment guiding a user through a wheel angle sensor calibration step.

FIGS. 39-49 are illustrations of screen displays from a calibration wizard of an embodiment guiding a user through a steering actuator calibration step.

FIGS. 53-60 are illustrations of screen displays from a calibration wizard of an embodiment guiding a user through a control system gain tuning (line acquisition) calibration step.

FIGS. 61-67 are illustrations of screen displays from a calibration wizard of an embodiment guiding a user through a wheel sensor calibration step for an electronically-steered tracked tractor.

DETAILED DESCRIPTION OF THE PRESENTLY PREFERRED EMBODIMENTS

General Overview

Figure 1:
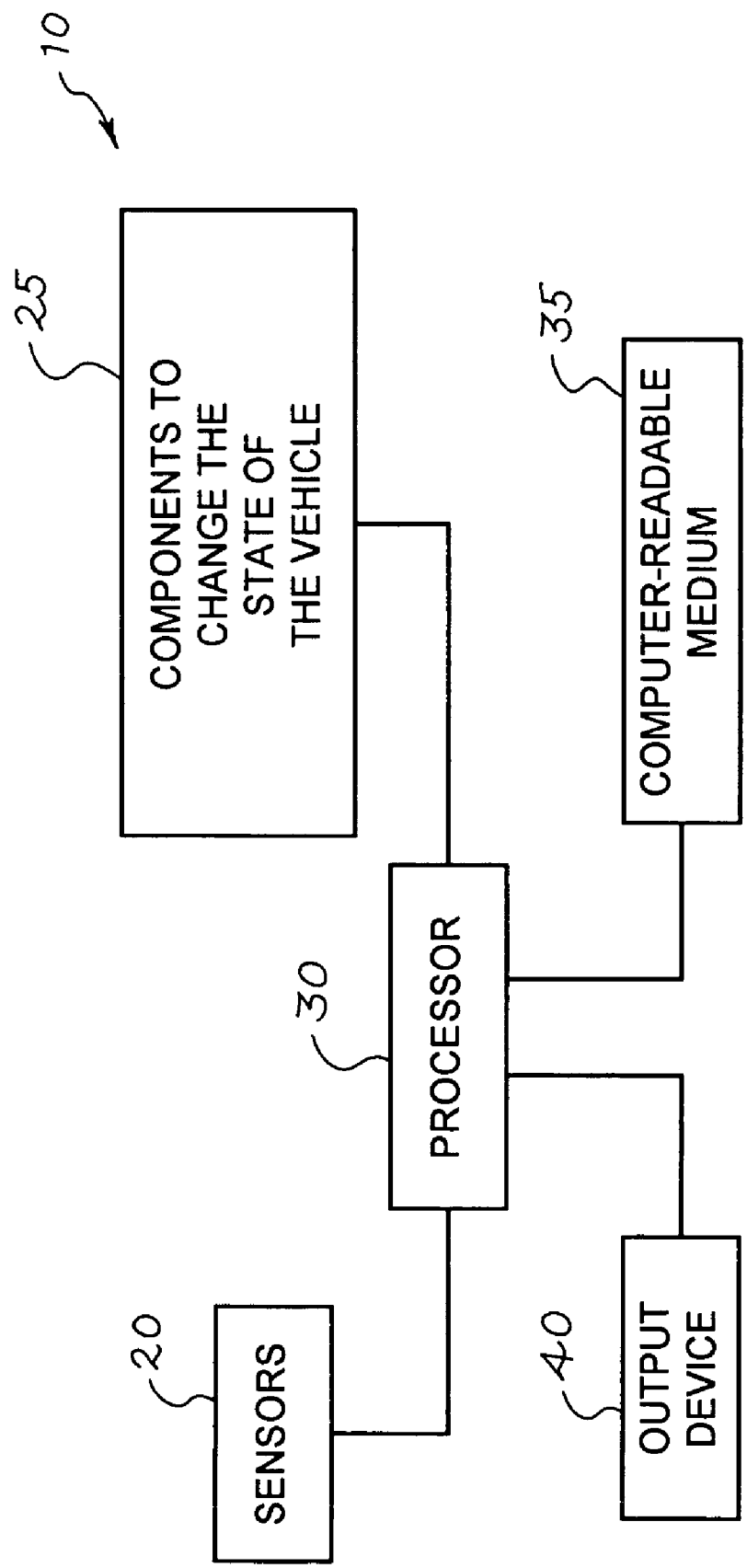
FIG. 1 is a block diagram of a vehicle control system of an embodiment.

Turning now to the drawings, FIG. 1 is a block diagram of a vehicle control system 10 of a preferred embodiment. The vehicle control system 10 comprises sensors 20 to determine the state of a vehicle, components 25 to change the state of the vehicle, circuitry (here, a processor 30 executing instructions stored in a computer-readable medium 35) that processes signals from the sensors 20 and controls the components 25 to change the state of the vehicle, and an output device 40. As used herein, the term "state" refers to a set of variables that describe the vehicle's condition at a given point in time. Examples of the vehicle's condition include, but are not limited to, position (e.g., x, y, and z coordinates of the vehicle), orientation (e.g., the direction the vehicle is facing), velocity (e.g., speed of the vehicle), and vehicle-type-specific variables (e.g., wheel angle for a ground vehicle, position of control surfaces for an air vehicle, and position of a rudder for a water vehicle). Accordingly, the state of a vehicle can be changed by, for example, moving a wheel of a ground vehicle or a rudder of a water vehicle. The state of a vehicle can also be changed by applying longitudinal (speed and position) control.

In one embodiment, each of the components of the vehicle control system 10 is contained in or on a vehicle being controlled by the vehicle control system 10. The entities in FIG. 1 are coupled with each other (i.e., directly or indirectly through one or more named or unnamed components) in any suitable manner. Although shown as distinct entities in FIG. 1, one or more of the entities can be combined into one device. Further, although the plural "sensors" and "components" are used in FIG. 1, a single sensor and/or a single component can be used (e.g., a device that turns the rudder of a boat). Additionally, as described below, "circuitry" can take various forms.

Calibration of the vehicle control system 10 comprises a plurality of calibration steps, which determine, through a process on the vehicle, vehicle-dependent variables that describe the vehicle. For example, calibration of a wheel angle sensor determines how voltage generated by the sensor relates to the actual wheel angle of the vehicle. A single calibration step can comprise one or more actions. For example, the step of calibrating a wheel angle sensor can comprise turning the wheel hard to the left and turning the wheel hard to the right.

Additional examples of calibration steps include, but are not limited to, (a) user entry of physical vehicle parameters (such as, but not limited to, height, weight, wheel base length, and/or articulation joint location); (b) user entry of a relative position of a GPS antenna on a vehicle comprising the vehicle control system relative to another point on the vehicle, such as the pivot point; (c) a self-survey of relative positions of two or more GPS antenna on the vehicle; (d) a calibration of on-board inertial measurement units; (e) a confirmation that manual steering is operational after installation of automatic steering components; (f) a confirmation that automatic steering is operational after installation of automatic steering components; (g) a calibration of a sensor to detect when the user is trying to turn a steering wheel; (h) a calibration of a wheel angle sensor (e.g., based on an interactive plot display or on vehicle motion and automatically-generated steering commands); (i) a calibration of a wheel angle actuator (e.g., based on an interactive plot display or on vehicle motion and automatically-generated steering commands); (j) tuning of gains based on wheel angle sensing and actuation; (k) tuning of gains based on GPS-based heading sensing and actuation; (l) tuning of gains based on gyro-based heading sensing and actuation; and (m) tuning of gains based on vehicle position sensing and actuation. At least one of the calibration steps can be performed automatically without user intervention. For example, gain tuning can be performed automatically based on vehicle motion and automatically-generated steering commands. Further, when the calibration step includes gain tuning, control system performance can be provided to the user as feedback to tune at least some of a plurality of calibration parameters.

The order in which calibration steps are performed is important to properly calibrate the vehicle control system 10. For example, in one embodiment, wheel angle sensor calibration needs to be performed before steering actuator calibration. If the calibration steps are performed out of order, the vehicle control system 10 cannot control state trajectory of the vehicle within a degree of performance. "State trajectory" refers to a sequence of states of the vehicle, and "performance" is a measure of the actual state of the vehicle versus the desired state of the vehicle. For example, if the degree of performance is one inch, proper calibration of the vehicle control system 10 ensures that the vehicle control system 10 controls the vehicle's position as it moves along a path to within one inch of a desired position. If the vehicle control system 10 is not properly calibrated, the vehicle control system 10 will not be able to control the state trajectory of the vehicle within the degree of performance, and, at worst, the vehicle's behavior might be unstable (i.e., random state trajectory). It should be noted that state trajectory does not necessarily imply movement; one of the sequences of states in a state trajectory can be to make no change in the state of the vehicle.

In this embodiment, the computer readable medium 35 has stored therein computer-executable instructions to provide an output, via the output device 40, that guides a user through the plurality of calibration steps in the correct order to ensure proper calibration. The term "guide" is intended to broadly refer to any act that assists a user in performing the calibration steps in a particular order. In one embodiment, the output guides a user by presenting a visual wizard that automatically presents the appropriate screens to allow the user to step through the calibration steps in the proper order. A user can be guided in a "semi-automatic" manner as well. For example, instead of presenting screens in a step-by-step manner, the output can instruct the user which menu to select or which buttons to push to get to the next appropriate calibration step, where the user has the option of selecting a different menu or button if not properly guided. As described below, a guide can contain video and/or audio.

The computer-executable instructions can be executed by the vehicle control system's processor 30 (as shown in FIG. 1) or by a separate processor (not shown in FIG. 1). Any type of processor can be used (e.g., a general processor, a digital signal processor, etc.). Further, instead of being implemented in software run by a processor, the functionality in the computer-executable instructions can be implemented purely in hardware form. Accordingly, for simplicity, the term "circuitry" is used to refer to a processor running computer-executable instructions, an application specific integrated circuit, a field programmable gate array, an analog circuit, or any other hardware device (running or not running software) that is now-known or later-developed, and any combination thereof.

The output device 40 can take any suitable form. For example, the output device 40 can be a display device with or without an audio output device (e.g., a monitor) or an audio output device with or without a display device (e.g., a speaker). Although not required, the system can also include an input device, which can be separate from the output device 40 (e.g., a keyboard separate from a monitor) or integrated with the output device 40 (e.g., a touch screen monitor, a speaker with buttons or voice recognition capability). In a preferred embodiment, the output device 40 comprises a 10.4" sunlight-readable, color touch-screen VGA display that displays a graphical user interface (GUI) with virtual buttons. The GUI presents a "Calibration Wizard," which is a step-by-step interactive screen display that guides a user through calibration steps in the correct order, with appropriate help menus and error checking throughout the process. In an alternate embodiment, a second display device is used in addition to the first display device, wherein the first display device is dedicated to displaying the graphical user interface, and the second display device is used to display other information regarding the vehicle control system 10. The first or second display device can take the form of a laptop computer.

The computer readable medium 35 can take any suitable form, including, but not limited to, a hard drive, an optical disc (e.g., CD or DVD), a floppy disk, and a solid-state memory. Although the singular "medium" is used in FIG. 1, computer readable medium 35 can comprise one or more than one component. Additionally, the computer readable medium 35 and/or processor 30 executing its instructions can be located external to the vehicle. For example, a processor external to the vehicle can execute the instructions and send the resulting output to the output device 40 on the vehicle using a wireless transmission.

As discussed above, when executed, the computer-executable instructions stored in the computer-readable medium 35 guide a user through the plurality of calibration steps to ensure that the calibration steps are performed in the proper order. There are several advantages associated with this calibration technique. First, because the correct order of calibration steps is enforced by software, an untrained, partially untrained, or unskilled user can calibrate the vehicle control system 10. This allows precision machine control systems to be used in environments where trained experts are not readily available to install the systems and maintain high performance operation. This avoids requiring a trained expert to perform the calibration and further avoids the person performing the calibration to rely on a manual or memory to perform the calibration steps in the correct order. Another advantage of this user-guided calibration technique is that vehicle control systems can be expanded into new markets. The ease of calibration may attract new dealers for vehicle control systems, and a vehicle control system manufacturer may be able to ship vehicle control systems directly to customers.

There are various alternatives that can be used with this embodiment. For example, instead of or in addition to the instructions for enforcing the proper order of calibration steps, the computer-readable medium 35 can contain computer-executable instructions that guide a user through the calibration steps by determining which calibration steps, if any, to present as a next calibration step based on whether a given calibration step is successful. For example, if a given calibration step is unsuccessful, the software can return to a previous calibration step (e.g., the step that immediately precedes the given step or a step that is X steps before the given step), repeat the given calibration step, or skip a subsequent calibration step (e.g., the step that immediately follows the given step or a step that is X steps ahead of the given step). If the given calibration step is successful, the software can present that subsequent calibration step, or a subsequent step can be skipped when a given calibration step is successful. Additionally, the software can suspend calibration of the vehicle control system 10 and/or present a help menu in response to an unsuccessful calibration step.

The computer-readable medium 35 can store additional computer-executable instructions. For example, software can be provided to output instructions via the output device 40 to assist a user in the physical installation of the vehicle control system 10. As another example, software can be provided for selecting a subset of calibration steps from a set of calibration steps based on an identified type of vehicle. In this way, instead of sending a software package to a user that is customized for his particular vehicle, a manufacturer can send a generic software package to the user and let the software customize the presentation based on the user's vehicle.

Calibration Wizard Example for Automatic Steering of Farm Tractors

The following is an example of a calibration wizard used to calibrate a vehicle control system for the automatic steering of farm tractors. A description of the hardware configuration is first presented, followed by a discussion of the various screen shots generated by the wizard. In this preferred embodiment, the vehicle control system is calibrated using only sensors that are on a vehicle and that are used for vehicle control, and vehicle steering is calibrated using vehicle motion and vehicle motion sensors.

While the following example is illustrated in terms of a farm vehicle (e.g., a tractor), it should be noted that these preferred embodiments can be used with any type of vehicle and for any type of application. Examples of suitable vehicles include, but are not limited to, a ground vehicle, an air vehicle (e.g., a plane, a blimp), a water vehicle (e.g., a ship, a submarine), a farm vehicle (e.g., a wheeled, tracked, or articulated tractor), a construction vehicle (wheeled, tracked, or articulated), a rubber tire gantry crane, an automobile, a tractor, a haul truck, a dozer, a drill, a shovel, and a road grader. Examples of suitable applications include, but are not limited to, automatic steering of farm tractors, automatic aircraft landing, and autonomous operations of mining and construction equipment. Also, it should be noted that items that are mentioned as being required or important in this particular embodiment may not be required or important in other embodiments. Accordingly, none of the limitations described in these embodiments should be read into the claims unless explicitly recited therein.

Hardware Configuration Examples

Figure 2:
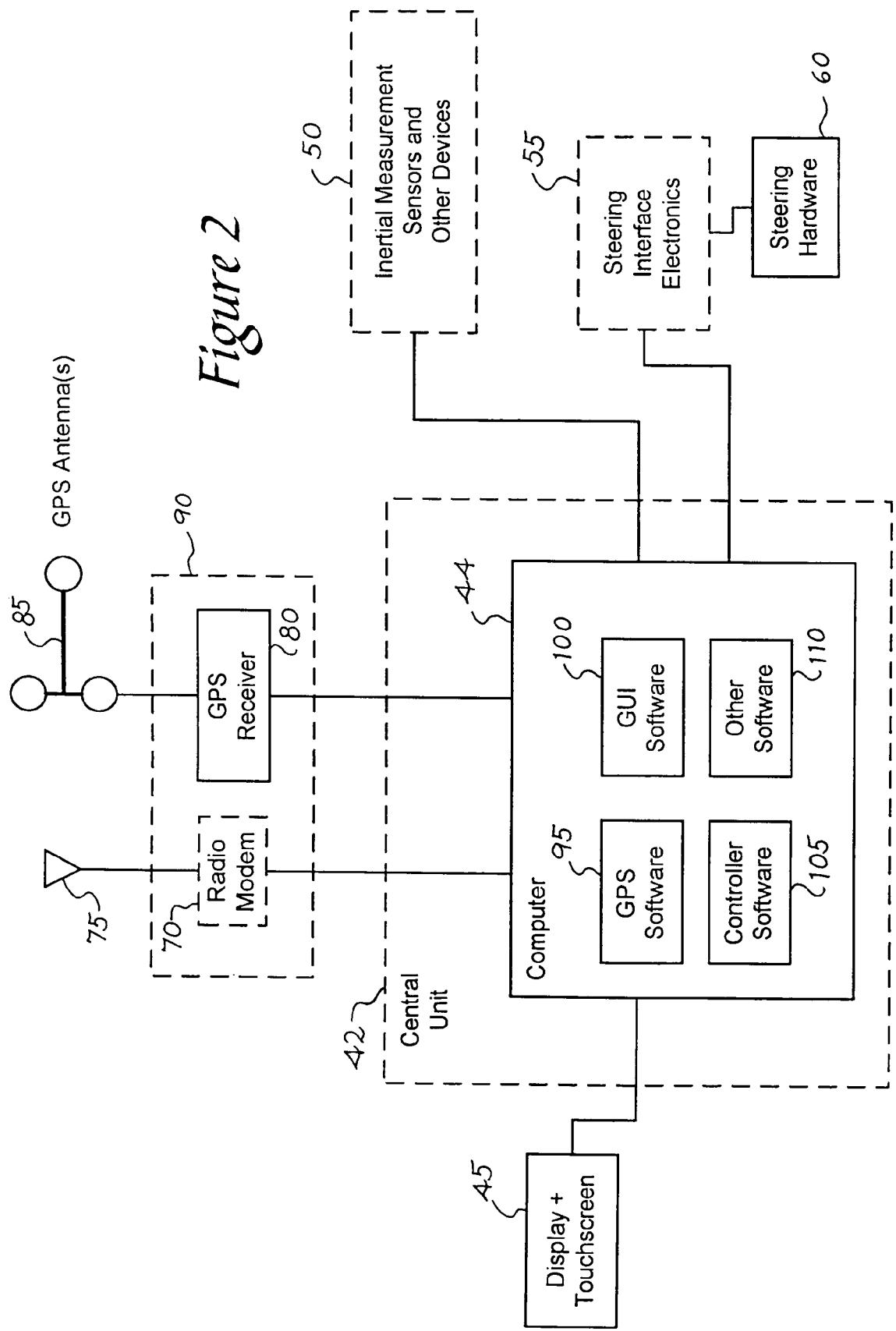
FIG. 2 is a block diagram of a vehicle control system of an embodiment in which a GPS receiver is located on a roof of a vehicle.
Figure 3:
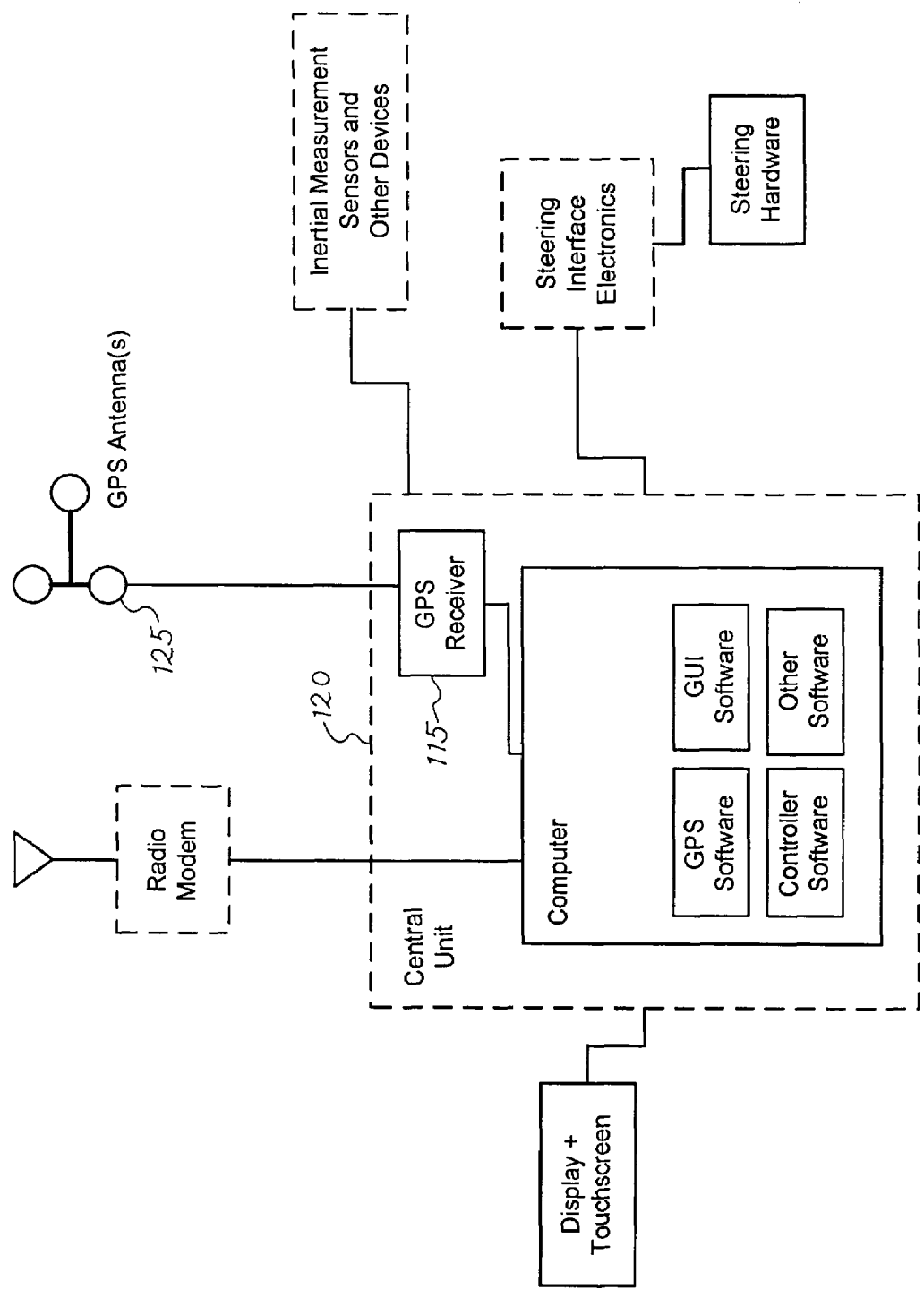
FIG. 3 is a block diagram of a vehicle control system of an embodiment in which a GPS receiver is located inside a vehicle.
Figure 4:
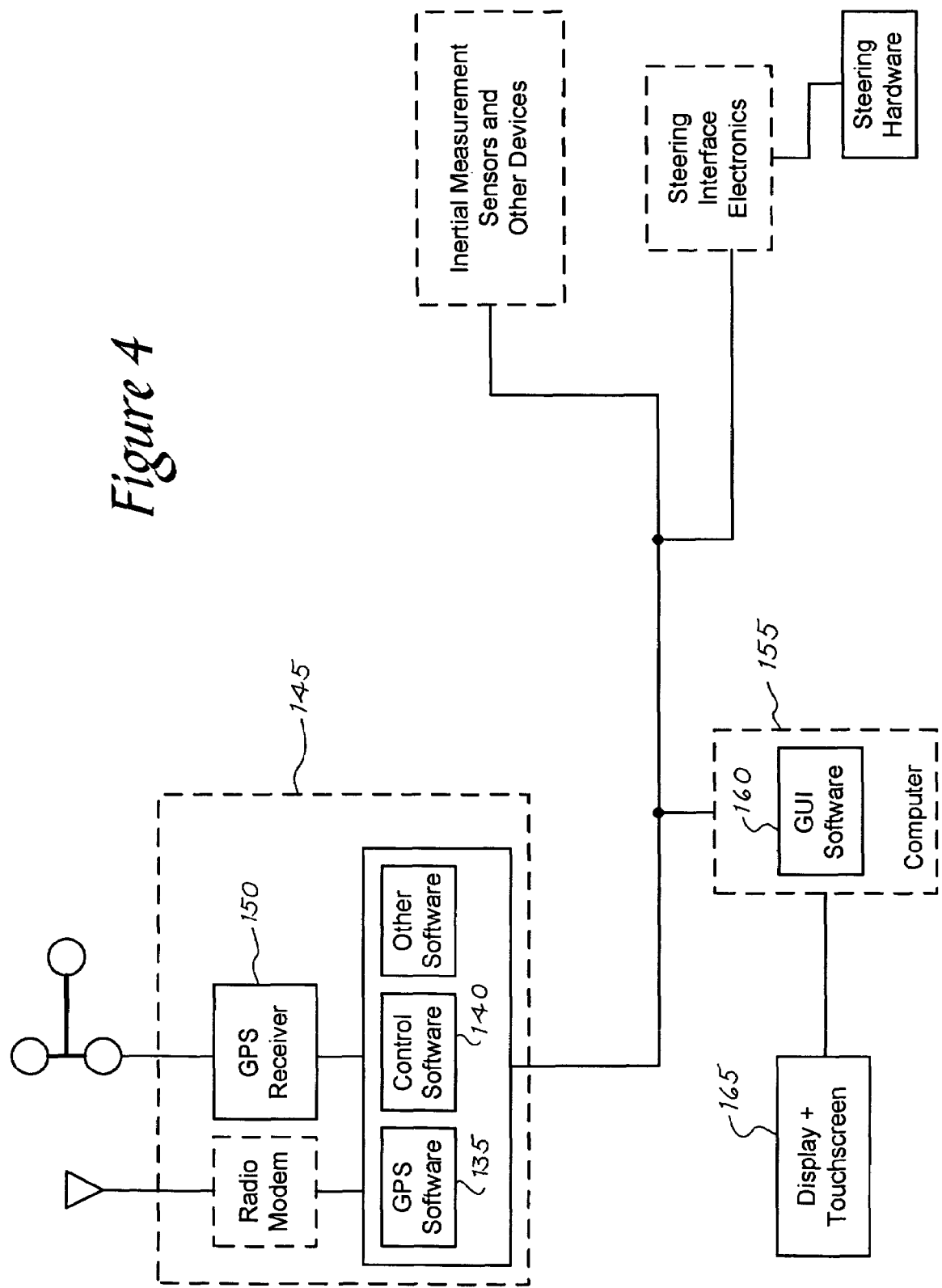
FIG. 4 is a block diagram of a vehicle control system of an embodiment in which GPS and control system software and a GPS receiver are located on a roof of a vehicle.

FIGS. 2-4 are block diagrams illustrating various hardware configurations that can be used in the following automatic farm tractor steering example. The system illustrated in FIG. 2 comprises a central unit 42 containing a computer 44 located within a vehicle. The computer 44 is coupled with a display and touch screen 45, inertial measurement sensors and other devices 50, and steering interface electronics 55, which are coupled with steering hardware 60. The steering interface electronics 55 drive the steering sensors and actuators (including, for example, a proportional hydraulic valve, a pressure transducer, and a potentiometer wheel angle sensor) and can communicate with computers on the vehicle. The computer 44 is also coupled with a radio modem 70 with a radio modem antenna 75 and one or more GPS receivers 80 with one or more GPS antennas 85, which are located on the roof 90 of the vehicle. (In the alternate embodiment shown in FIG. 3, the GPS receiver(s) 115 is located in the central unit 120, with the GPS antenna(s) 125 mounted on the roof of the vehicle and connected to the GPS receiver 115 inside the vehicle.) The components in this system are connected using any of a number of forms well known in industry, including, but not limited to, RS-232, RS-422, RS-485, CAN, Ethernet, USB, and Wireless. Other components can be connected into this system, such as, but not limited to, variable rate spray controller, seeding monitors, yield monitors, and any number of other devices that are currently available in the industry. If desired, these components (e.g., tractor, sprayer, harvester, or gantry crane components) can also be automated.

In a preferred embodiment, three GPS antennas are used with one GPS receiver in order to measure position, roll, pitch, and yaw. In another preferred embodiment, two GPS antennas are used with one GPS receiver to measure position, roll, and yaw only. In yet another preferred embodiment, one GPS antenna is used with one GPS receiver to measure position only. In any case, a tilt sensor or accelerometer can be added to measure roll and pitch, and a one-, two-, or three-axis gyroscope can be added to measure roll rate, pitch rate, and/or yaw rate. Further, the radio modem 70 and radio modem antenna 75, which can be any other data receiver, can be used to receive differential correction information and receive and transmit any other information. In a preferred embodiment, the radio modem 70 and radio modem antenna 75 are used to receive RTK corrections from a nearby base station receiver and to transmit the state of the vehicle and other vehicle information to off-vehicle devices. In another embodiment, a satellite receiver is used to receive differential corrections via satellite.

The computer 44 contains GPS software 95 that interacts with the GPS receiver 80, GUI software 100 that presents the calibration wizard described below on the display device 45, controller software 105 that sends commands to the various devices of the system, and other software 100 that performs functions such as diagnostics, I/O management, disk access, and other applications not related to calibration. In operation, the computer 44 receives information about the state of the vehicle from the radio modem 70, GPS receiver 80, inertial measurement sensors 50, and the steering interface electronics 55 (in this embodiment, the steering interface electronics 55 includes a sensor that measures the angle of a wheel and an actuator that can be used to change the angle of a wheel). After calibration, the computer 44 can change the state of the vehicle using the controller software 105 to control the steering interface electronics 55 to actuate various steering hardware 60.

Turning now to the alternate configuration shown in FIG. 4, this configuration is similar to the ones shown in FIGS. 2 and 3 with some notable exceptions. First, the GPS software 135 and control system software 140 are located on the roof 145 of the vehicle, along with the GPS receiver 150. The computer 155 in the vehicle is now strictly responsible for presenting the user interface using the GUI software 160. The display device 165 in this embodiment preferably meets the ISO-11783 Part 6 specification for a universal virtual terminal. Preferably, the devices in this embodiment are connected through a bus connection that enables devices and components to be easily added to or removed from the overall system. This is nominally a CAN bus and, more specifically, a CAN bus conforming to the ISO-11783 specification.

Overview of the Ground Vehicle Steering System Calibration Wizard

Under some circumstances, such as initial system installation, user reset of system calibration, or adding a new vehicle to the system memory, the calibration wizard software is initialized. Once the software is initialized, the calibration wizard interactively guides a user through the vehicle steering calibration process the next time that the user elects to begin the calibration process or when the user attempts to engage the automatic steering functions of the vehicle.

Automatic steering of a ground vehicle requires several calibration steps, which depend on the sensors that are installed on the vehicle. The example below illustrates the calibration steps used for the hardware configuration described above. Steps can be added or removed from this process in a straightforward manner to incorporate new sensors (such as inertial measurement sensors) or to remove certain sensors (such as a GPS heading sensor).

The calibration steps to be performed are also highly dependent on the vehicle type. For example, a farm tractor or bulldozer with tracks may not include a wheel angle sensor, and an articulated farm tractor may require the user to enter measurements of the articulation point as well as the wheel base length. The calibration steps to be performed are also highly dependent on the environment in which the vehicle is calibrated. For example, in most circumstances, it may be straightforward to drive a grain harvester in circles on a fallow field, but due to operational and environmental constraints, it may be impossible to move a rubber tire gantry crane (RTG) more than 100 feet in a straight line.

If the calibration is halted for any reason, such as a user cancellation, a sensor failure, or a power failure, the computer is preferably able to recall which steps of the calibration have been performed successfully and which have not. By periodically storing the state of the calibration in memory, the user is able to automatically resume the calibration at a later time without having to repeat the steps that have already been performed.

In the following examples, the calibration wizard is initialized when the user adds a new vehicle to the system database and then selects that vehicle. The calibration wizard may also be initialized manually via a user interface or automatically in response to a replaced component, an added component, or a component that is recognized by the computer as being out of calibration.

Part of the function of the calibration wizard is to select the correct calibration steps to perform, and the correct order in which to perform the steps, based on the type of vehicle being calibrated and based on which calibrations have already been successfully or unsuccessfully performed on the vehicle.

Wheeled Tractor

In this example, a calibration wizard is used to calibrate the steering of a wheeled tractor. The calibration is composed of the following steps, which are described below:

Step 1: System Test
Step 2: GPS Master Antenna Location Entry
Step 3: Wheel Base Measurement Entry
Step 4: GPS Multi-Antenna Self-Calibration
Step 5: Pressure Transducer Calibration
Step 6: Wheel Angle Sensor Limit Detection
Step 7: Wheel Angle Sensor Calibration
Step 8: Steering Actuator Calibration
Step 9: Control System Gain Tuning—On-Path
Step 10: Control System Gain Tuning—Line Acquisition Step 1—System Test In this example, and in the other examples below, it is highly desirable to perform a System Test before beginning the calibration process. The System Test is performed to ensure that the basic vehicle functions required for calibration are working correctly. This is a convenience issue since the calibration preferably must be halted mid-process if a necessary sensor or actuator is not working properly. This is also a safety issue since the manual steering functions are tested at this stage, and it is possible that the installation of the system components may have affected the user's ability to manually steer the vehicle.

Figure 5:
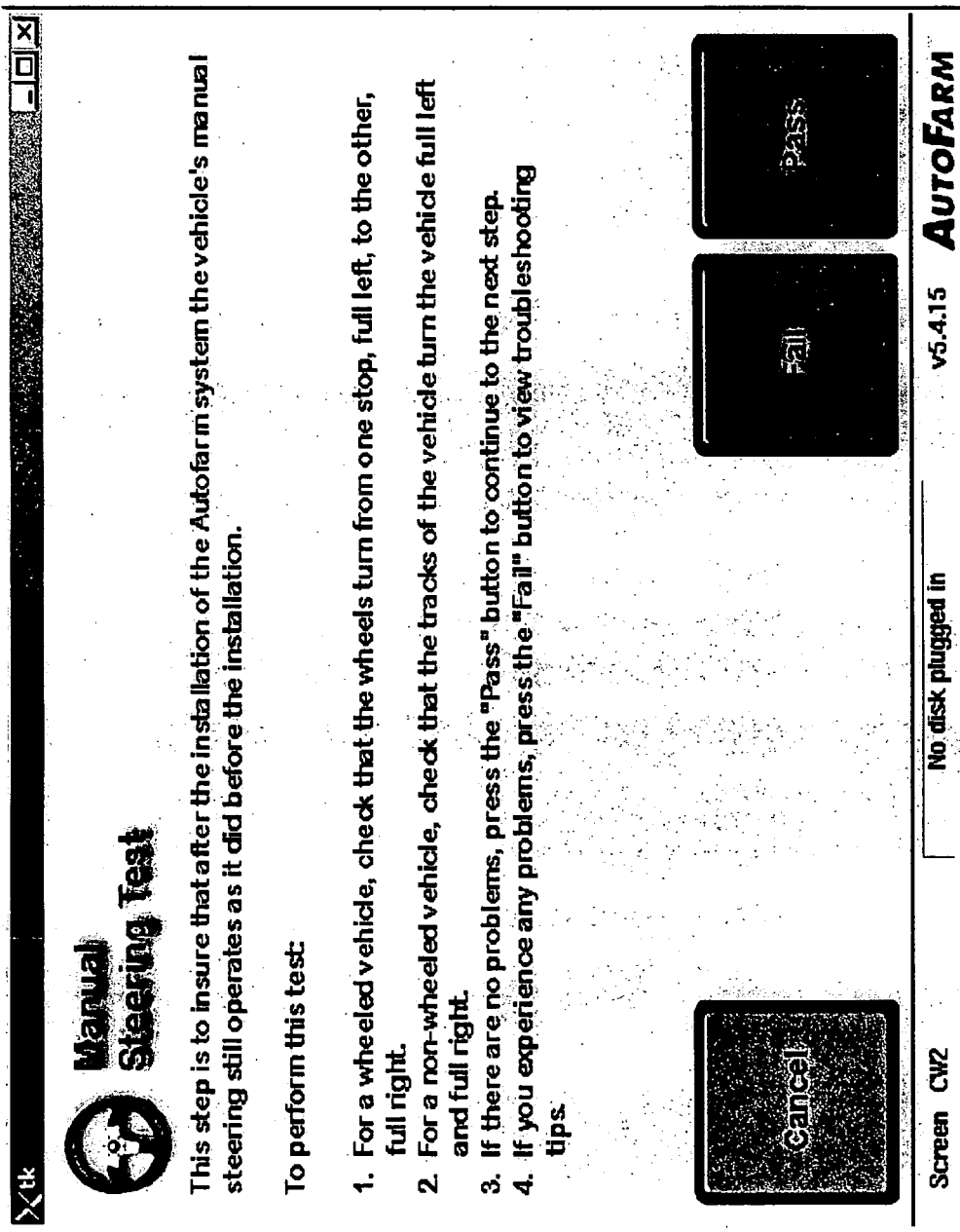

First, the system guides the user through a process that confirms that the manual vehicle steering system still functions properly after the automatic steering components have been installed on the vehicle (FIG. 5). The user is simply asked to turn the wheels manually and confirm that they are working. Since this step is designed to catch any safety hazards before the user begins driving the vehicle and to catch an error in mechanical hardware installation, it is generally preferred that this be the first step in the calibration wizard. If the user indicates a problem with the manual steering of the system, a troubleshooting screen appears offering potential solutions to the problem.

Figure 7:
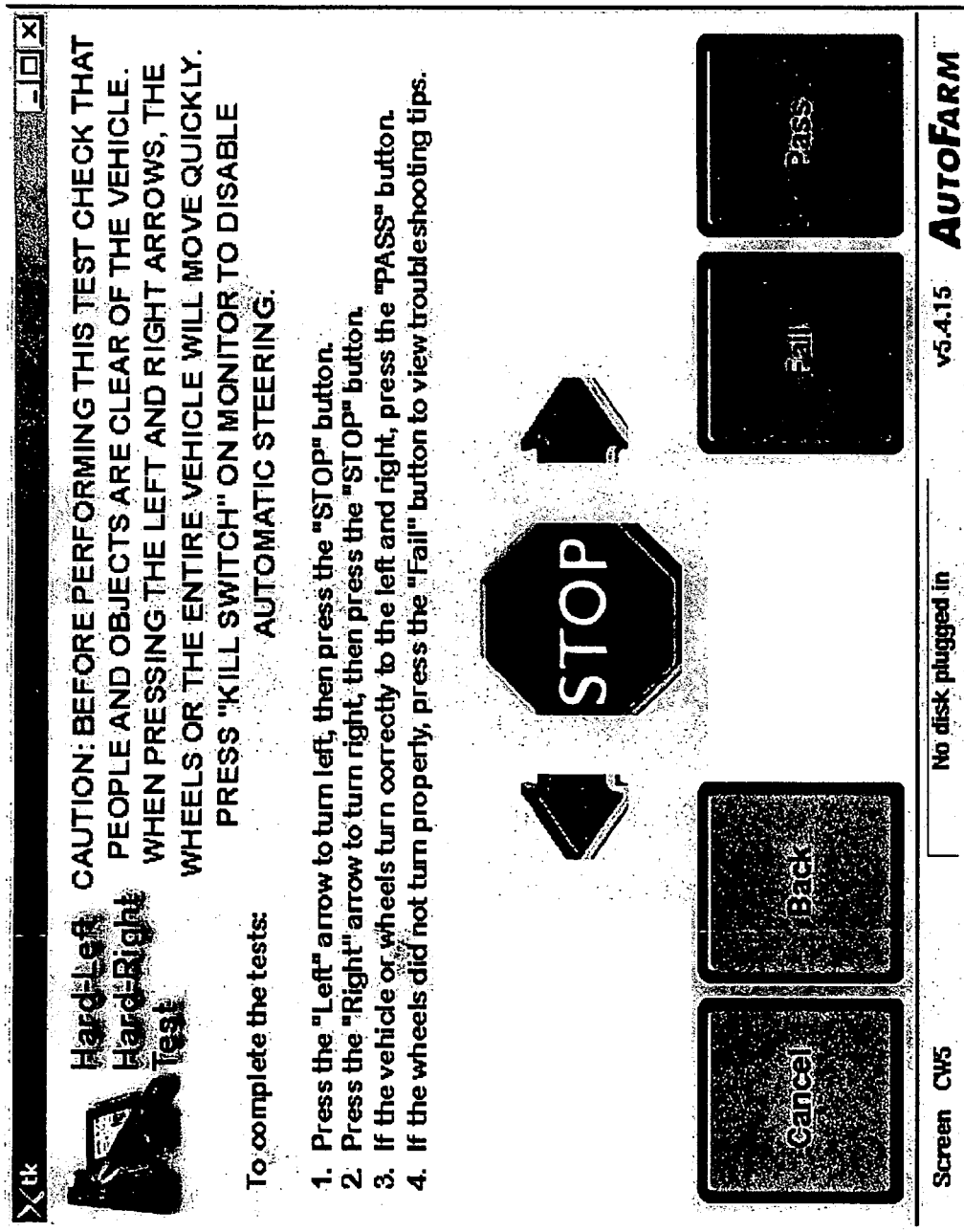
Figure 8:
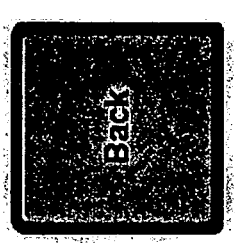

Next, the system guides the user through a process that confirms that the automatic vehicle steering function is operational. General instructions are provided to the user (FIG. 6) and then the user is provided with buttons which can steer the wheels hard left and hard right (FIG. 7). If the buttons do not turn the wheels, the user presses the "Fail" button, and a troubleshooting menu appears (FIG. 8). If the buttons do turn the wheels, then the user presses the "Pass" button, and the calibration continues.

Figure 9:
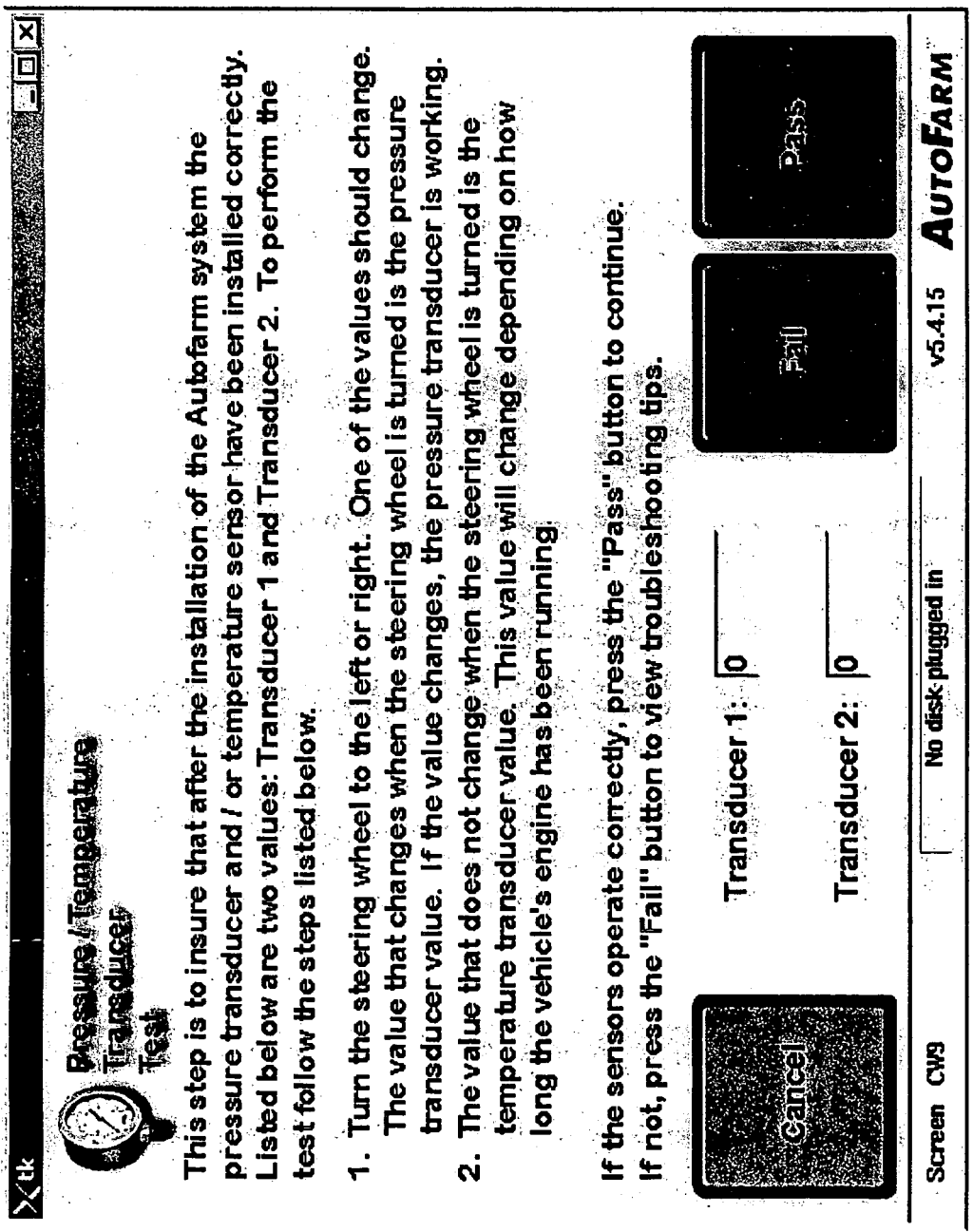
Figure 10:
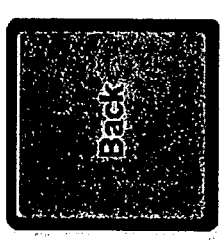

Next, the system guides the user through a process that confirms that the pressure transducers are working properly. General instructions appear on a screen that also displays the values from the transducers in real-time (FIG. 9). The user applies pressure to the steering wheel to ensure that the transducer values change when pressure is applied. If the transducer values do not change when pressure is applied, the user presses the "Fail" button, and a troubleshooting screen appears (FIG. 10). If the transducer values do change, the user presses the "Pass" button, and the calibration continues.

Figure 11:
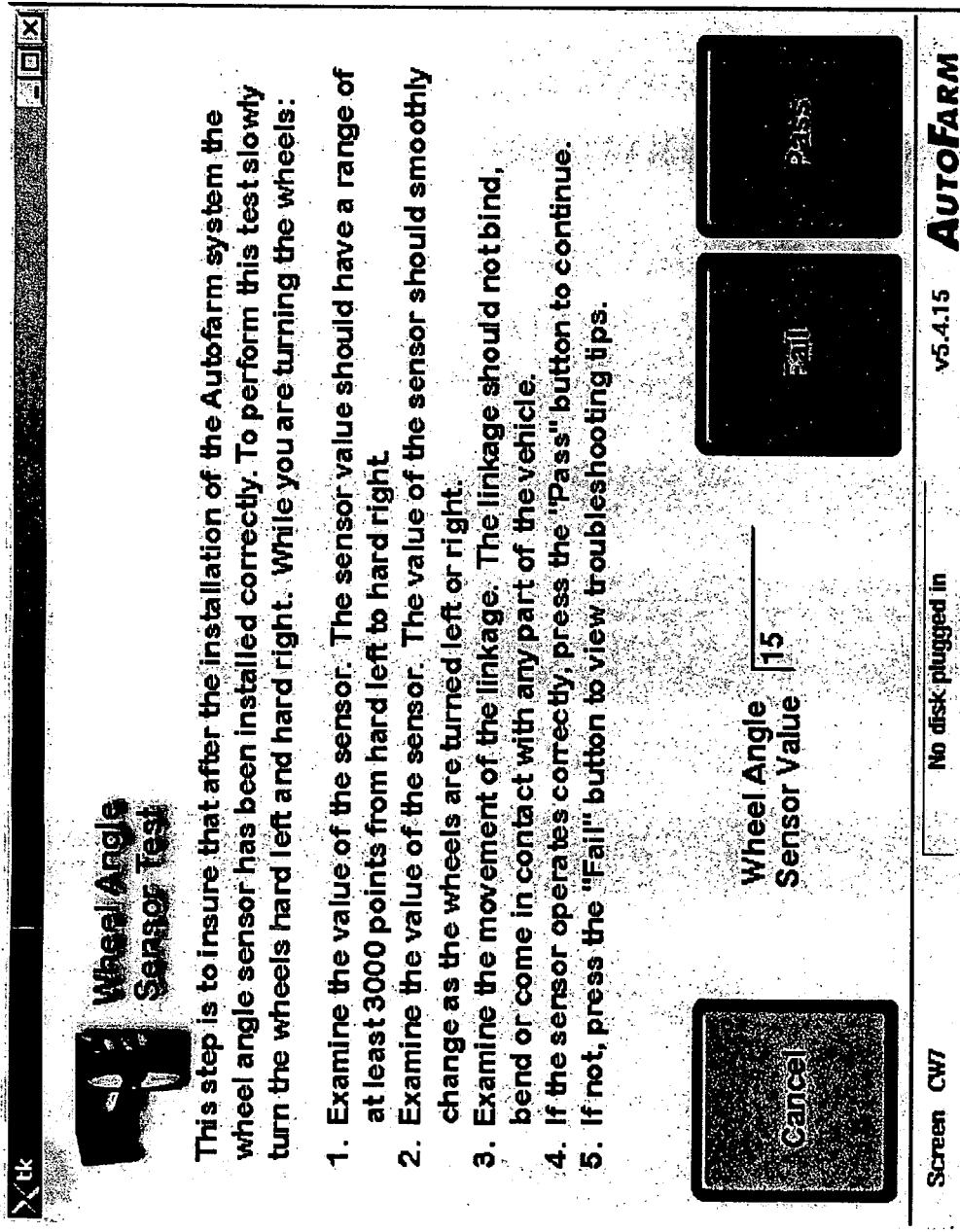

Next, the system guides the user through a process that confirms that the wheel angle sensor is working. General instructions appear on a screen that also displays the value from the wheel angle sensor in real-time (FIG. 11). The user turns the steering wheel to ensure that the wheel angle sensor value changes when the wheels move. If the sensor value does not change when the wheels move, the user presses the "Fail" button, and a troubleshooting screen appears (FIG. 12). If the sensor value does change, the user presses the "Pass" button, and the calibration continues.

Step 2—GPS Master Antenna Location Entry

The next step of the calibration for a ground vehicle is the GPS Master Antenna Location Entry. At this step of the process, the user generally enters the locations and/or orientations of important vehicle components relative to important control point(s) of the vehicle. In this example, the user is asked to enter the location of the master GPS antenna, which is responsible for vehicle positioning, in relation to the pivot point of the vehicle. While they are not explicitly shown in this example, other components that may need to be positioned or oriented relative to vehicle coordinates include, but are not limited to, gyroscopes, accelerometers, inclinometers, radar sensors, sonic sensors, optical sensors, pseudolite transmitters, propellers, landing gear, headlamps, engines, and other key system components.

Figure 13:
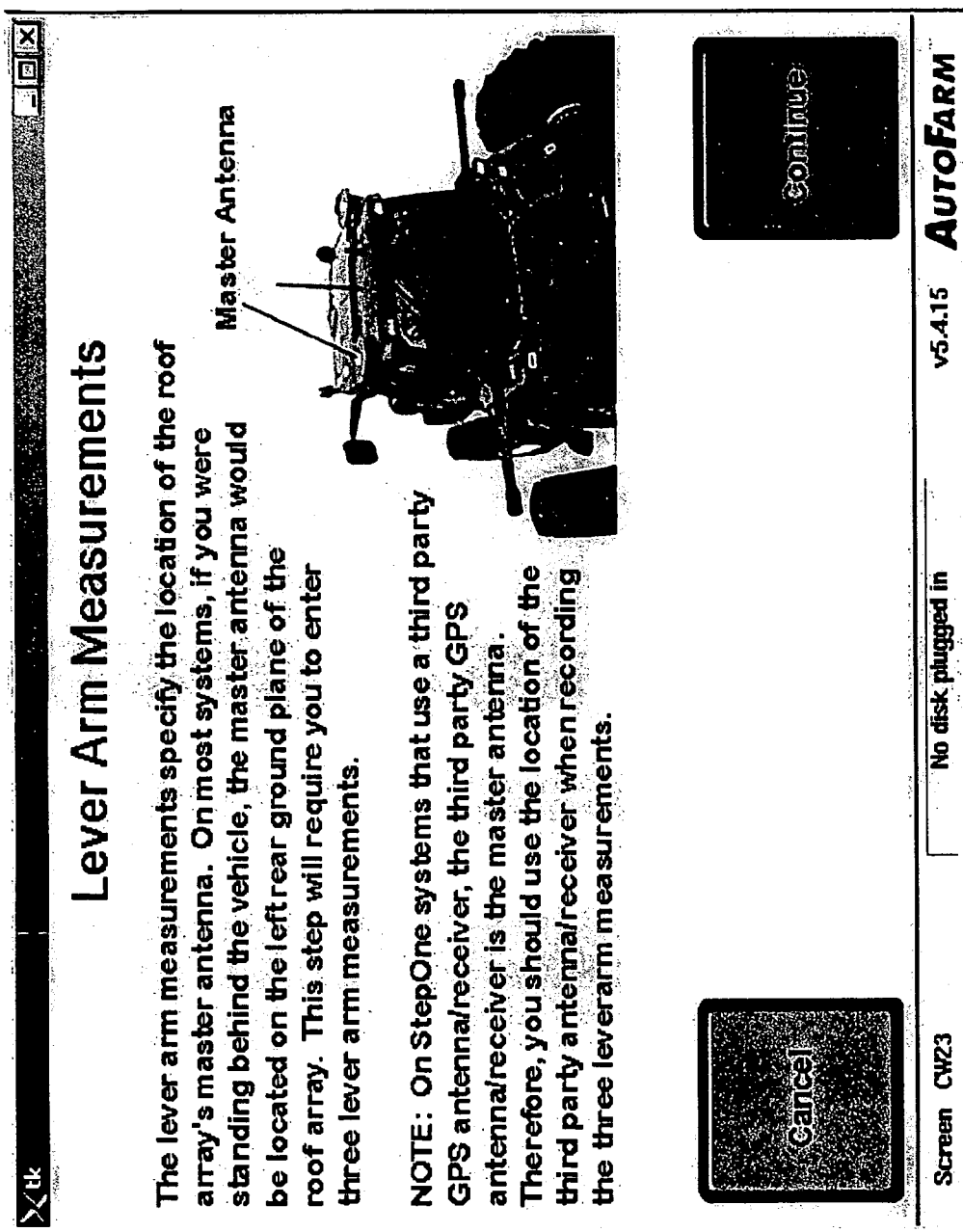

For the GPS Master Antenna Location Entry, the user is first given a basic set of instructions that are specific to the type of vehicle that has been selected (FIG. 13) and then is asked to enter the x lever-arm of the vehicle (FIG. 14). The x lever-arm is defined as the longitudinal location of the GPS antenna relative to the pivot point of the vehicle, with a positive number indicating a direction toward the front of the vehicle. In the case of a standard wheeled tractor, for example, the pivot point is usually defined as a point on the ground beneath the center of the rear axle.

After the x lever-arm is measured and entered by the user, the computer checks that the input is valid. Invalid inputs would include a number that is unreasonably small or large for the type of vehicle that has been selected. As an example, for a wheeled farm tractor model that is known to have a cab that extends from 0.5 meters to 2.0 meters in front of the rear axle, only values between 0.5 and 2.0 may be considered valid. If the number is not within the defined limits, the preferred calibration wizard implementation displays a warning to the user, which allows the user to accept the invalid entry or to return to the screen that will allow the user to reenter the value. Another embodiment can force the user to reenter the value after displaying a message describing that the number was outside of predefined limits.

Figure 15:
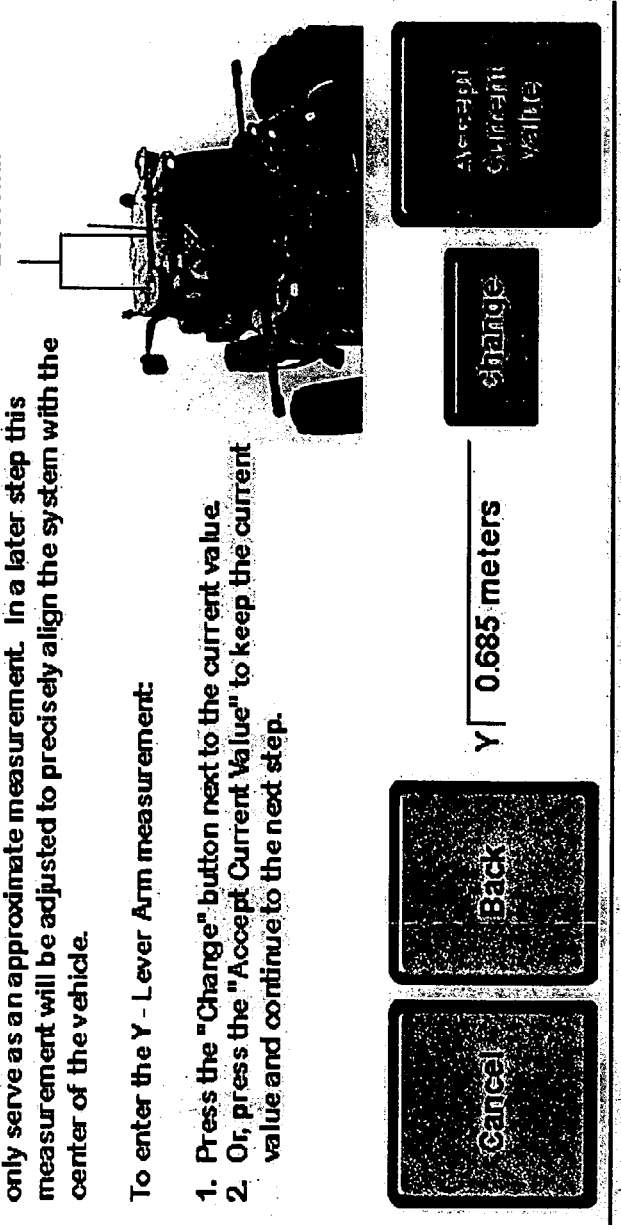

In the next part of the GPS Master Antenna Location Entry, the user is given a basic set of instructions that are specific to the type of vehicle that has been selected and then is asked to enter the y lever-arm of the vehicle (FIG. 15). The y lever-arm is defined as the lateral location of the GPS antenna relative to the center line of the vehicle, with a positive number indicating a direction toward the left side of the vehicle.

After the y lever-arm is measured and entered by the user, the computer checks that the input is valid. Invalid inputs would include a number that is unreasonably small or large for the type of vehicle that has been selected. As an example, for a wheeled farm tractor model that is known to have a cab that is centered on the vehicle and is 2 meters wide, only values between −1.0 and 1.0 may be considered valid. If the number is not within the defined limits, the preferred calibration wizard implementation displays a warning to the user, which allows the user to accept the invalid entry or to return to the screen that will allow the user to reenter the value. Another embodiment can force the user to reenter the value after displaying a message describing that the number was outside of predefined limits.

Figure 16:
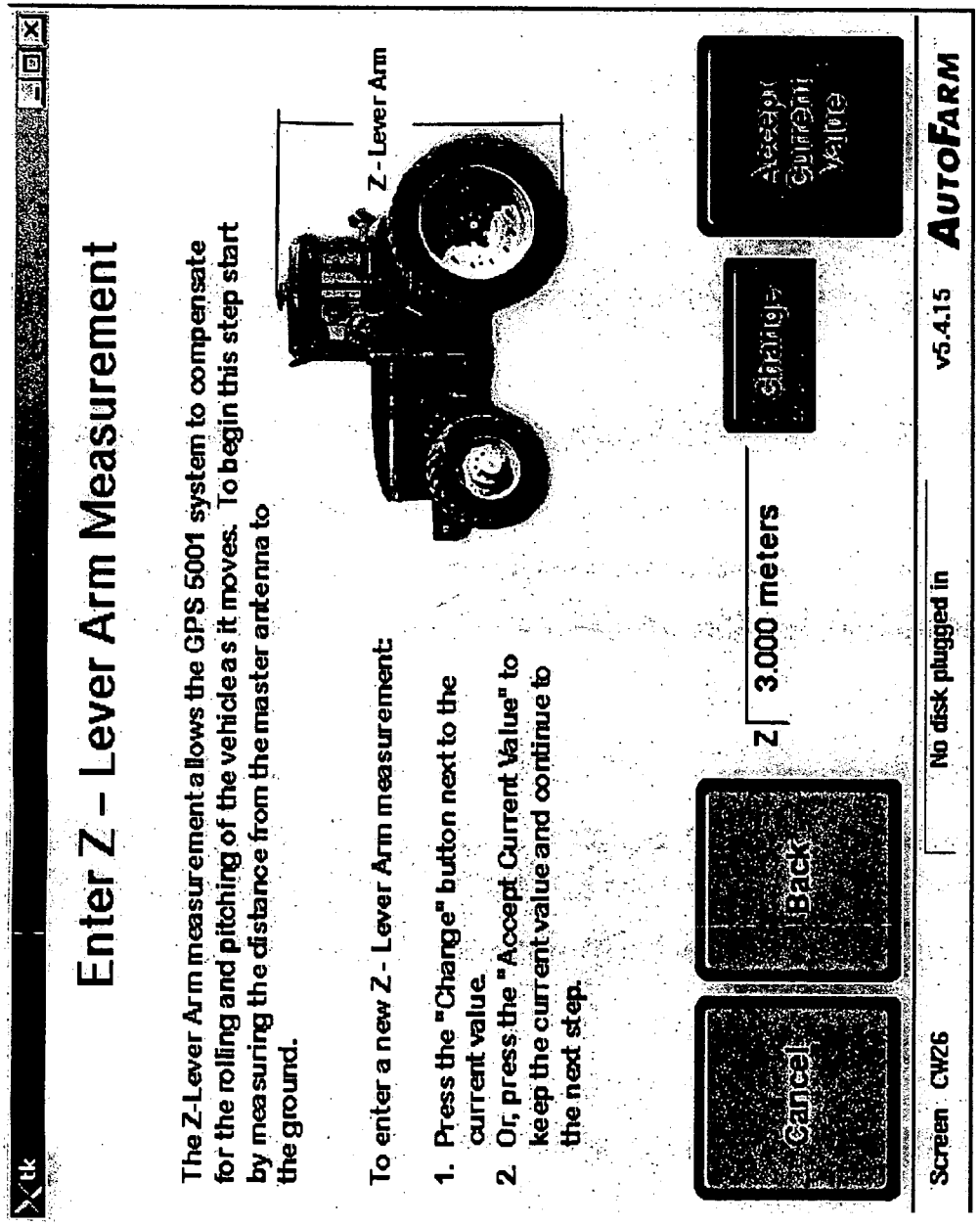

In the next part of the GPS Master Antenna Location Entry, the user is given a basic set of instructions that are specific to the type of vehicle that has been selected and then is asked to enter the z lever-arm of the vehicle (FIG. 16). The z lever-arm is defined as the lateral location of the GPS antenna relative to the ground when the vehicle is on flat and level ground, with a positive number indicating up.

After the z lever-arm is measured and entered by the user, the computer checks that the input is valid. Invalid inputs would include a number that is unreasonably small or large for the type of vehicle that has been selected. As an example, for a wheeled farm tractor model that is known to be approximately 3.5 meters tall, only values between 3.0 and 4.0 may be considered valid. If the number is not within the defined limits, the preferred calibration wizard implementation displays a warning to the user, which allows the user to accept the invalid entry or to return to the screen that will allow the user to reenter the value. Another embodiment can force the user to reenter the value after displaying a message describing that the number was outside of predefined limits.

Once the x, y, and z lever arms have been successfully entered, the GPS Master Antenna Location Entry step is marked as having been successfully completed, and the user interface automatically takes the user to the next step of the calibration. It is worth noting that, in this example, this step does not necessarily have to take place before the next step for a successful calibration. However, as a practical matter, both this step and the next step require the user to make physical measurements and observations of the vehicle, so it simplifies the calibration process to have these two steps take place in immediate succession.

Step 3—Wheel Base Measurement Entry

The next step of the calibration for a wheeled ground vehicle is the Wheel Base Measurement Entry. In the case of a standard wheeled vehicle, the wheel base is required by the control system. For an articulated wheeled vehicle, the wheel base and articulation joint measurements are needed. For other vehicle types, other important physical vehicle parameters may be required by the control system, which include, but are not limited to, vehicle weight, height, width, length, rudder size, wing span, number of engines, and other relevant physical quantities.

Figure 17:
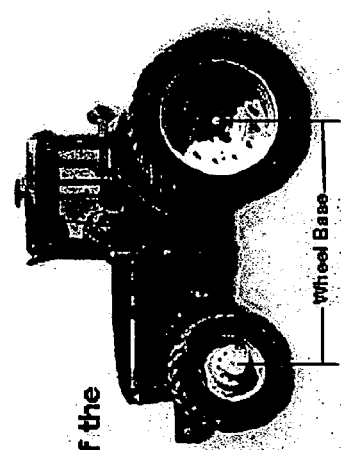
FIG. 17 is an illustration of a screen display from a calibration wizard of an embodiment guiding a user through a wheel base measurement entry calibration step.

For the Wheel Base Measurement Entry, the user is given a basic set of instructions and then is asked to enter the wheel base of the vehicle (FIG. 17). For a vehicle with two axles, the wheel base is defined as the linear distance between the front and rear axle of the vehicle when the steering is in the straight-ahead position.

After the wheel base is measured and entered by the user, the computer checks that the input is valid. Invalid inputs would include a negative number or a number that is unreasonably small or large for the type of vehicle that has been selected. For example, a farm tractor model that is known to have a wheel base length of approximately 4 meters may only consider numbers with 5% of the nominal value (between 3.8 meters and 4.2 meters) to be valid. If the number is not within the defined limits, the preferred calibration wizard implementation displays a warning to the user, which allows the user to accept the invalid entry or to return to the screen that will allow the user to reenter the value. Another embodiment can force the user to reenter the value after displaying a message describing that the number was outside of predefined limits.

After entering the wheel base length, the wizard looks at the selected vehicle type. If the vehicle is a standard, front-axle steered vehicle, this calibration step is marked as having been successfully completed, and the user interface automatically begins the next step of the calibration. If the vehicle is an articulated vehicle, the user is asked to provide a measurement of the location of the articulation point. This can be, for example, a measurement from the front axle to the articulation joint or a measurement from the rear axle to the articulation point.

After the articulation point distance is measured and entered by the user, the computer checks that the input is valid. Invalid inputs would include a negative number or a number that is unreasonably small or large for the type of vehicle that has been selected. For example, a farm tractor model that is known to have an articulation joint that is about 2 meters behind the front axle may only consider numbers with 5% of the nominal value (between 1.9 meters and 2.1 meters) to be valid. If the number is not within the defined limits, the preferred calibration wizard implementation displays a warning to the user, which allows the user to accept the invalid entry or to return to the screen that will allow the user to reenter the value. Another embodiment can force the user to reenter the value after displaying a message describing that the number was outside of predefined limits.

Once the articulation measurement has been successfully entered, this step of the calibration is marked as having been successfully completed, and the user interface automatically takes the user to the next step of the calibration Step 4—GPS Multi-Antenna Self-Calibration The next step of the calibration for a ground vehicle is the GPS Multi-Antenna Self-Calibration. At this step, the user generally initiates the self-calibration procedure for any relevant sensors on the vehicle. In this example, the vehicle is kept still while the GPS receiver uses satellite measurements to precisely determine the relative locations of two or more GPS antennas on the vehicle. Other sensors that could require self-calibration might include, but are not limited to, gyroscopes, accelerometers, inclinometers, radar sensors, sonic sensors, optical sensors, absolute pressure sensors, relative pressure sensors, and temperature sensors. Note that some sensors may not require calibration, may not have a self-calibration process, or may already be calibrated before they are received by the user or before they are installed on the machine.

Figure 18:
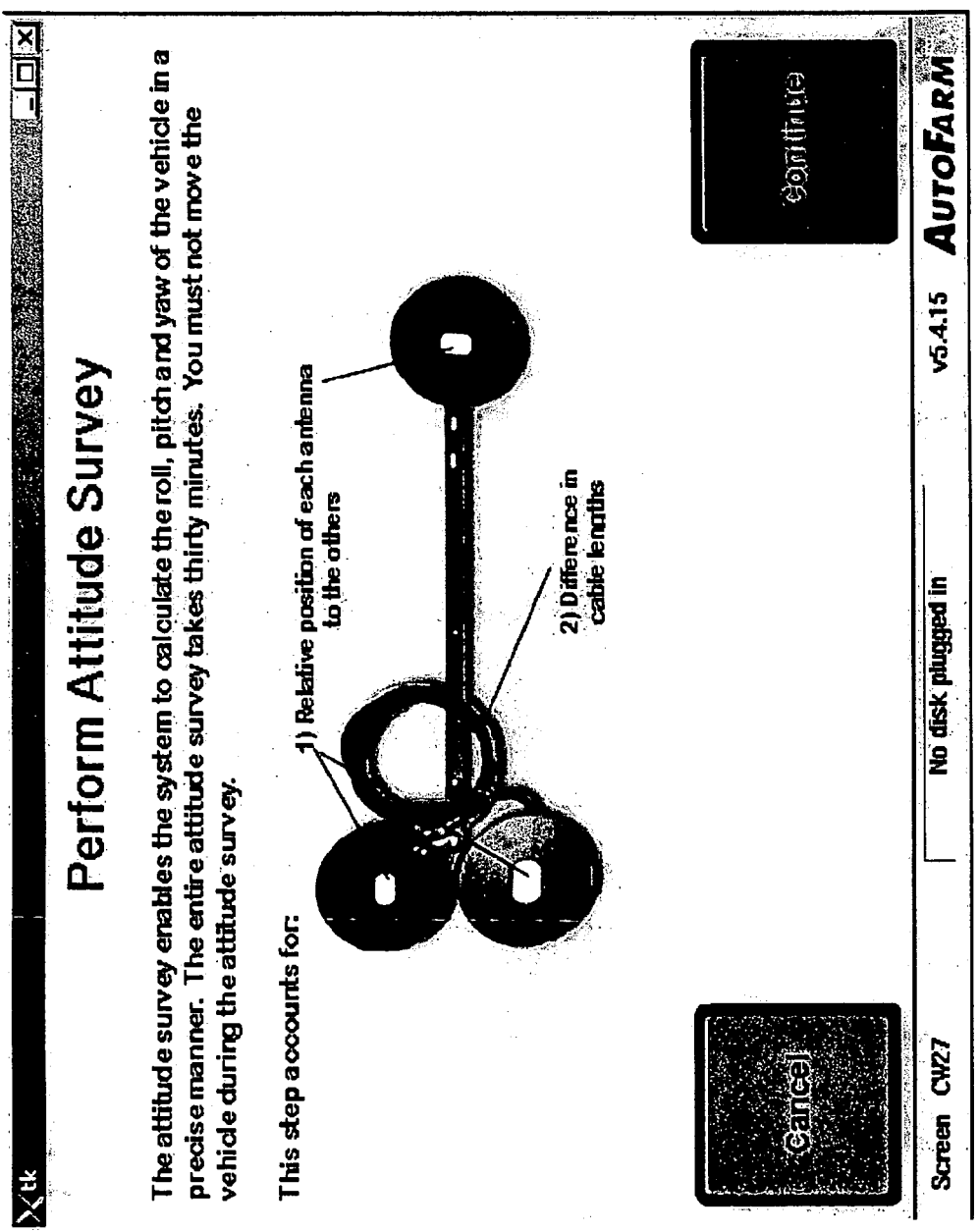
Figure 19:
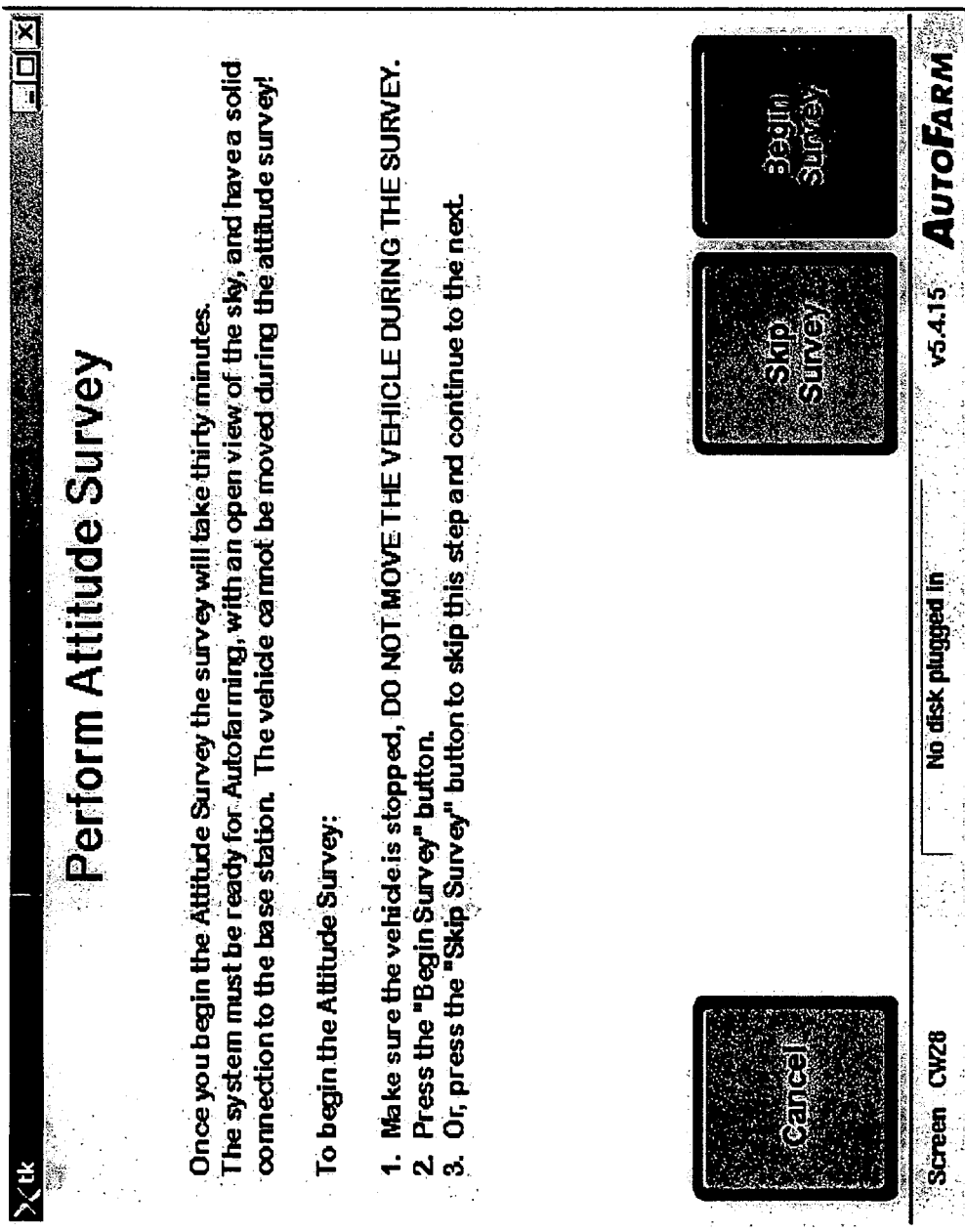

For this calibration step, the user is given a basic set of instructions (FIG. 18) and then is asked to stop moving the vehicle and begin the multi-antenna roof array calibration (FIG. 19). On this screen, the user is also given the option of skipping the calibration step in case the sensor has already been calibrated.

Figure 20:
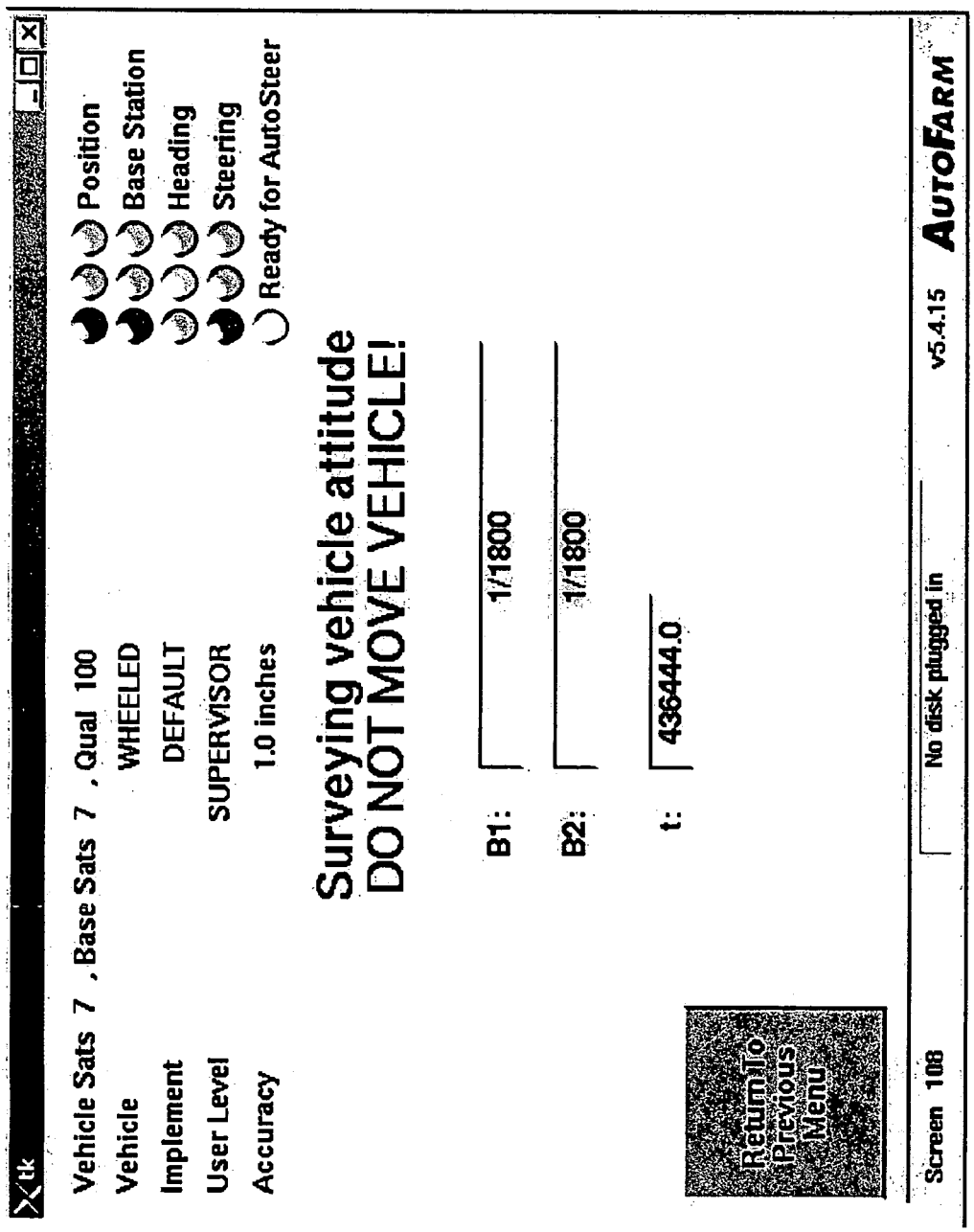

If the user presses the button to begin the calibration, a screen appears reminding the user not to move the vehicle, and timers appear on the screen to indicate the progress of the calibration (FIG. 20). If, instead, the user presses the button to skip the calibration, a warning screen appears to make sure that the user is making the correct decision (FIG. 21). At this point, the user may decide not to skip the survey, and the screen (FIG. 19) appears again.

Once the GPS antennas have been calibrated, this calibration step is marked as having been successfully completed, and the user interface automatically takes the user to the next step of the calibration process. It is worth noting that in the example given here, this step does not necessarily have to take place after the previously-listed steps for a successful calibration. However, self-calibration of sensors, such as gyroscopes or inclinometers, may require the user to define their location and orientation within the vehicle as a part of previous calibration steps before they are self-calibrated.

Step 5—Pressure Transducer Calibration

The next step of the calibration for a wheeled tractor as described above is the Pressure Transducer Calibration. At this step, the user generally calibrates a sensor that is used to determine when the user is turning the steering wheel in an attempt to disengage the automatic control function. In this example, the user is asked to attempt to turn the steering wheel while the steering system is engaged. The controls computer measures the output of one or more pressure sensors on the vehicle and stores these values into memory. Other sensors that can be used to determine if the user is attempting to steer the vehicle include, but are not limited to, current sensors, voltage sensors, rotational sensors, strain gauges, and optical sensors. These sensors can be attached to one of several points on the vehicle including the hydraulic system or the steering wheel shaft.

Figure 22:
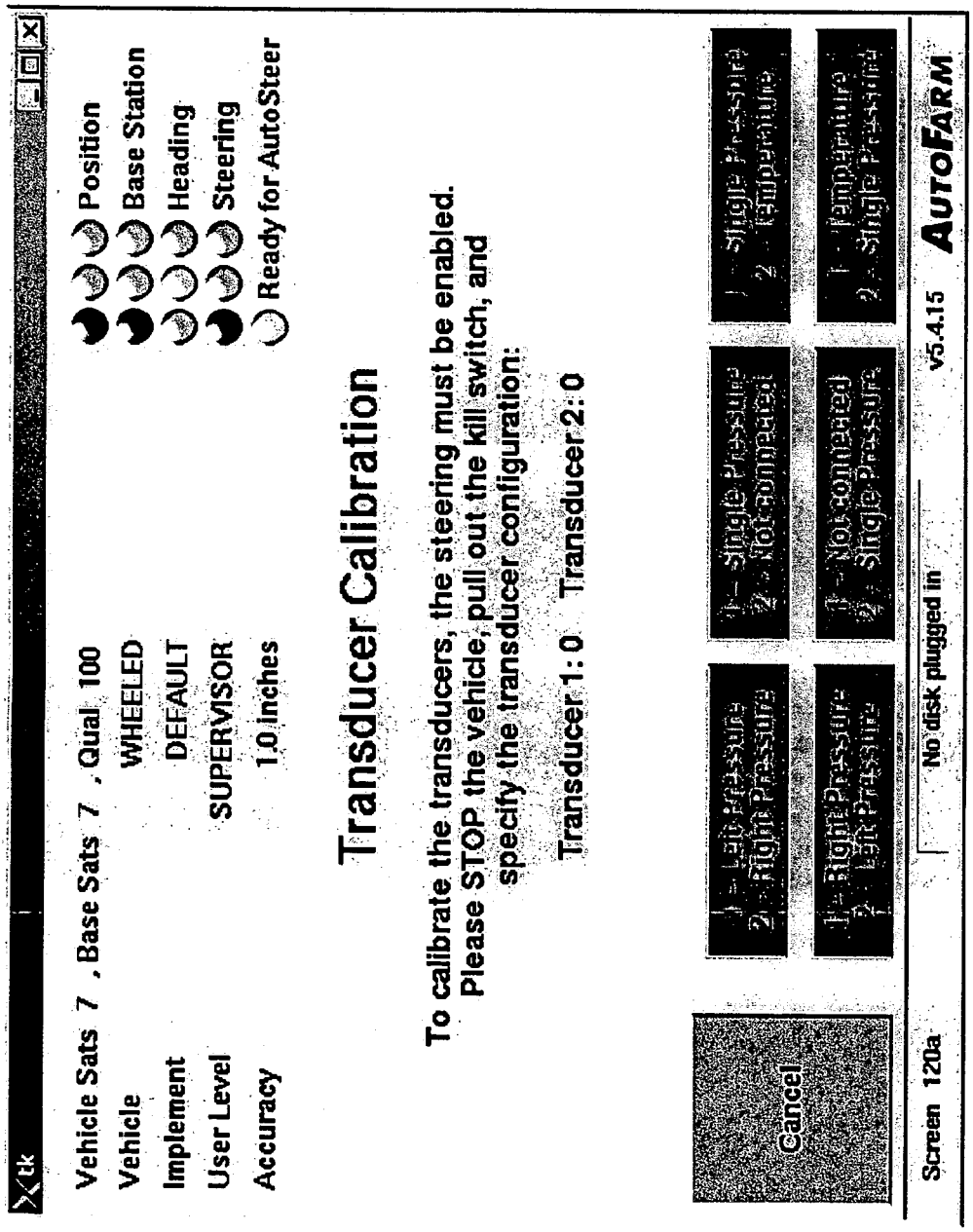

For this calibration step, the user is given a basic set of instructions and is asked to describe the physical installation configuration of the vehicle (FIG. 22). The user is then asked to attempt to turn the steering wheel to the left while automatic steering is engaged (FIG. 23) and then to the right.

If the calibration is successful, this calibration step is marked as having been successfully completed, and the user interface automatically takes the user to the next step of the calibration process. If the calibration fails, the user is warned that the procedure failed, and instructions are given to increase the likelihood of success. If the calibration fails three consecutive times, the user is given instructions for replacing any components that may have failed.

It is worth noting that in the example given here, this step does not necessarily have to take place after the previously-listed steps for a successful calibration.

Step 6—Wheel Angle Sensor Limit Detection

The next step of the calibration procedure is the Wheel Angle Sensor Limit Detection. At this step, the user moves the wheels to determine the polarity of the wheel angle sensor (mounted in the "normal" or "reversed" position) and the measurement limits of the wheel angle sensor. The polarity calibration is useful in cases where a wheel angle sensor can be mounted in multiple configurations, such as an "aftermarket" system installation that is designed for a variety of vehicle types. The measurement limit calibration can be used by the software to disengage the steering actuation when the wheels are at a hard limit. The calibration value can also be used to provide data points for the wheel angle sensor calibration.

Figure 26:
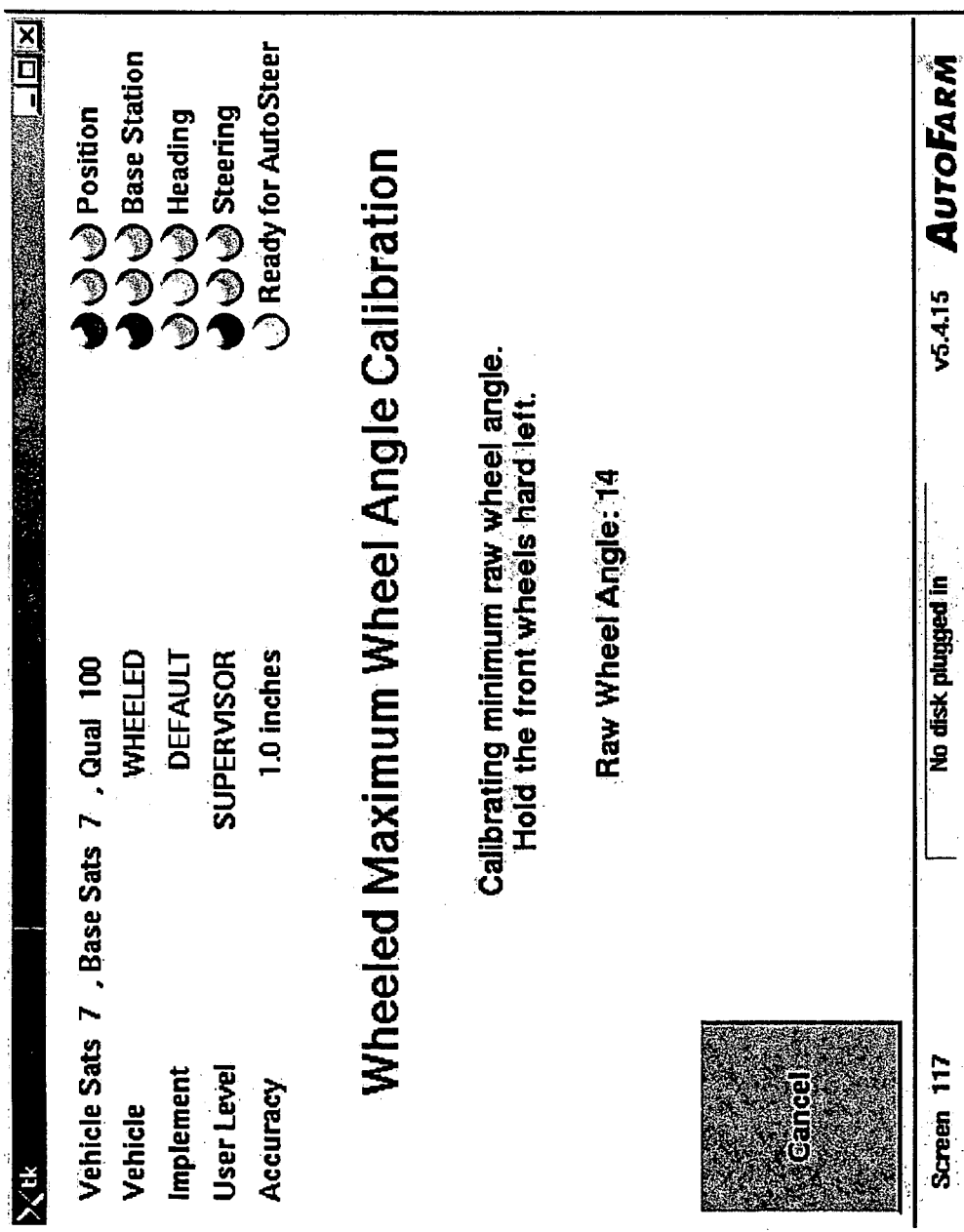
Figure 27:
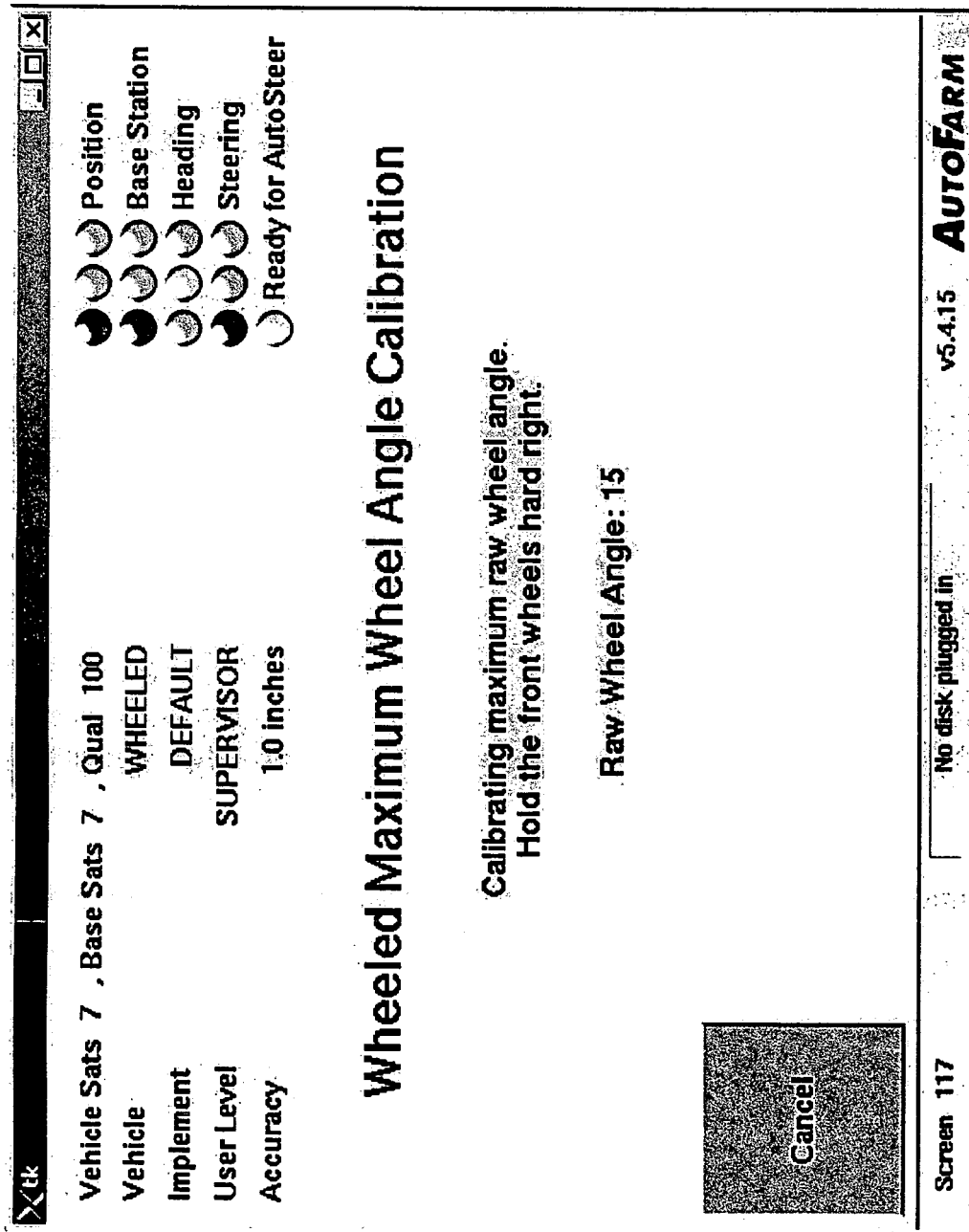
Figure 29:
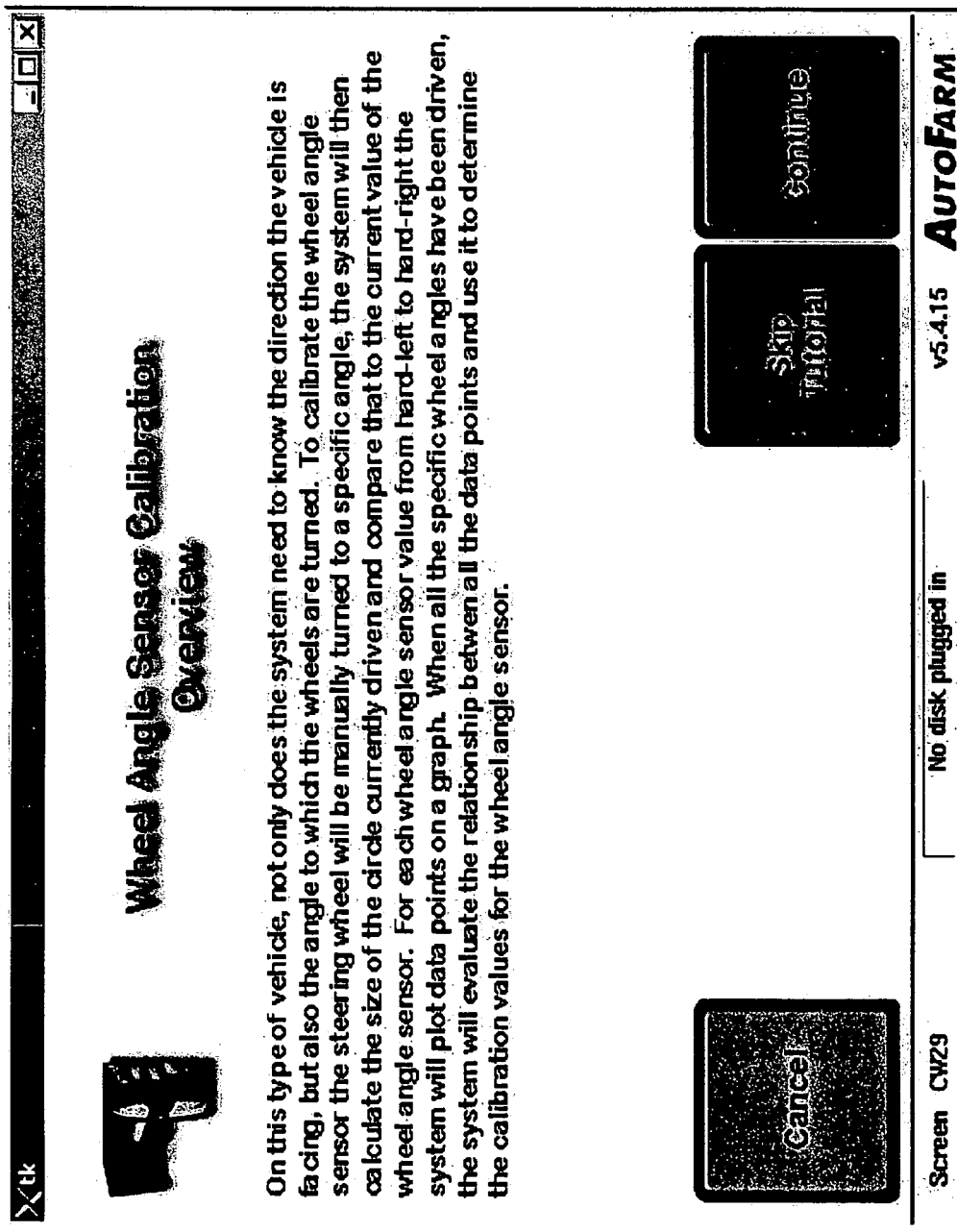
Figure 30:
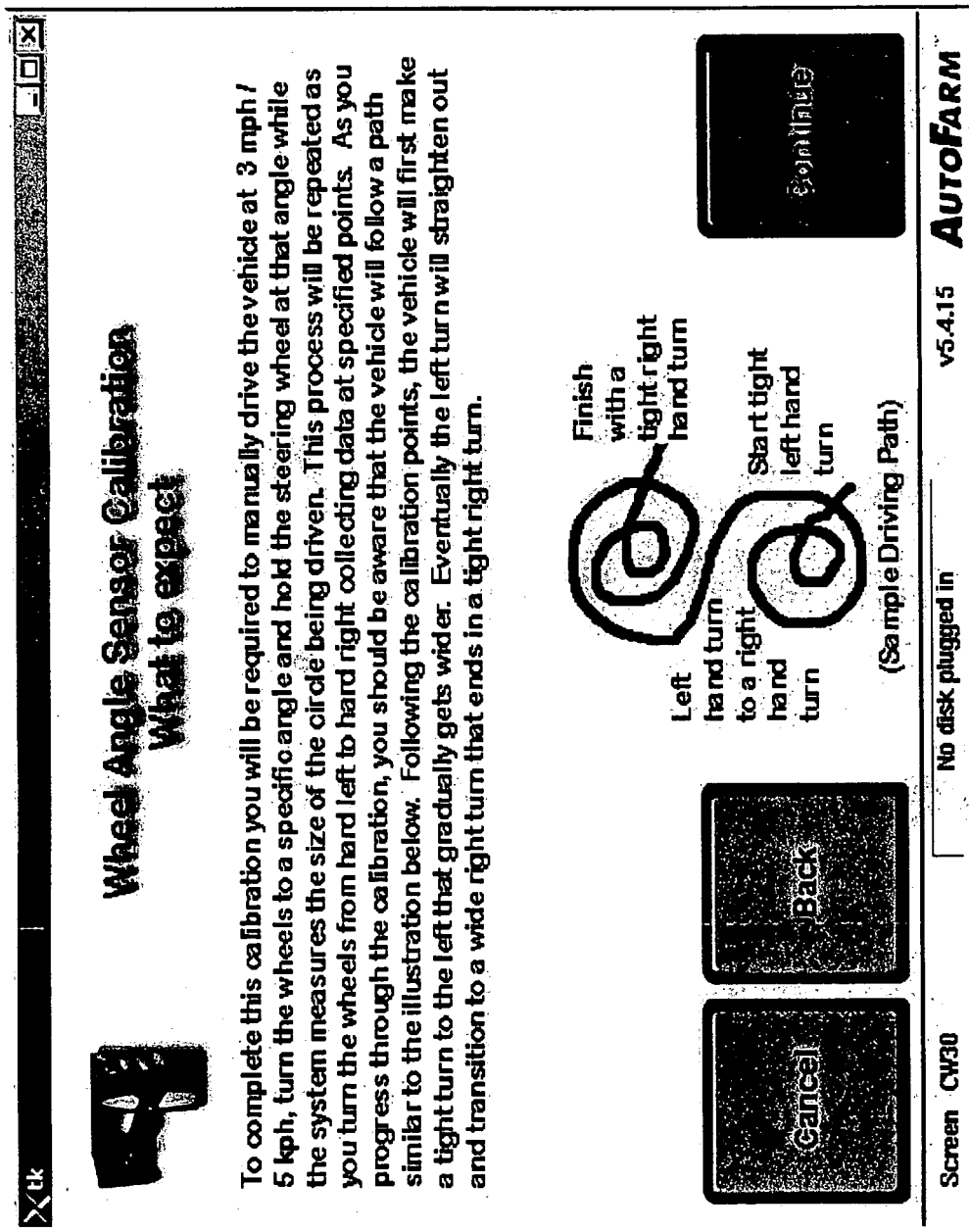
Figure 31:
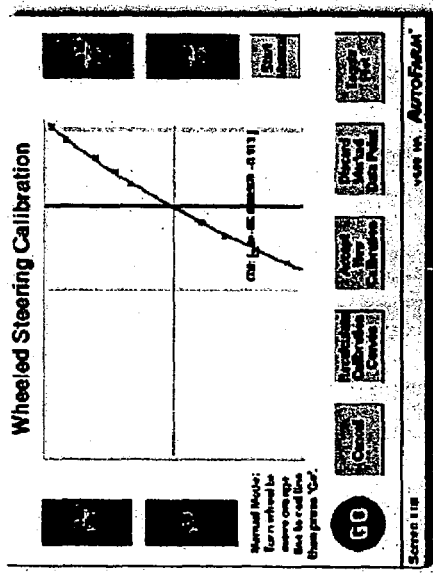
Figure 33:
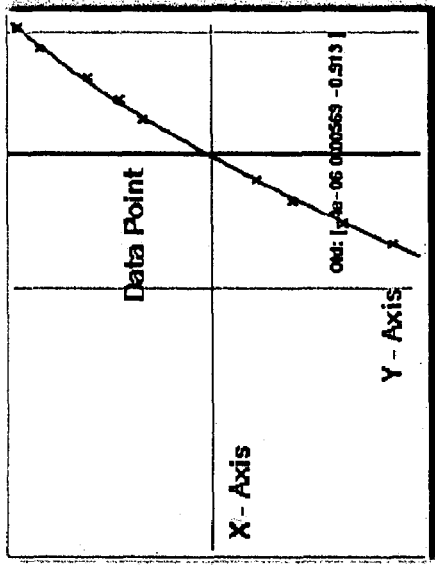
Figure 34:
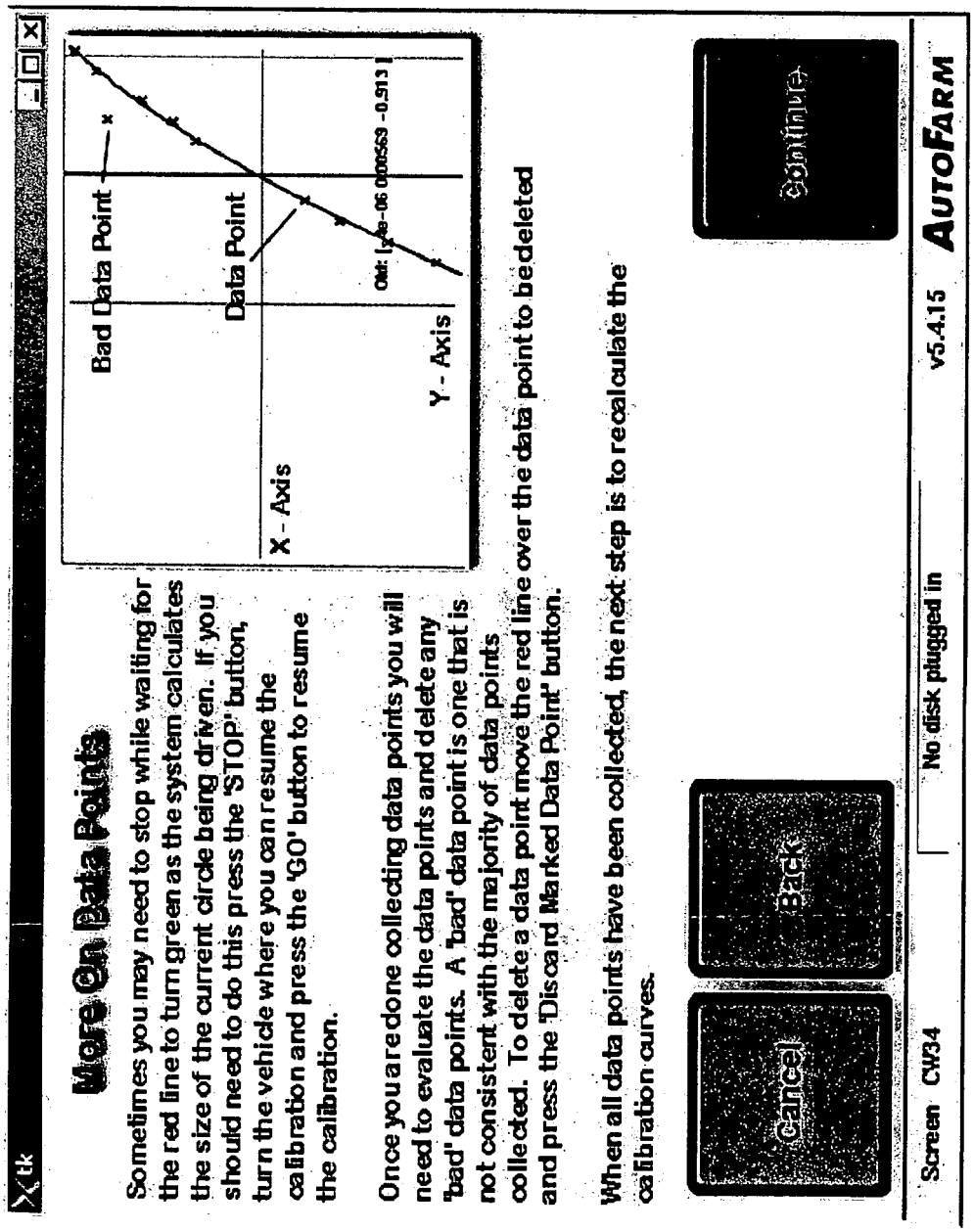
Figure 35:
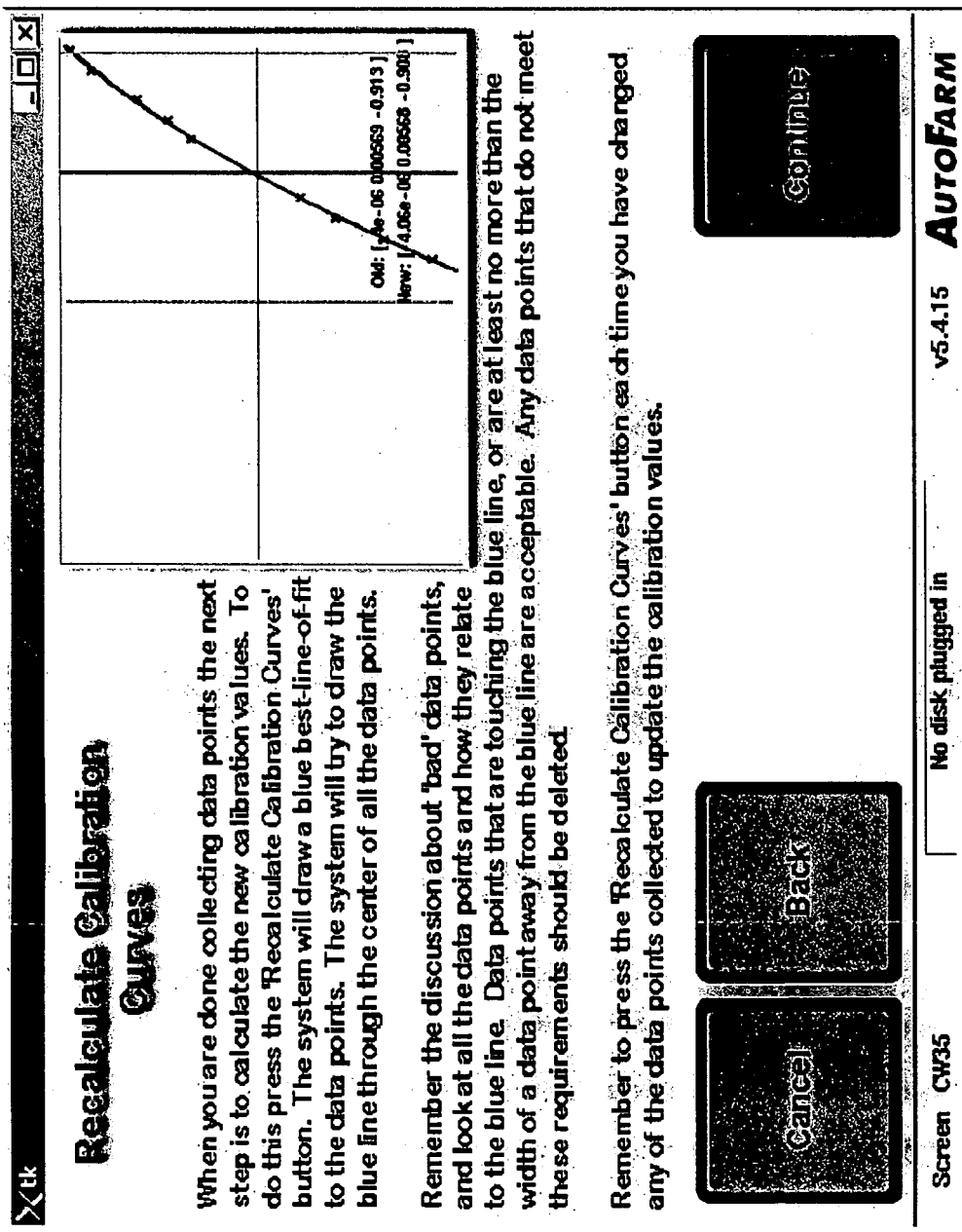
Figure 36:
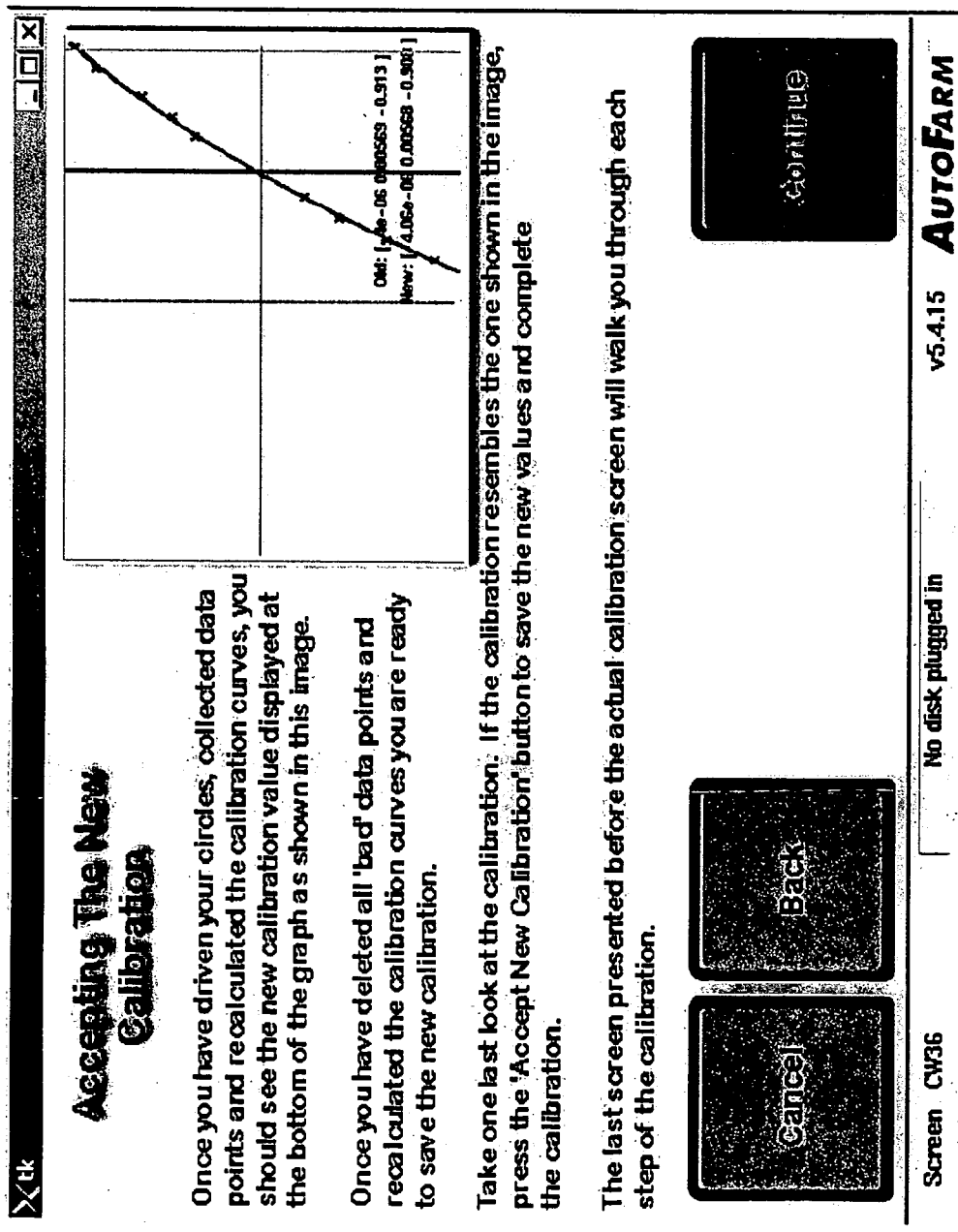

This calibration step begins by displaying the raw wheel angle sensor measurement to the user and asking the user to determine if the sensor installation is reversed or normal (FIG. 24). Next, the user is asked to turn the wheels to the hard left position and to press a button when the wheels are in the hard left position (FIG. 25). The system then collects raw wheel angle measurements for some period of time (for example, 10 seconds), and the measurements are averaged (FIG. 26). The same actions are then indicated for the hard right position (FIGS. 27 and 28).

Several error conditions can cause the system to display a message to the user and guide the user to perform this step again. For example, if the user has indicated that the sensor is in the normal position and the hard right measurement is less than the hard left measurement, there is an error. Also, if the user has indicated that the sensor is in the reversed position and the hard left measurement is less than the hard right measurement, there is an error. If the hard left and hard right measurements are the same value, an error is reported. If either measurement is very near to the physical limits of the sensor, the sensor is mounted incorrectly, and instructions are sent to the user to remount the sensor. If the sensor measurements vary too much during the averaging phase, the sensor noise is too high, and an error message is displayed to the user.

The results of this calibration are stored to memory for use by the control system, and they are used in the Wheel Angle Sensor Calibration.

Step 7—Wheel Angle Sensor Calibration

The next step of the calibration for a wheeled tractor is the Wheel Angle Sensor Calibration. The overall objective of this calibration is to map raw wheel angle sensor measurements to a physical wheel angle, an average of the physical wheel angle of the left and right steering tire (it is known in the art that, in many cases, the left and right wheels of a front wheel steered vehicle are designed to be different), an articulation angle, or a characteristic of the physical motion of the vehicle (such as heading rate or curvature). The preferred embodiment maps the wheel angle sensor to the curvature of the vehicle, where the curvature of the vehicle is the heading rate of the vehicle divided by the speed of the vehicle.

There are many ways to perform this calibration. For example, external measurements can be taken to map wheel angle sensor measurements to physical wheel angles. Also, automated procedures for calibrating such a sensor using vehicle motion are described in other publications. Such procedures can readily be used with this calibration wizard. These are only provided as examples, and there are many other ways to perform this calibration, all of which can be included in the calibration wizard.

The preferred technique for performing the wheel angle sensor calibration is to guide the user through the process of performing the calibration using vehicle motion. This is preferred to the process of using external measurements because on-board vehicle sensors can be used, and additional sensors are not required. This is also preferred to a fully-automated process that uses vehicle motion but does not allow the user to control the motion of the vehicle. Such a process requires the vehicle to drive a relatively long and winding path, and an automated procedure may cause the vehicle to drive off the field that has been designated for use in vehicle calibration. In other words, by allowing the user to interact with the wheel angle sensor calibration process, a smaller area of land is required to perform the calibration.

Figure 38:
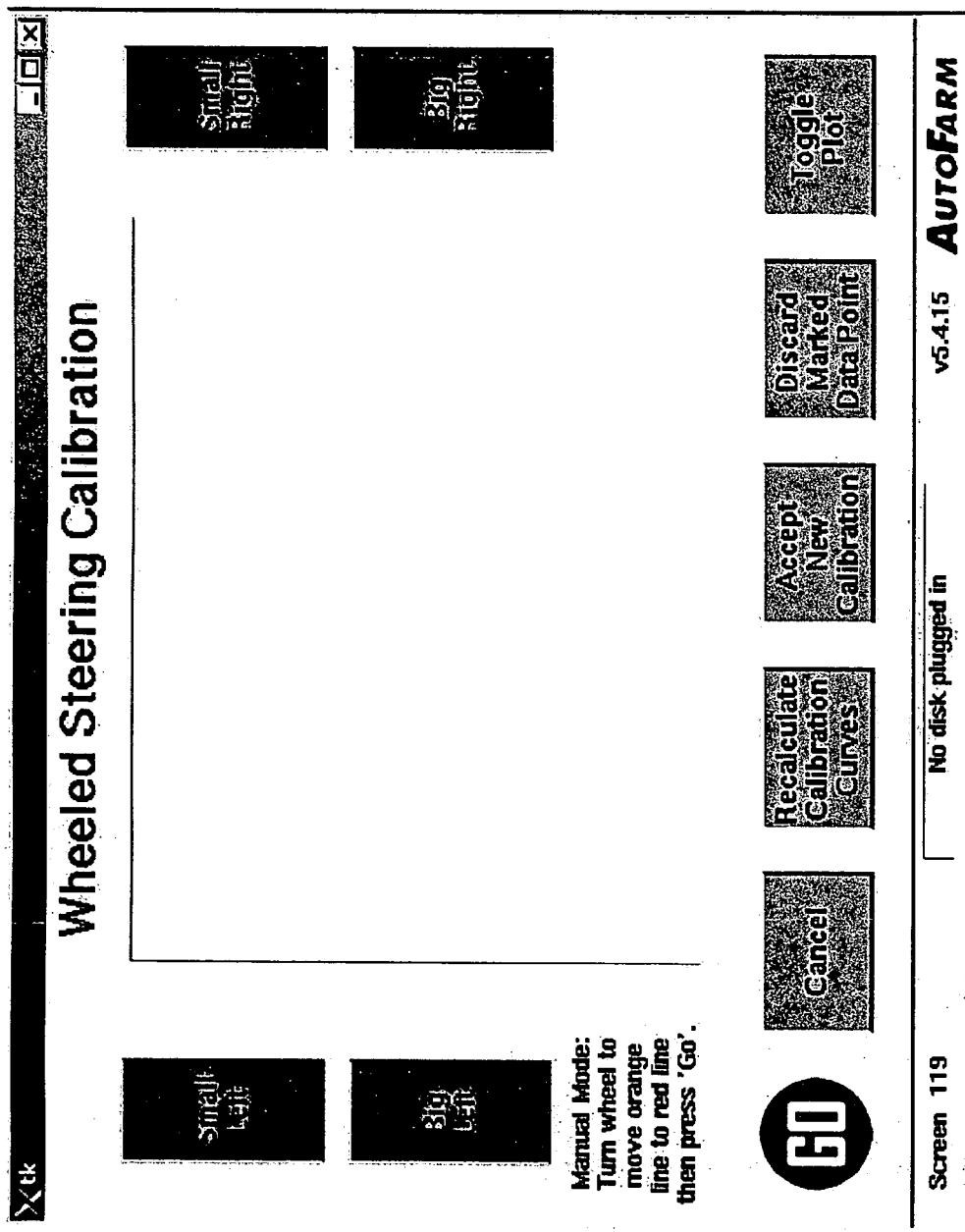
Figure 42:
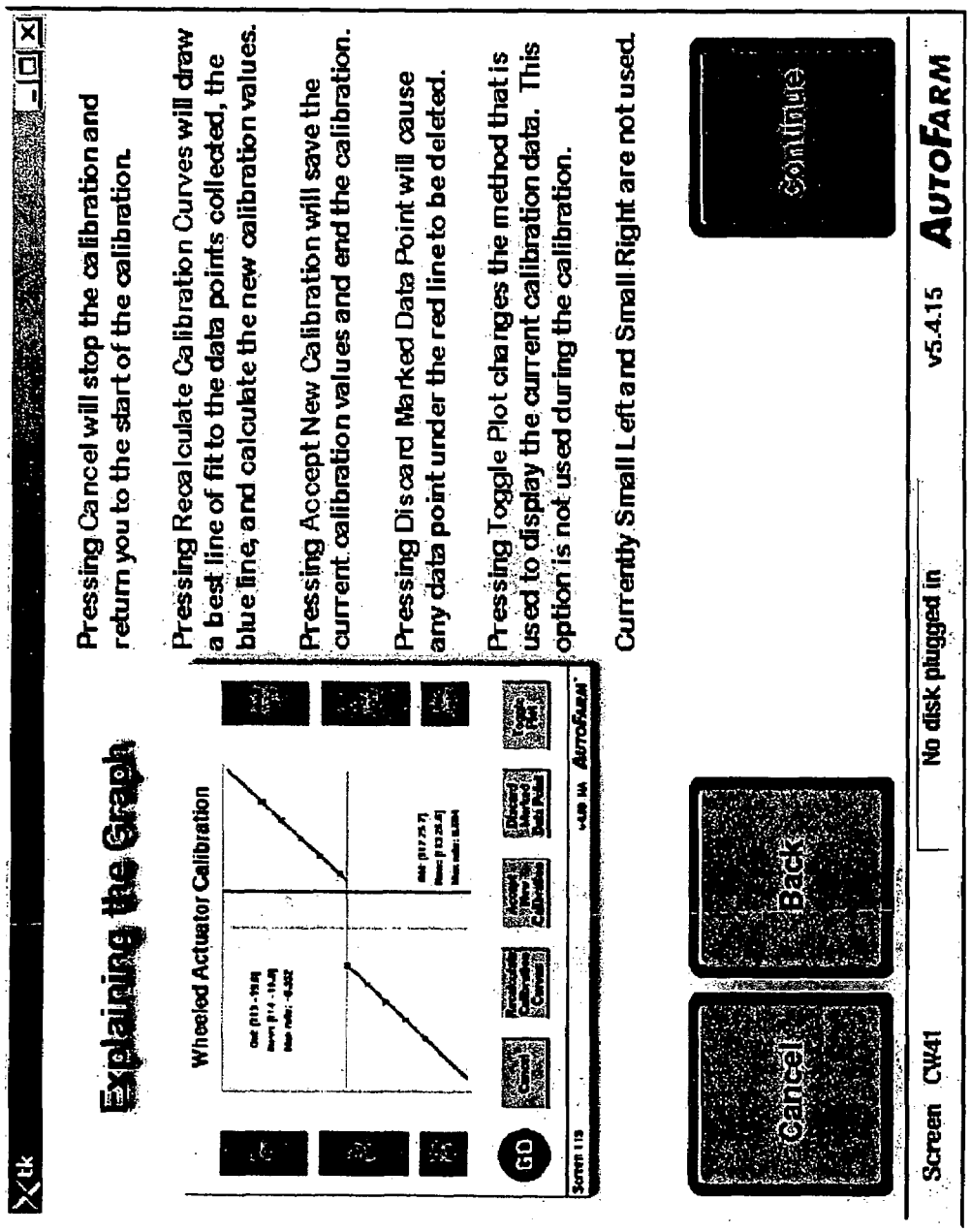
Figure 44:
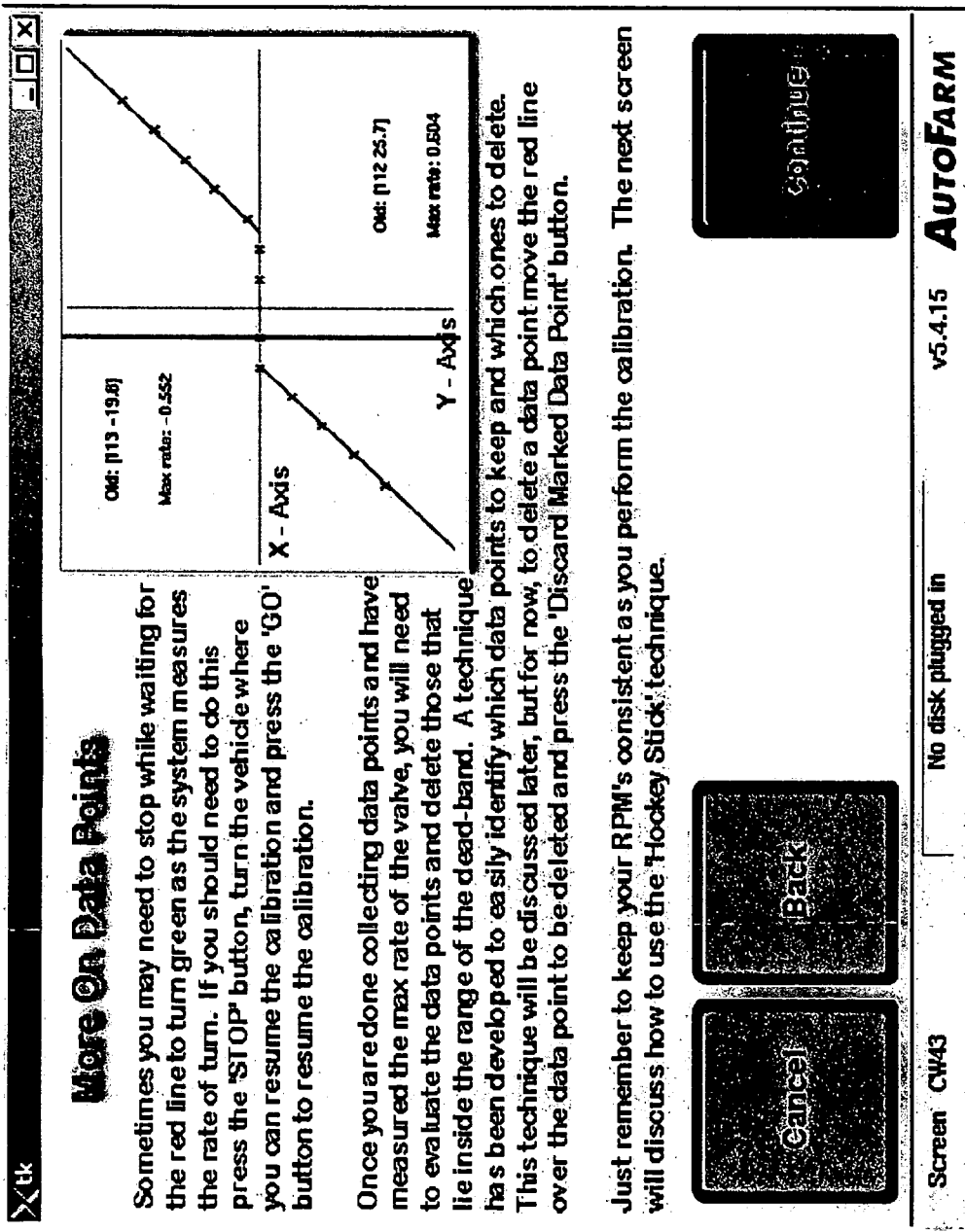
Figure 45:
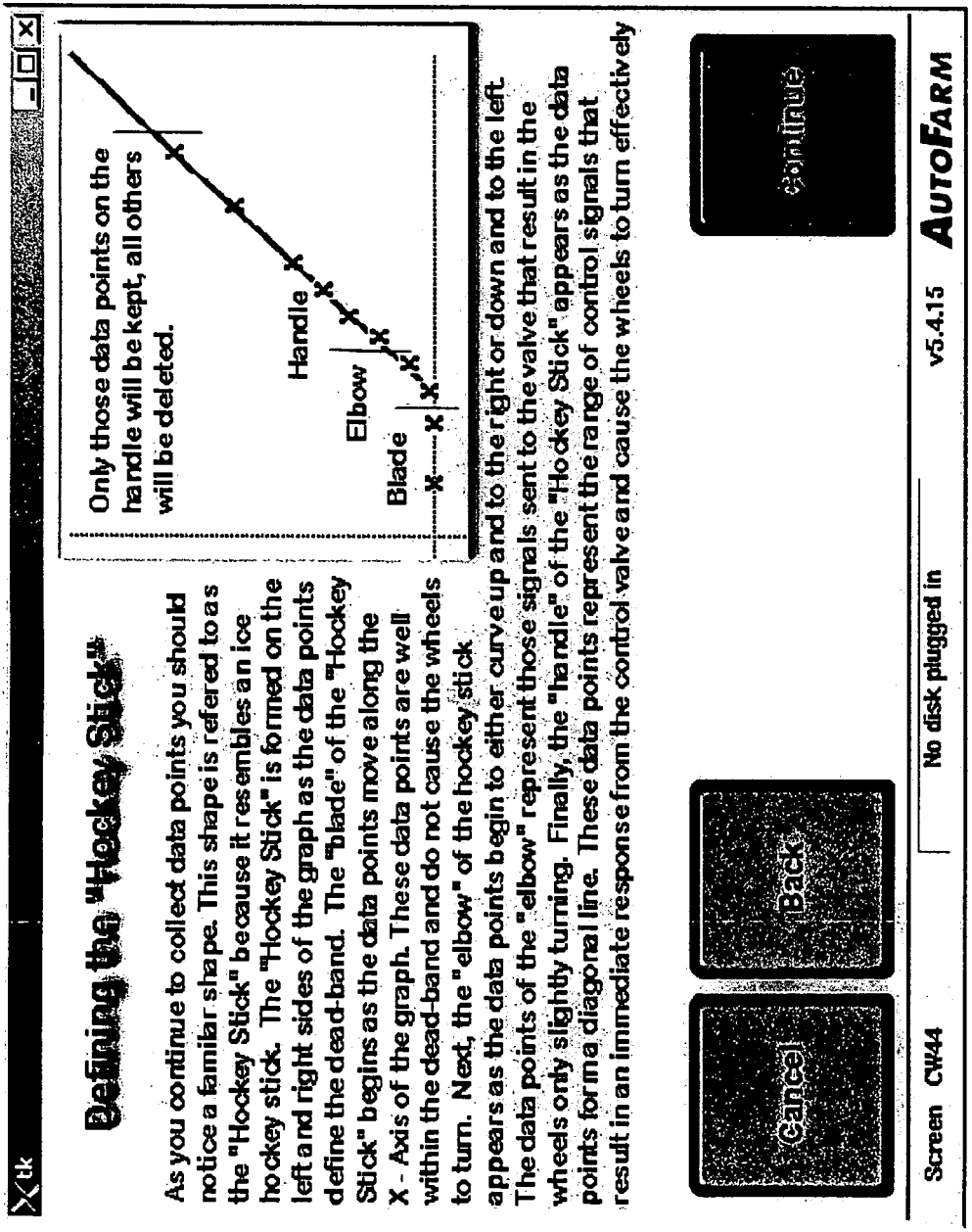
Figure 46:
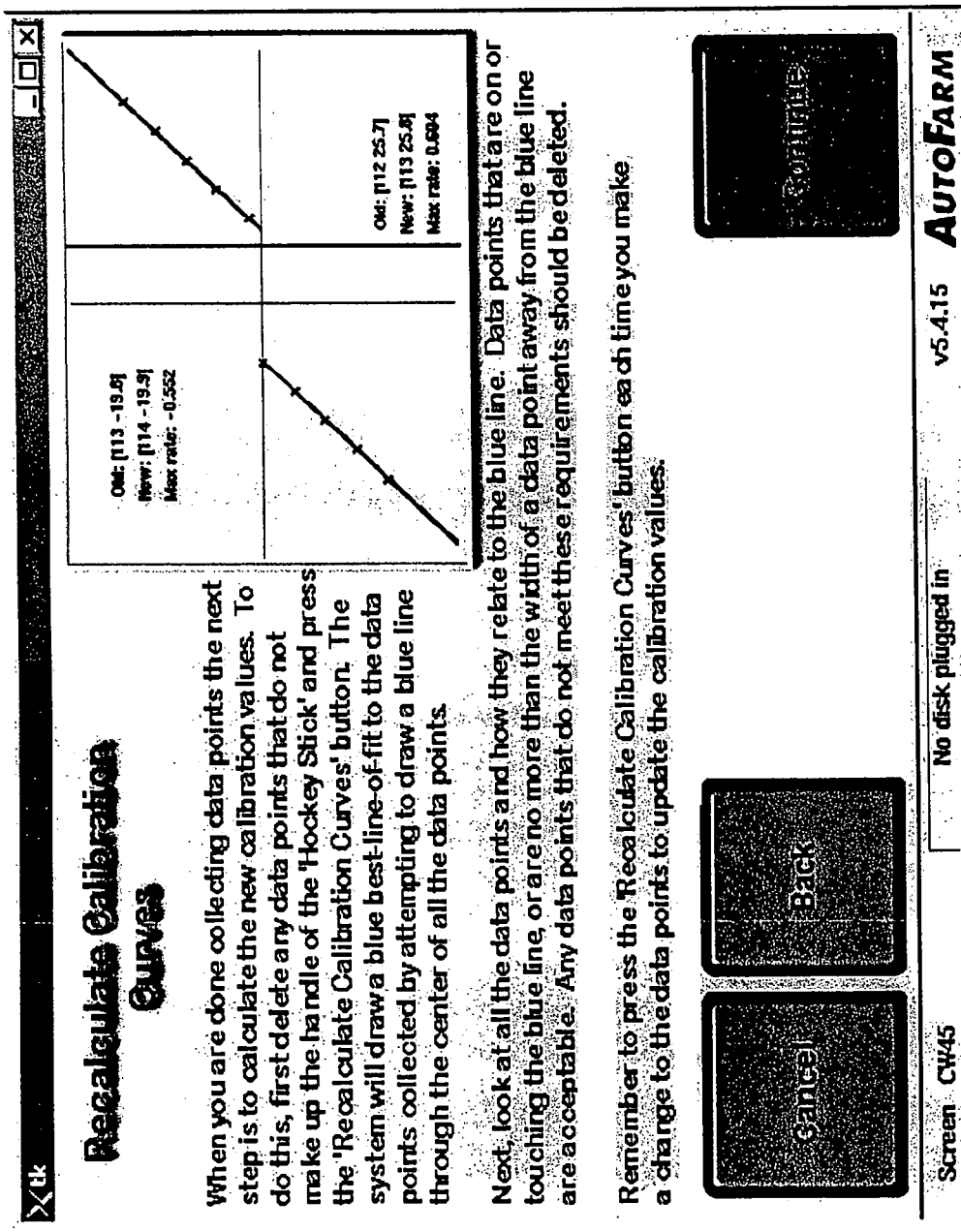
Figure 47:
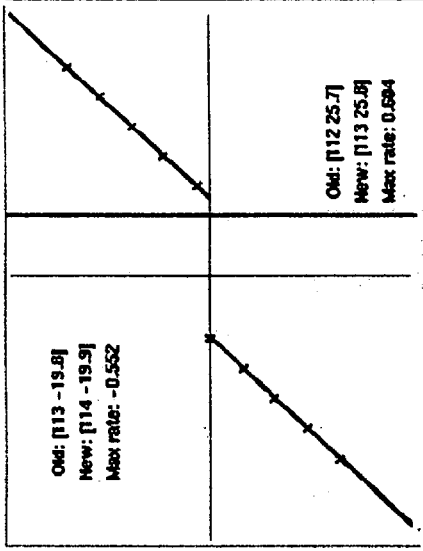

Due to the complexity of the wheel angle calibration process, the user is provided with a tutorial, or an interactive set of instruction describing the process. This tutorial is shown in FIG. 29 through FIG. 37. In the first screen, the user has the option to "Skip Tutorial," which will skip the tutorial screens and bring the user directly to the interactive calibration screen (FIG. 38). This is useful for trained or experienced users who are familiar with the wheel angle calibration and do not require the tutorial. As with most of the calibration screens, the user is also able to "Cancel" the calibration and return to the main menu of the system. After pressing the "Continue" button, the user will be guided through the tutorial. The remaining tutorial screens allow the user to move forward or backwards through the calibration tutorial screens or cancel the calibration.

The functions of the interactive calibration screen (FIG. 38) are described in the tutorial. A "GO/STOP" button allows the user to pause the calibration at any time. This is useful if the vehicle is approaching the edge of the field, and the user wants to manually bring the vehicle back toward the center of the field. The Big/Small Left/Right buttons allow the user to determine which wheel angle position is to be tested and, therefore, guide the path that the vehicle will take during the calibration. The "Recalculate Calibration Curves" button will draw a best line to fit the data points collected (for example, using a polynomial fit—$2^{nd}$ order polynomial fit is the preferred embodiment) and display that line relative to the points that have been collected. The "Discard" button allows the user to discard a point that appears to be invalid. The "Toggle Plot" button allows the user to view the information in different forms or to change the axis scaling of the plot. Pressing "Accept New Calibration" will cause the calibration to end, and, if successful, the system will store the calibration values in memory and move on to the next step of the calibration wizard.

Errors can occur in several ways, e.g., not enough points to fit a line through the data, not enough data points on the left side or on the right side to ensure a good calibration, no data points near zero, and one or more data points that are inconsistent with the rest of the data points. In the case of an error, the error is described to the user, and the user is returned to the interactive calibration screen.

The Wheel Angle Sensor Calibration of a wheeled tractor relies on the measurements from a successfully completed wheel angle sensor limit detection (step 6), the safety provided by a successful pressure transducer calibration (step 5), the orientation data provided by a successful GPS multi-antenna self-calibration (step 4), and the vehicle's physical dimensions (steps 2 and 3). If these earlier steps have not been successfully completed, the results of this calibration will be invalid, and the vehicle control system performance will likely be unacceptable to the user. Therefore, the calibration wizard preferably ensures that these steps have been successfully performed, in the correct order, before beginning this calibration.

Step 8—Steering Actuator Calibration

The next step of the calibration for a wheeled tractor is the Steering Actuator Calibration. The overall objective of this calibration is to map raw steering commands to a physical steering characteristic. In the preferred embodiment, this is a wheel angle rate, using the wheel angle as described in the Wheel Angle Sensor Calibration. In the case of a servo actuator, this can be a wheel angle instead of a wheel angle rate.

There are many ways to perform this calibration. For example, external measurements can be taken to sense hydraulic flow rates. Also, automated procedures for calibrating an actuator, with or without vehicle motion, are described in other publications. Such procedures can readily be used within this calibration wizard. These are only provided as examples. There are many other ways to perform this calibration, all of which can be included into the calibration wizard.

The preferred technique for performing the steering actuator calibration is to guide the user through the process of performing the calibration using vehicle motion. This is preferred to the process of using external measurements because the on-board vehicle sensors can be used, and additional sensors are not required. This is also preferred to a fully-automated process that uses vehicle motion but does not allow the user to control the motion of the vehicle. Such a process requires the vehicle to drive a relatively long and winding path, and an automated procedure may cause the vehicle to drive off the field that has been designated for use in vehicle calibration. In other words, by allowing the user to interact with the steering actuator calibration process, a smaller area of land is required to perform the calibration.

Figure 49:
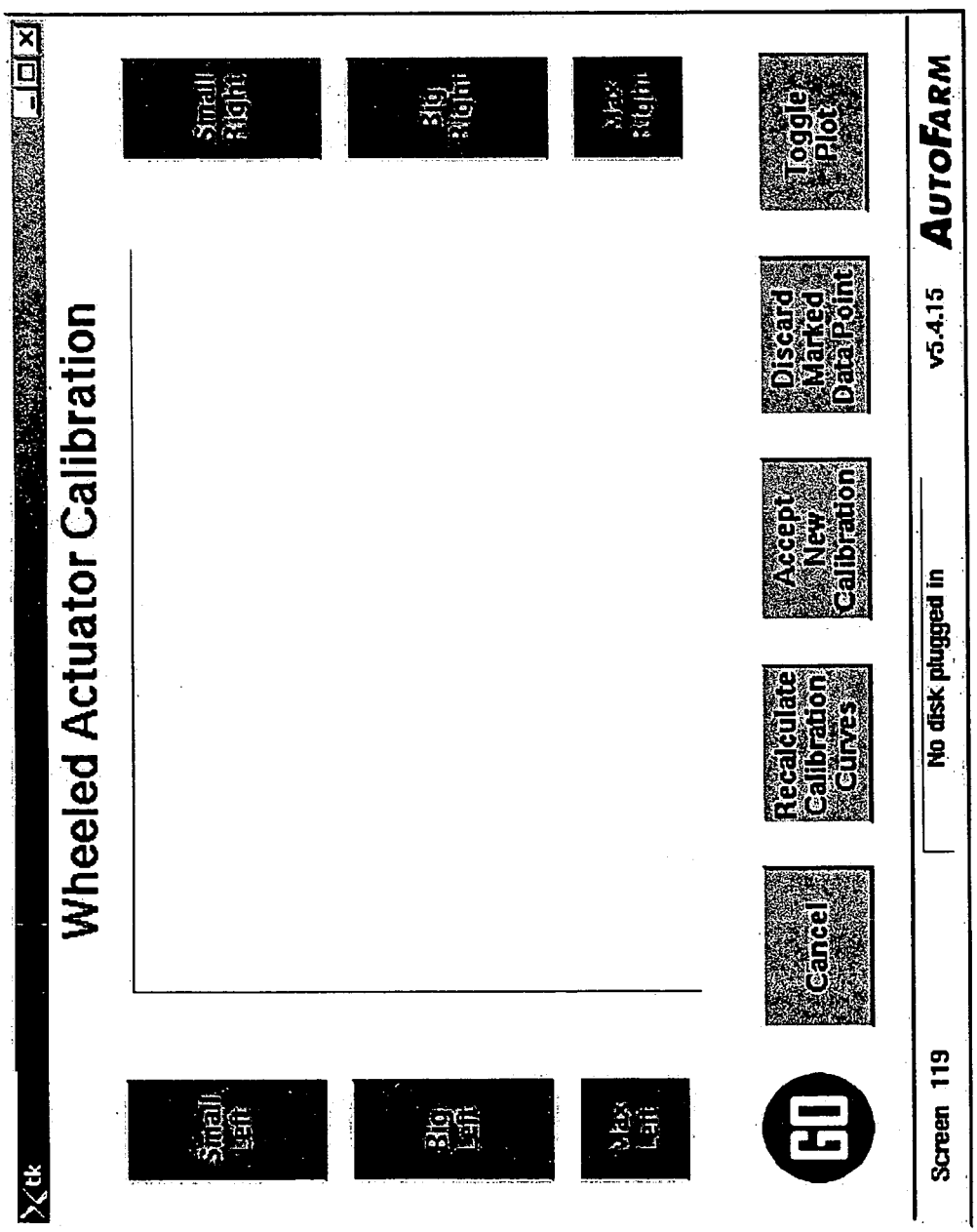

Due to the complexity of the steering actuator calibration process, the user is provided with a tutorial or an interactive set of instructions describing the process. This tutorial is shown in FIGS. 39 through 48. In the first screen (FIG. 39), the user has the option to "Skip Tutorial," which will skip the tutorial screens and bring the user directly to the interactive calibration screen (FIG. 49). This is useful for trained or experienced users who are familiar with the steering actuator calibration and do not require the tutorial. As with most of the calibration screens, the user is also able to "Cancel" the calibration and return to the main menu of the system. After pressing the "Continue" button, the user will be guided through the tutorial. The remaining tutorial screens allow the user to move forward or backwards through the calibration tutorial screens or cancel the calibration.

The functions of the interactive calibration screen (FIG. 49) are described in the tutorial. A "GO/STOP" button allows the user to pause the calibration at any time. This is useful if the vehicle is approaching the edge of the field, and the user wants to manually bring the vehicle back toward the center of the field. The Big/Small Left/Right buttons allow the user to determine which steering command is to be tested and, therefore, guide the path that the vehicle will take during the calibration. The "Recalculate Calibration Curves" button will draw a best line to fit the data points collected (for example, using a polynomial fit—left and right linear fits allowing for a deadband is the preferred embodiment) and display that line relative to the points that have been collected. The "Discard" button allows the user to discard a point that appears to be invalid. The "Toggle Plot" button allows the user to view the information in different forms or to change the axis scaling of the plot. Pressing "Accept New Calibration" will cause the calibration to end, and, if successful, the system will store the calibration values in memory and move on to the next step of the calibration wizard.

Errors can occur in several ways, e.g., not enough points to fit a line through the data, not enough data points on the left side or on the right side to ensure a good calibration, no data points near zero, and one or more data points that is inconsistent with the rest of the data points. In the case of an error, the error is described to the user, and the user is returned to the interactive calibration screen.

The Steering Actuator Calibration of a wheeled tractor relies on the measurements from a successfully calibrated wheel angle sensor (steps 6 and 7) and the safety provided by a successful pressure transducer calibration (step 5). If these earlier steps have not been successfully completed, the results of this calibration will be invalid, and the vehicle control system performance will likely be unacceptable to the user. Therefore, the calibration wizard preferably ensures that these steps have been successfully performed, in the correct order, before beginning this calibration.

Step 9—Control System On-Path Gain Tuning

Once the sensors and actuators necessary for automatic control have been calibrated, the vehicle steering control system can be tuned. Tuning may not be necessary, especially for a new vehicle for which default controller tuning parameters work well. However, it is generally preferred to have a technique to tune the control system since age and other factors are likely to affect the physical characteristics of the vehicle, such as hydraulic flows and pressures, tire tread and pressure, and components added to the vehicle which affect mass distribution and dynamics.

Automatic or "adaptive" techniques for tuning control system gains are well described in the art. Such techniques can easily fit into this calibration wizard process. For example, the calibration wizard can cause the user to choose to always adapt the control system, to only adapt the control system in certain circumstances (such as during periods of large command inputs), to only adapt the control system when a special control system adaptation mode is used, or to never adaptively change the control system.

Manual methods of control system tuning are also well understood in the art. Tools such as proportional-integral-derivative (PID) control, root locus design, Bode design, Linear Quadratic Regulation (LQR), successive loop closure, pole placement, and H-infinity are just a few of the control system design techniques and tools that are well understood in the art. The important point to note is that, in the preferred embodiment, all of the previously-performed calibration steps must have been performed before the control system is tuned, or the user is likely to experience poor control system results and may even face unsafe vehicle conditions.

In the preferred embodiment, one of two control systems is selected by the system depending on the state of the vehicle relative to the desired vehicle path. The first, called On-Path mode, is used when the vehicle is very close to the path it is attempting to follow. The second, called Line Acquisition mode, is used when the vehicle is not near the desired path.

For the preferred On-Path control system, a successive loop closure approach is used. For a wheeled tractor, the inner-most loop is wheel angle, or steering, control; the second loop is heading control; and the third loop is lateral position control, including an integral control term on lateral position. For such a control system, it is generally preferred, especially on the first pass at gain tuning, to tune these gains in this order (from inner (or first) loop to outer (or third) loop). The calibration guides the user to perform these steps in the preferred order.

Figure 50:
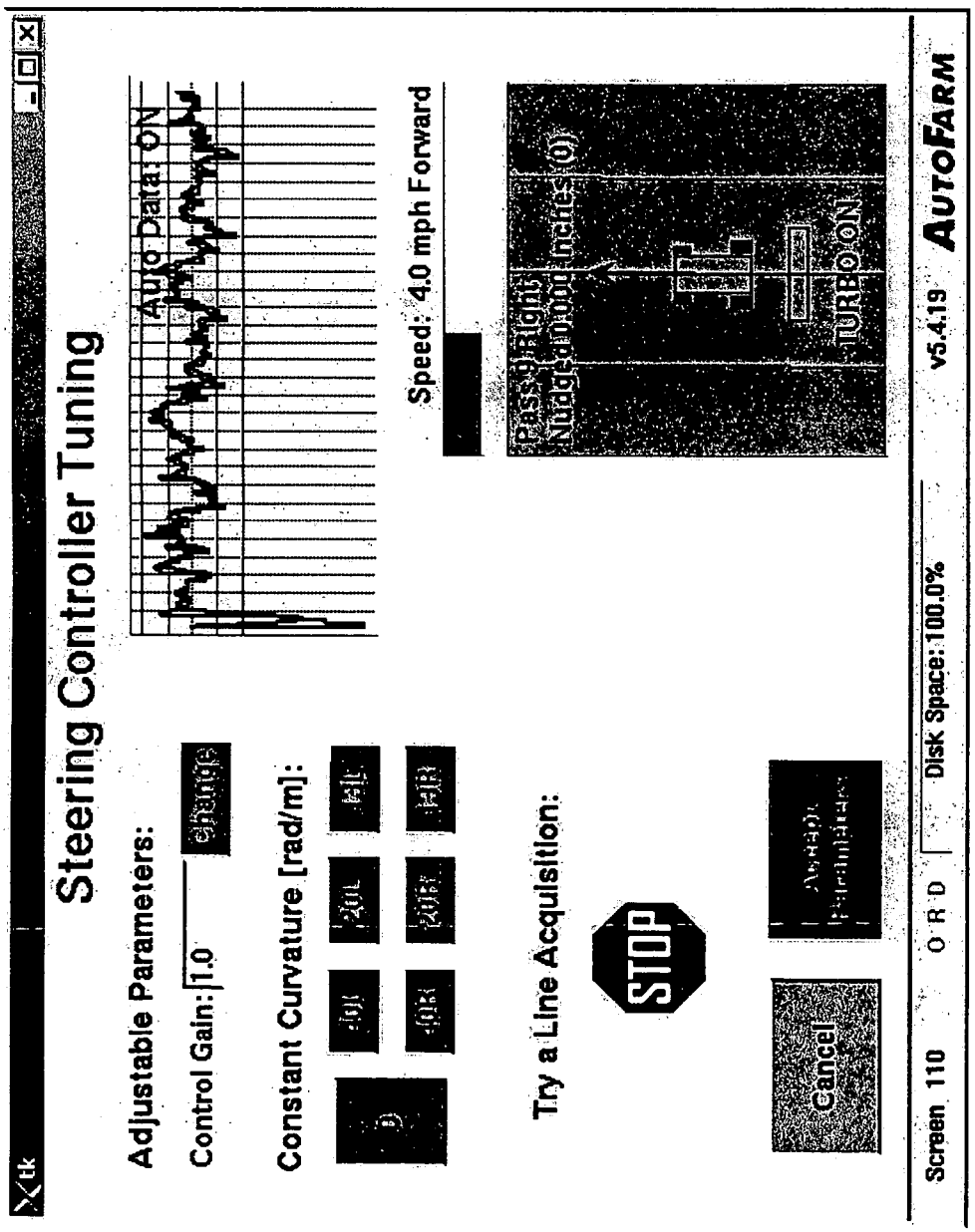
FIGS. 50-52 are illustrations of screen displays from a calibration wizard of an embodiment guiding a user through a control system gain tuning (on-path) calibration step.

The steering gain is tuned using the interactive screen shown in FIG. 50. The user can engage the steering system by pressing the GO button. When steering is engaged, the GO button turns into a STOP button. Pressing the STOP button disengages the steering system.

While steering is engaged, the user can command the vehicle to steer in circles of different radii. For example, the button "40 L" drives the vehicle in a 40 meter radius circle to the left, and the button "20 R" drives the vehicle in a 20 meter radius circle to the right. By pressing different buttons while driving the vehicle, the user can watch the steering behavior as the vehicle transitions from circles with different radii and adjust the steering control gain accordingly. An on-screen plot shows the user how quickly the transition occurred and whether there was overshoot in the steering response. This is not the only way to perform the steering gain tuning. Other techniques, including automated techniques, are possible and are well understood in the art. Once the user is satisfied with the steering response, the user can "Accept Parameters," at which point the system will guide the user to the next step of the calibration.

Figure 51:
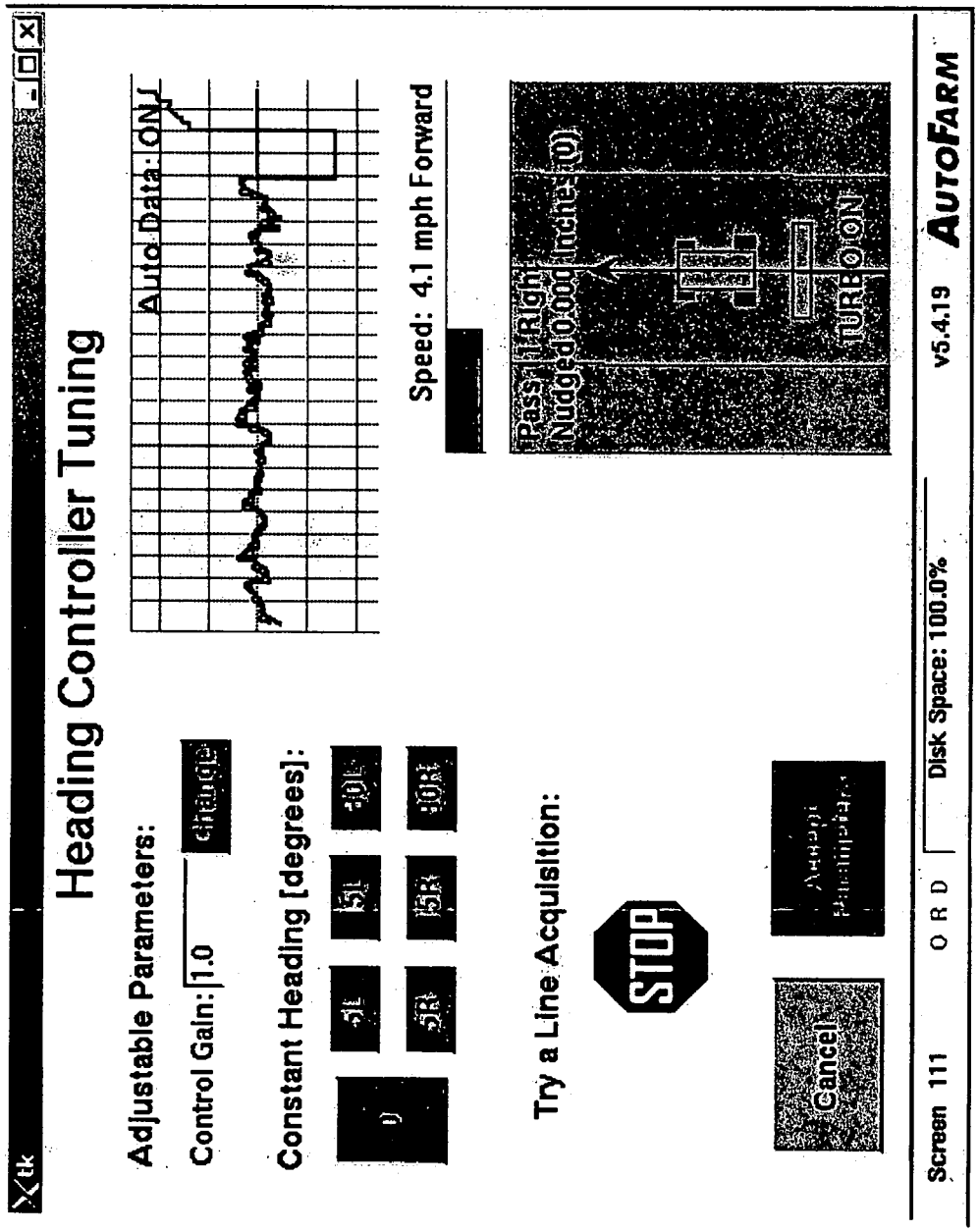

The heading gain is tuned using the interactive screen shown in FIG. 51. The user can engage the steering system by pressing the GO button. When steering is engaged, the GO button turns into a STOP button. Pressing the STOP button disengages the steering system.

While steering is engaged, the user can command the vehicle to steer to various headings. This controller will only work well if the steering gains have already been tuned adequately. For example, if the button "5 L" is pressed, the vehicle will try to steer to a heading that is 5 degrees to the left of the original heading (the heading of the vehicle when the "GO" button was pressed). If the button "15 R" is pressed, the vehicle will try to steer to a heading that is 15 degrees to the right of the original heading. By pressing different buttons while driving the vehicle, the user can watch the steering behavior as the vehicle transitions between different headings and adjust the heading control gain accordingly. An on-screen plot shows the user how quickly the transition occurred and whether there was overshoot in the heading response. This is not the only way to perform the heading gain tuning. Other techniques, including automated techniques, are possible and are well understood in the art. Once the user is satisfied with the heading response, the user can "Accept Parameters," at which point the system will guide the user to the next step of the calibration.

Figure 52:
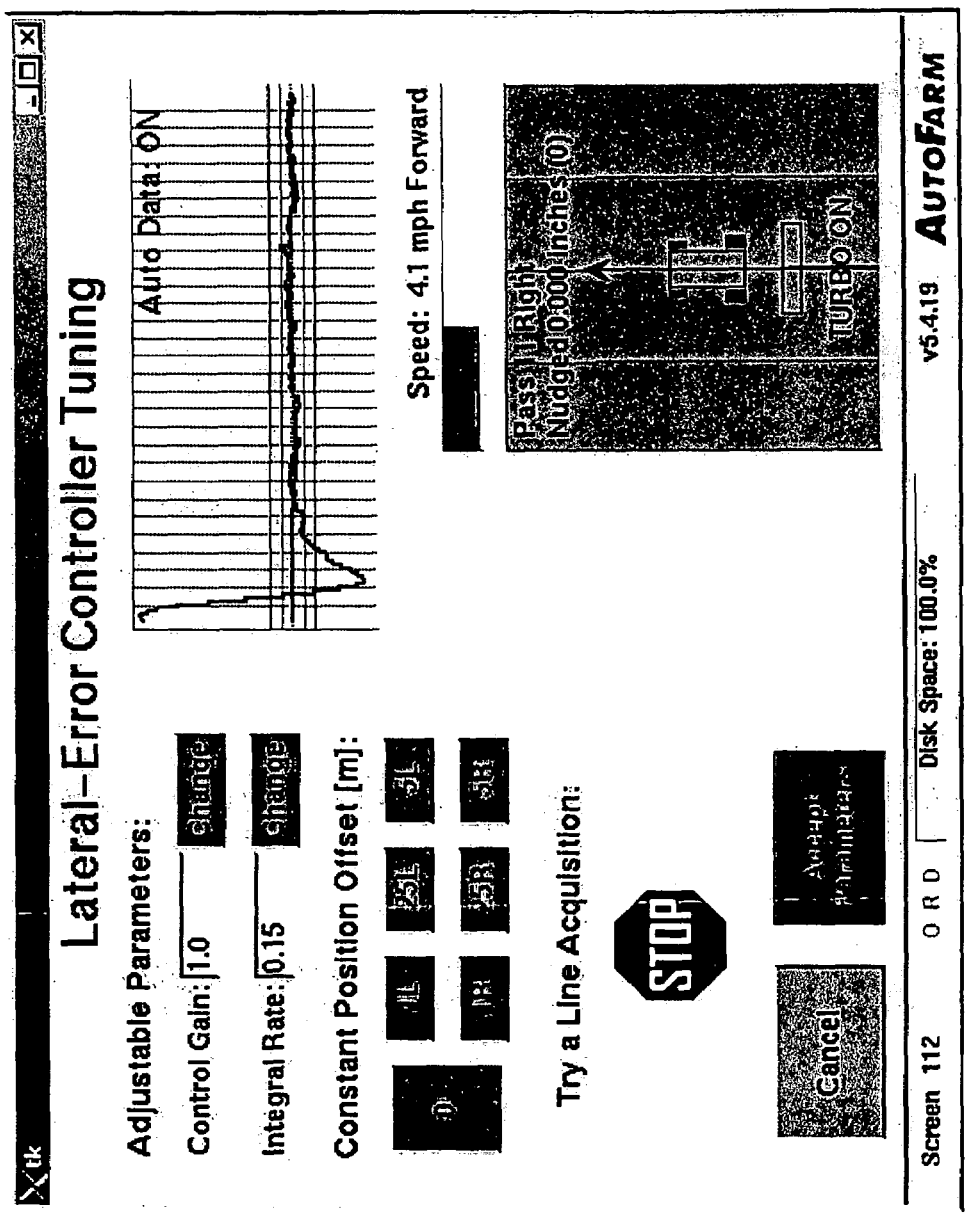

The lateral position error gain is tuned using the interactive screen shown in FIG. 52. The user can engage the steering system by pressing the GO button. When steering is engaged, the GO button turns into a STOP button. Pressing the STOP button disengages the steering system.

While steering is engaged, the user can command the vehicle to steer in a straight line with various offsets. This controller will only work well if the steering gains and heading gains have already been tuned adequately. For example, if the button "0.1 L" is pressed, the vehicle will try to steer along a straight line that is offset 0.1 meters to the left of the original line (the line matching the position and heading of the vehicle when the "GO" button was pressed). If the button "0.25 R" is pressed, the vehicle will try to steer along a straight line that is offset 0.25 meters to the right of the original line. By pressing different buttons while driving the vehicle, the user can watch the steering behavior as the vehicle transitions between different offset lines and adjust the lateral position error control gain accordingly. An on-screen plot shows the user how quickly the transition occurred and whether there was overshoot in the lateral error response.

The user can also choose to tune the response of the system to a steady lateral error bias by tuning the Integral Rate gain. This can be done in many ways, such as by driving on side hills or by applying steady pressure to a directional braking pedal on the vehicle and observing how quickly the bias is corrected. This is not the only way to perform the lateral error gain and integral rate tuning. Other techniques, including automated techniques, are possible and are well understood in the art. Once the user is satisfied with the lateral error response, the user can "Accept Parameters," at which point the system will guide the user to the next step of the calibration.

Step 10—Control System Line Acquisition Gain Tuning

In the preferred embodiment, Line Acquisition mode relies on the gains used for On-Path mode. Therefore, it is desirable to tune line acquisition gains after the On-Path gains have been tuned and On-Path performance is acceptable. If On-Path gains have not been tuned adequately, it will be difficult or impossible to tune line acquisition performance to acceptable levels.

Figure 53:
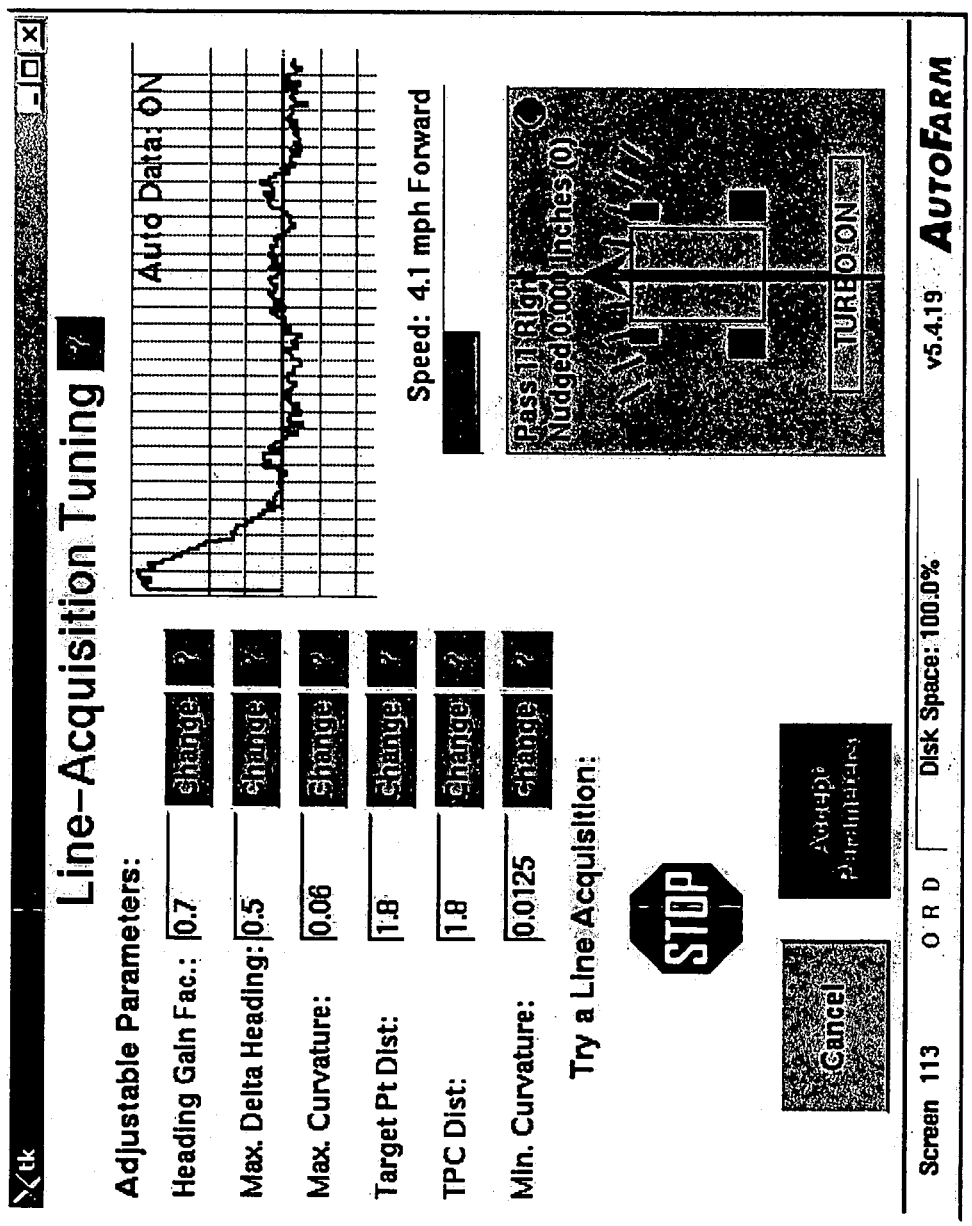
Figure 55:
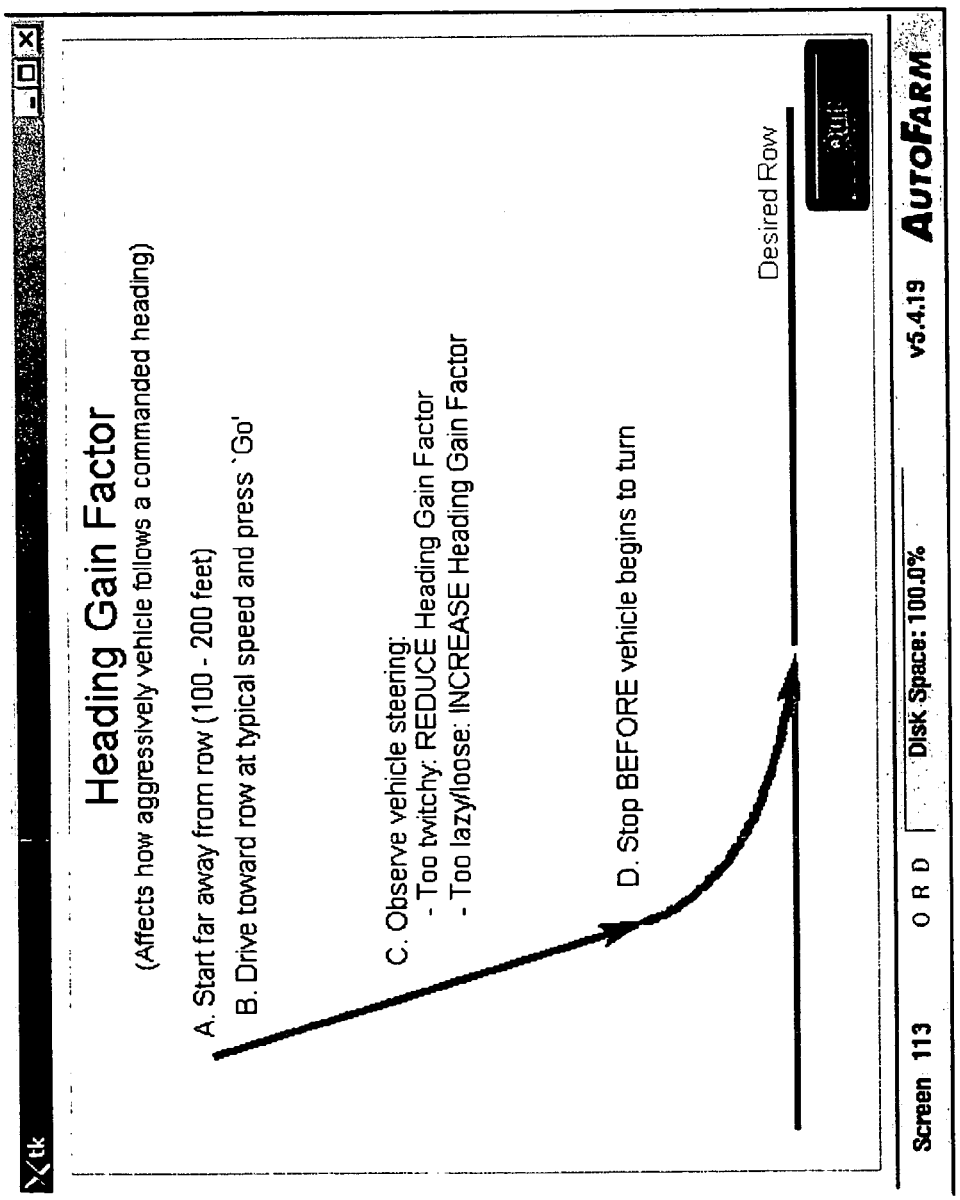
Figure 56:
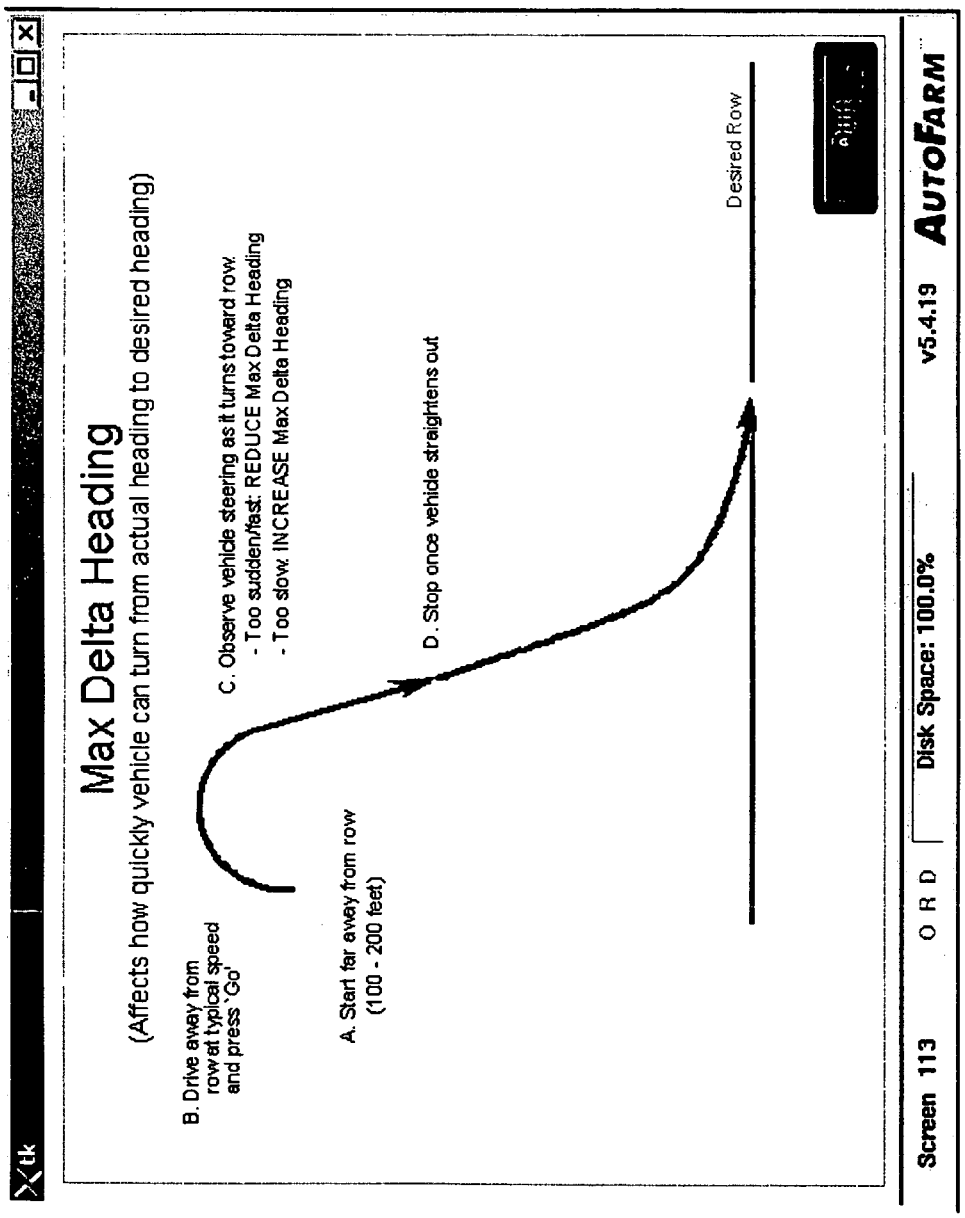
Figure 57:
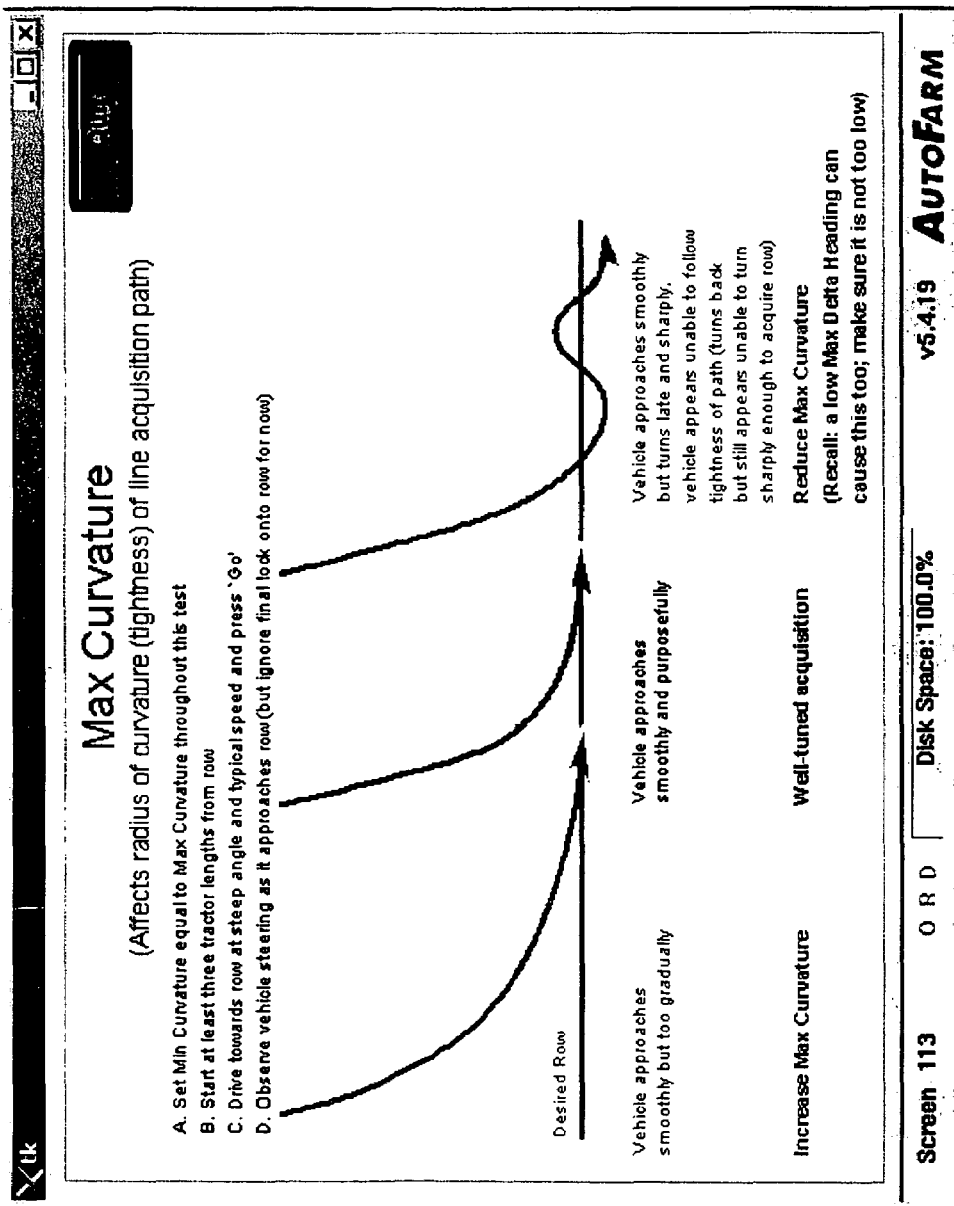
Figure 58:
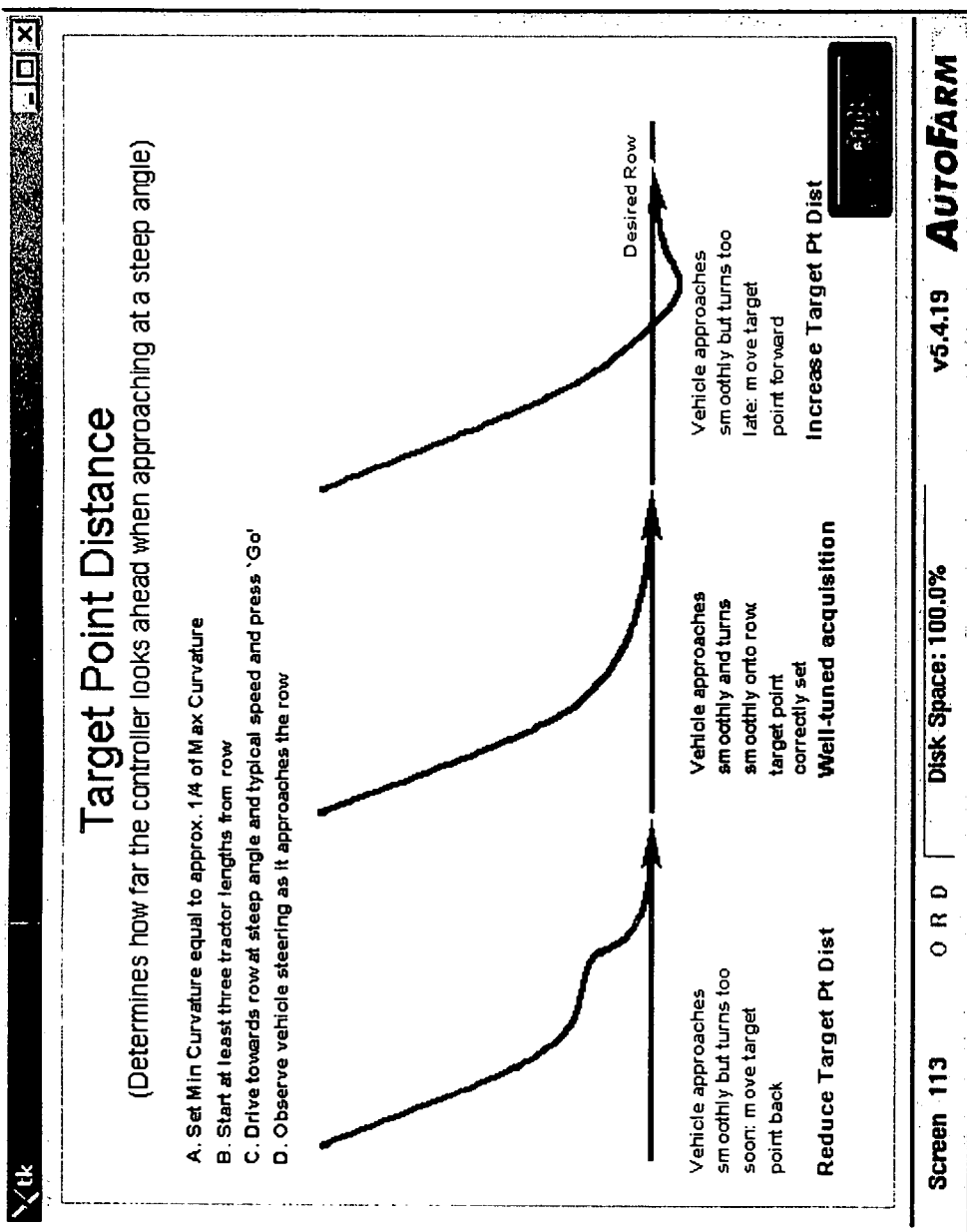
Figure 59:
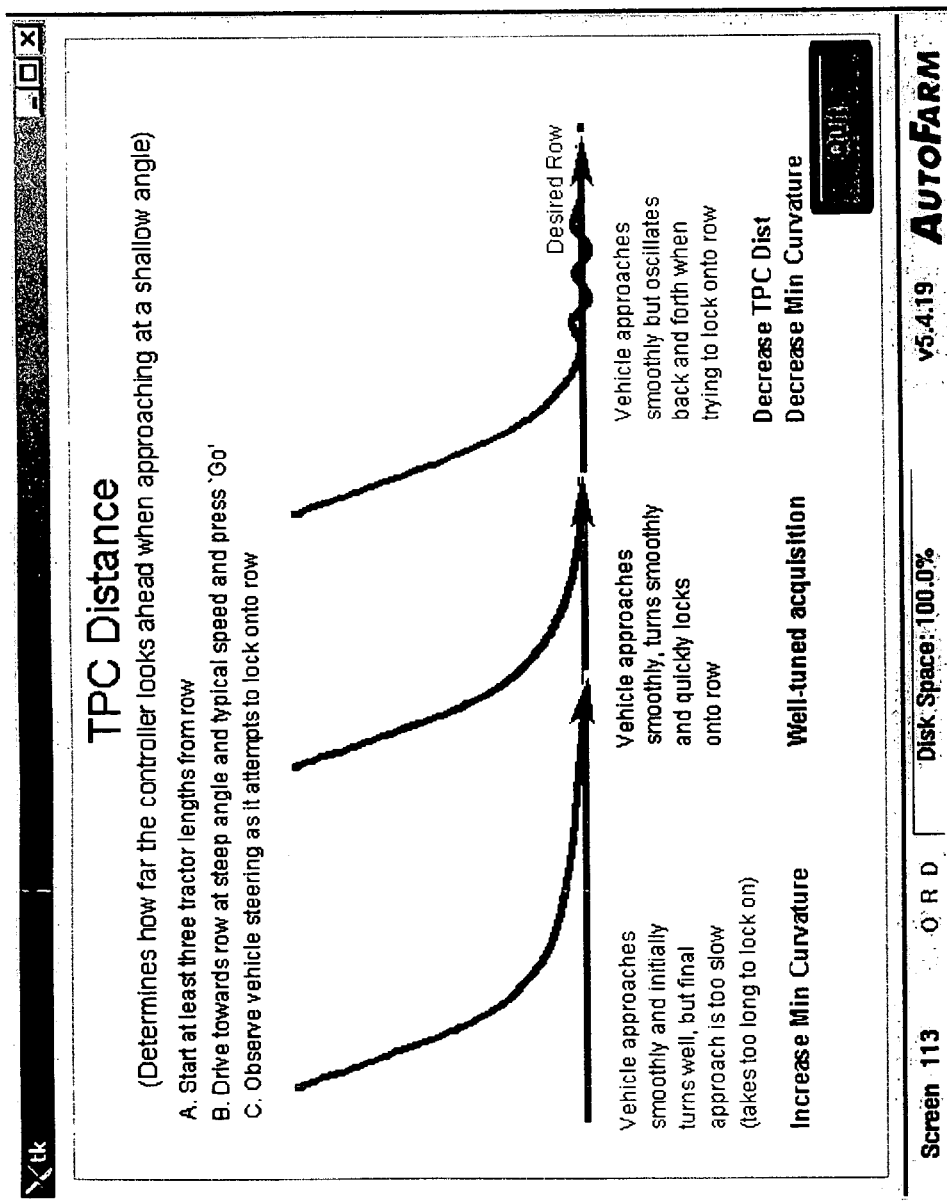
Figure 60:
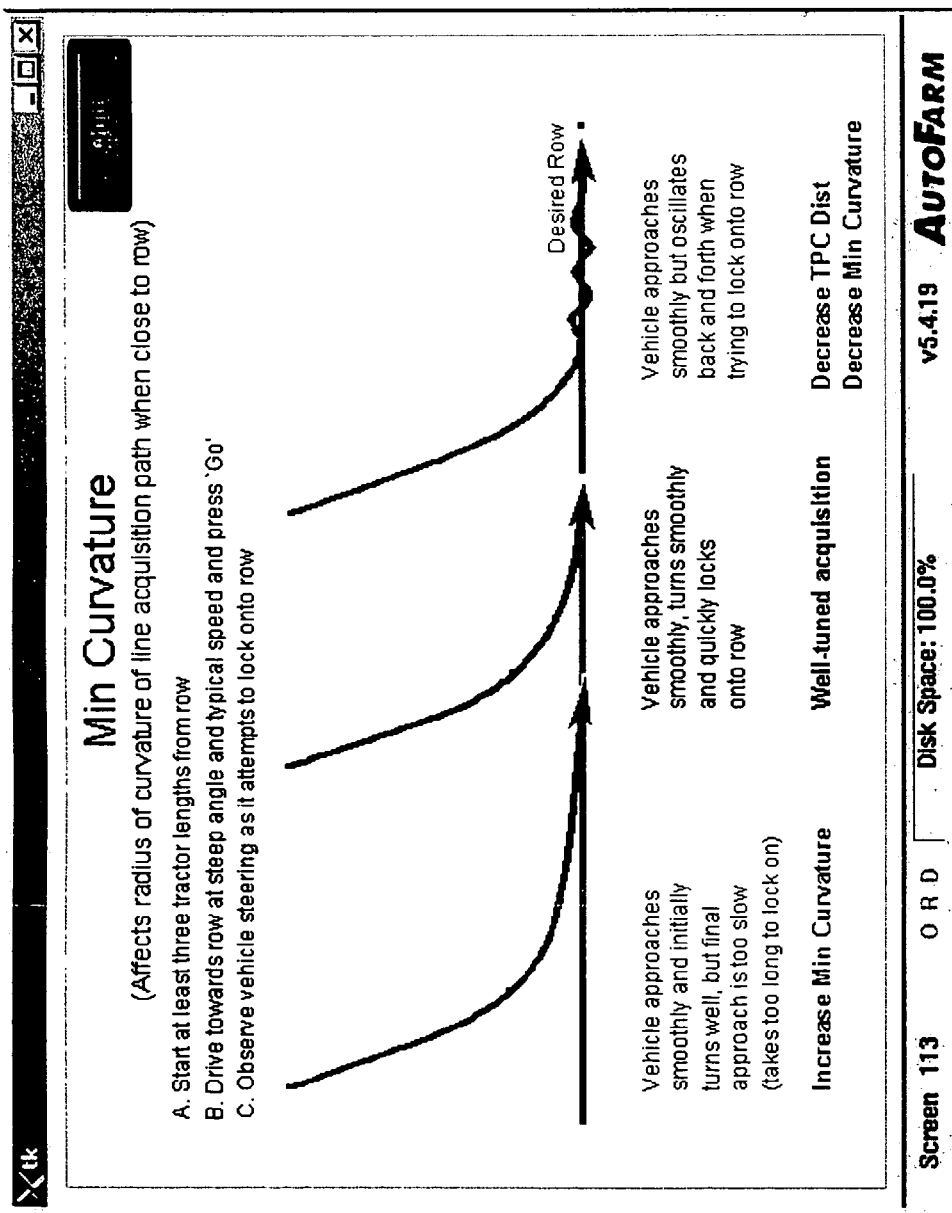

The line acquisition gains are tuned using the interactive screen shown in FIG. 53. The user can drive away from a pre-programmed row and engage the steering system by pressing the GO button. By observing how well the vehicle acquires the row, the user can adjust the six gains on the screen to improve performance.

The "?" button adjacent to each line acquisition control gain provides a help menu that explains how to tune the gain. These menus could alternatively appear as a line acquisition gain tuning tutorial. A general help screen is shown in FIG. 54. The six screens describing the six specific gain tuning techniques are shown in FIGS. 55-60.

This is not the only way to perform the line acquisition gain tuning. Other techniques, including automated techniques, are possible and are well understood in the art.

Once the user is satisfied with the line acquisition response, the user can "Accept Parameters," at which point the system will guide the user to the next step of the calibration. In the preferred embodiment, this is actually the last step of the calibration, so the calibration wizard displays a screen describing that calibration and tuning are now complete, and the user is able to operate the system normally.

Hydraulically-Steered Tracked Tractor

The calibration steps used to calibrate the steering of a hydraulically-steered tracked tractor are identical or similar to the steps used to calibrate the steering of a wheeled tractor, as described below:

Step 1: System Test

The System Test is only a minor modification to the System Test described above for a wheeled vehicle.

Step 2: GPS Master Antenna Location Entry

The GPS Master Antenna Location Entry is identical to the GPS Master Antenna Location Entry described above for a wheeled vehicle.

Step 3: GPS Multi-Antenna Self-Calibration

The GPS Multi-Antenna Self-Calibration is identical to the GPS Multi-Antenna Self-Calibration described above for a wheeled vehicle.

Step 4: Pressure Transducer Calibration

The Pressure Transducer Calibration is only a minor modification to the Pressure Transducer Calibration described above for a wheeled vehicle.

Step 5: Steering Actuator Calibration

The Steering Actuator Calibration is only a minor modification to the Steering Actuator Calibration described above for a wheeled vehicle.

Step 6: Control System Gain Tuning—On-Path

Step 7: Control System Gain Tuning—Line Acquisition

The Control System Gain Tuning steps (both On-Path and Line Acquisition) are only a minor modification to the Control System Gain Tuning steps described above for a wheeled vehicle.

Electronically-Steered Tracked Tractor

The calibration steps used to calibrate the steering of an electronically-steered tracked tractor are mostly identical or similar to the steps used to calibrate the steering of a wheeled tractor, as described below:

Step 1: System Test

The System Test is only a minor modification to the System Test described above for a wheeled vehicle.

Step 2: GPS Master Antenna Location Entry

The GPS Master Antenna Location Entry is identical to the GPS Master Antenna Location Entry described above for a wheeled vehicle.

Step 3: GPS Multi-Antenna Self-Calibration

The GPS Multi-Antenna Self-Calibration is identical to the GPS Multi-Antenna Self-Calibration described above for a wheeled vehicle.

Step 4: Electronic-Steering Wheel Sensor Calibration

The Electronic-Steering Wheel Sensor Calibration is somewhat different that the calibration for a wheeled vehicle. This calibration is described below.

Step 5: Steering Actuator Calibration

The Steering Actuator Calibration is only a minor modification to the Steering Actuator Calibration described above for a wheeled vehicle.

Step 6: Control System Gain Tuning—On-Path

Step 7: Control System Gain Tuning—Line Acquisition

The Control System Gain Tuning steps (both On-Path and Line Acquisition) are only a minor modification to the Control System Gain Tuning steps described above for a wheeled vehicle.

Step 4—Wheel Sensor Calibration

For the example of a particular electronically-steered tracked tractor, the John Deere series 8000T or 9000T tractors, the steering wheel nominally sends three analog voltage signals to steering computer. These voltages indicate the position of the steering wheel in a redundant manner (i.e., any one voltage is sufficient to determine the position of the steering wheel, but three are used so that the computer can reliably sense a failure in one of the signals).

One way to steer the vehicle is to program the computer on the vehicle to accept steering commands from a device other that the steering wheel and to use these commands to automatically steer the vehicle. This case is simple and well understood and fits well within the calibration wizard process described here.

For the case of an aftermarket steering control system installed on the vehicle, it is not always possible to send steering commands directly to the computer. This could be because the tractor computer is not programmed to accept such commands or because the vehicle manufacturer does not provide this interface to users.

When steering commands are not sent directly to the tractor computer through an auxiliary port, it is still possible to steer the vehicle by emulating the voltage signals sent by the steering wheel. When this approach is used, these voltages must be calibrated by the steering control system so that (1) the control system can sense the voltages and determine that the user is trying to turn the wheel (i.e., the steering wheel is not centered), and (2) the control system can generate new voltages to send to the steering computer that are consistent with each other and that represent the desired steering response of the vehicle.

Figure 61:
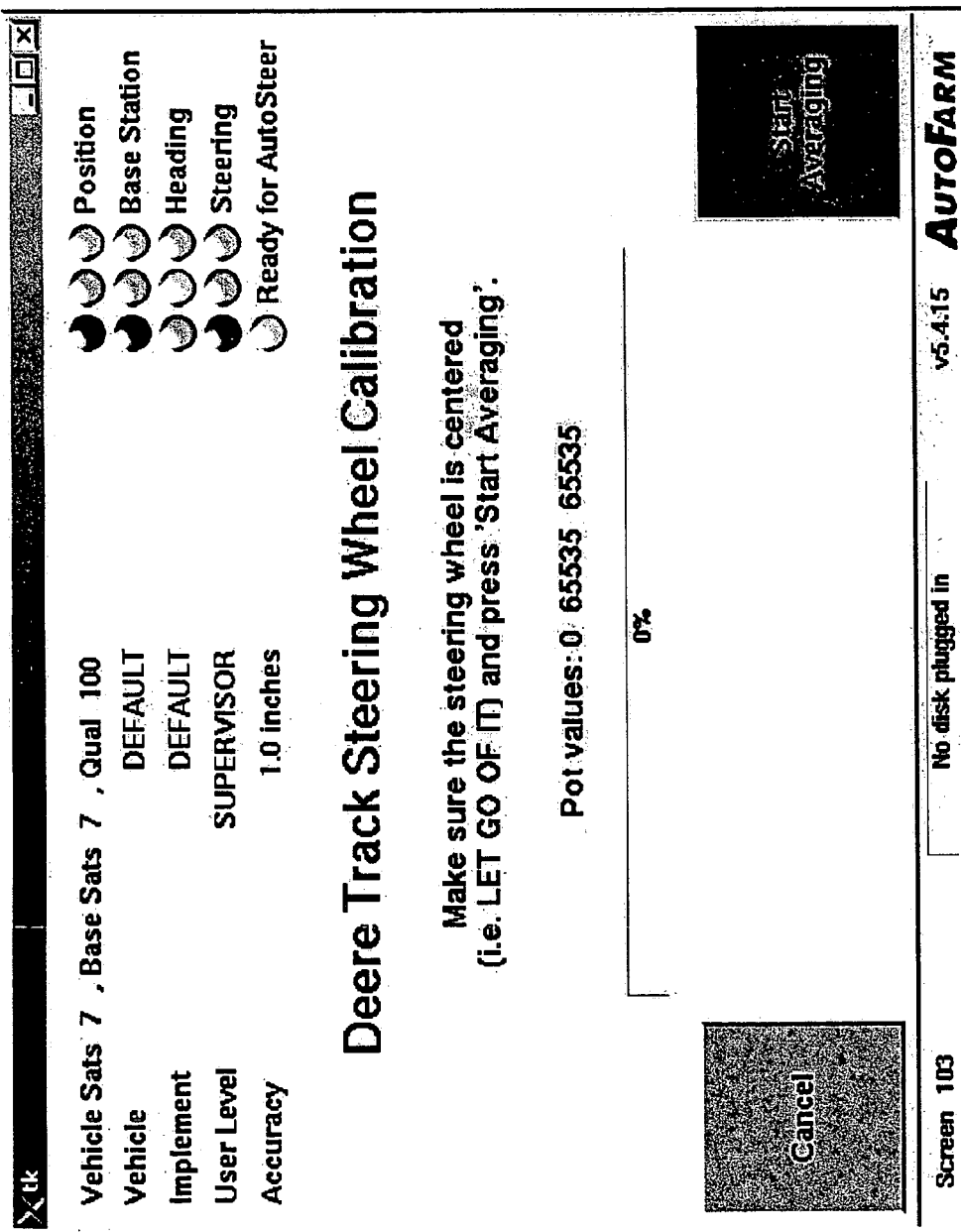
Figure 62:
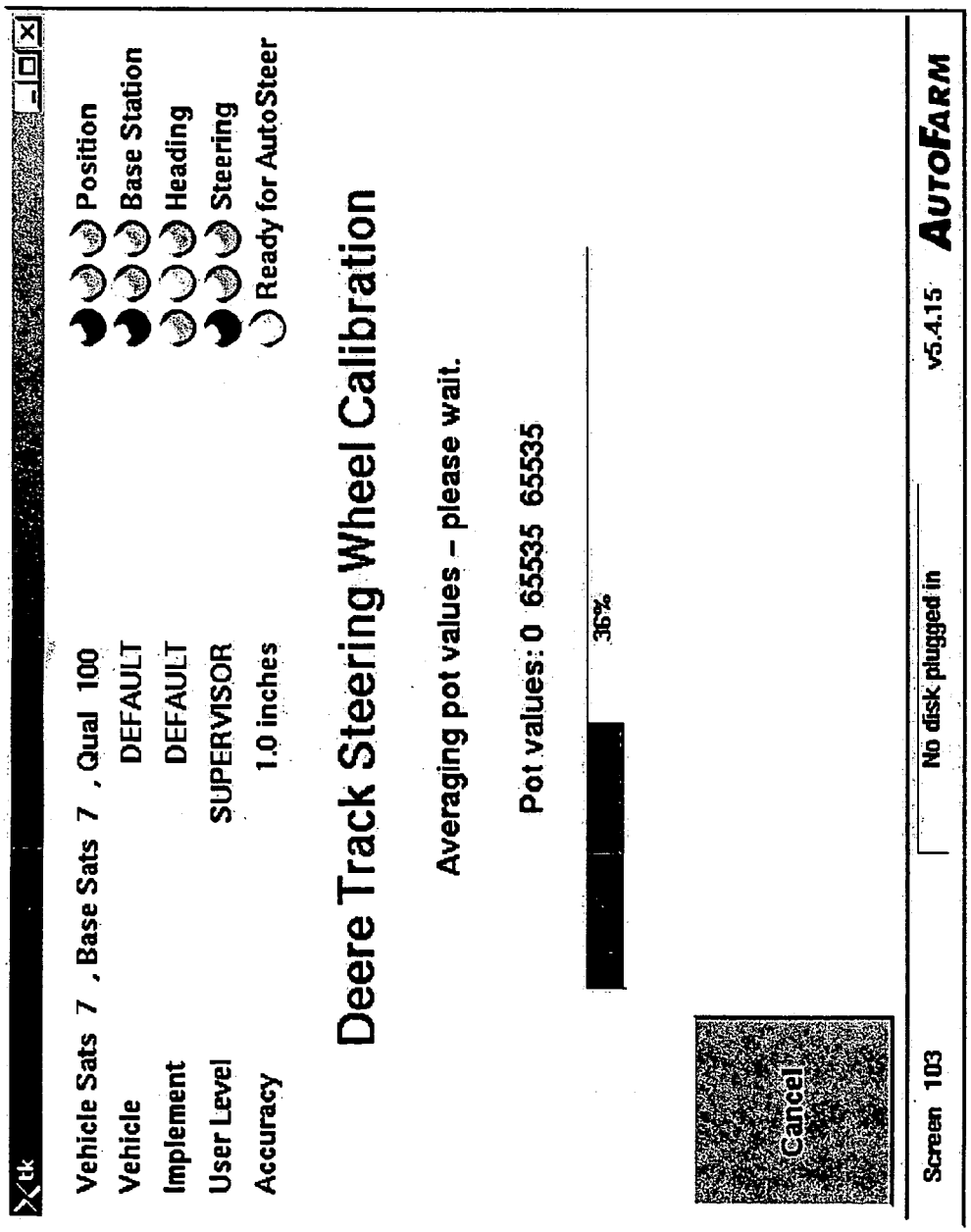
Figure 63:
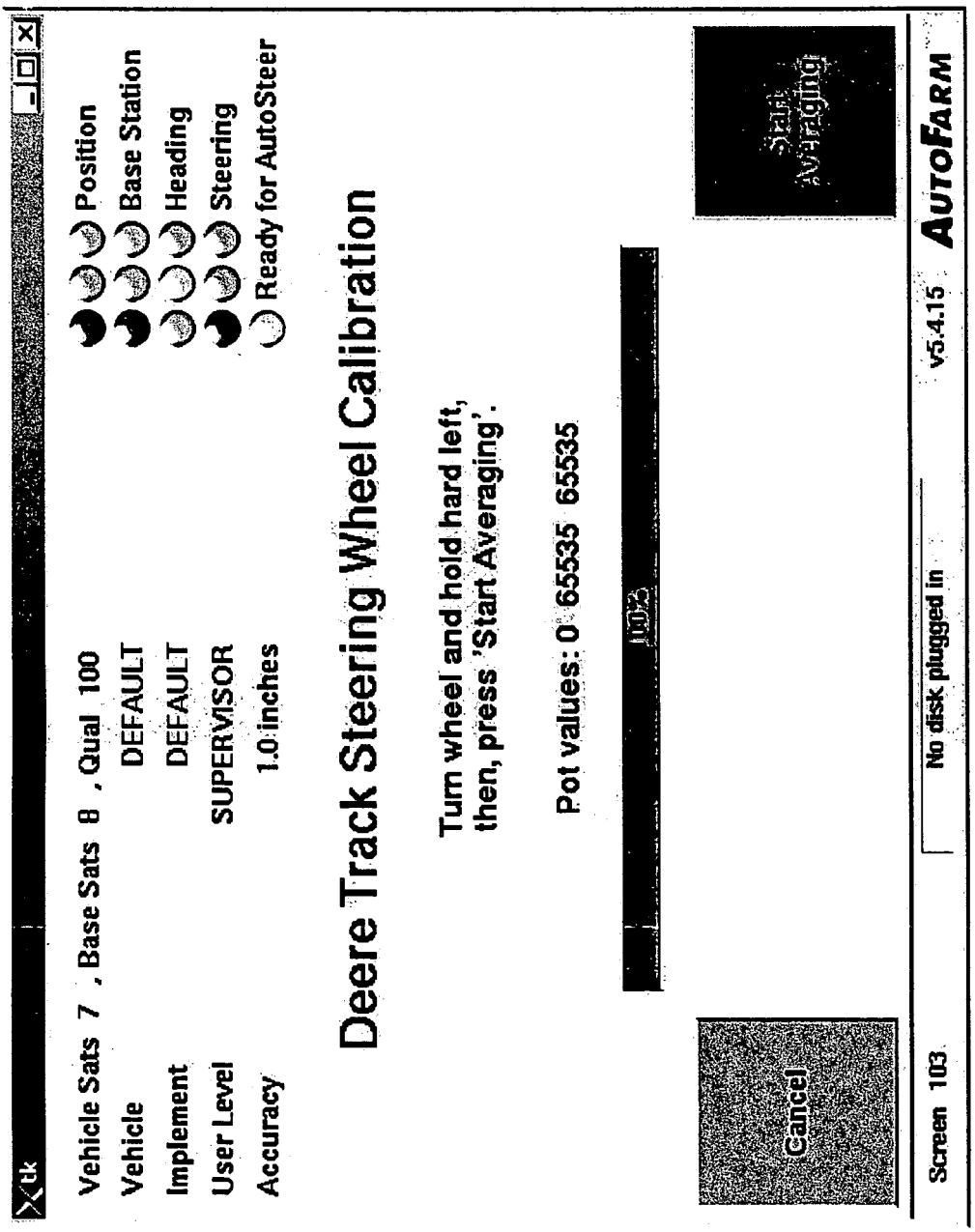
Figure 65:
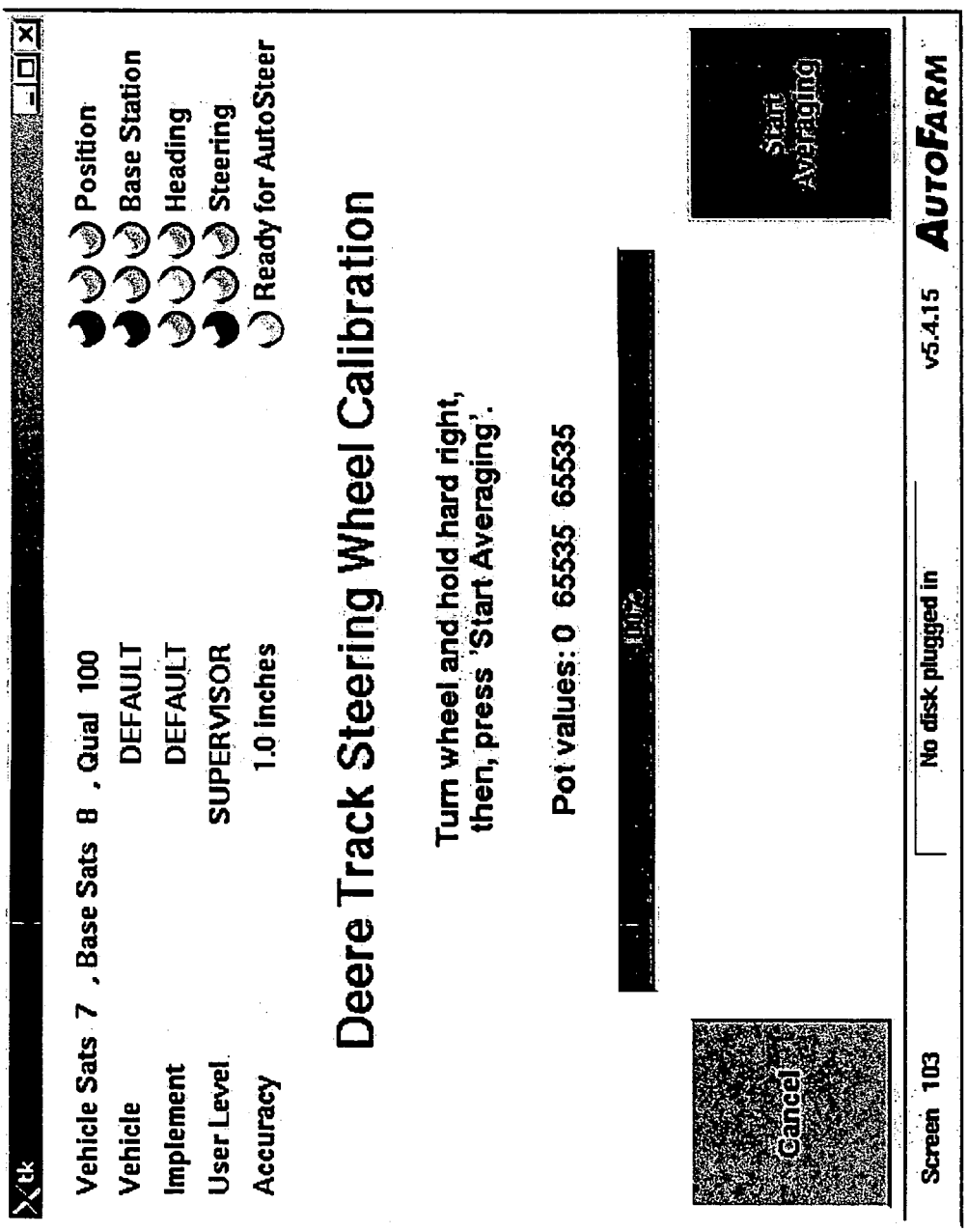
Figure 66:
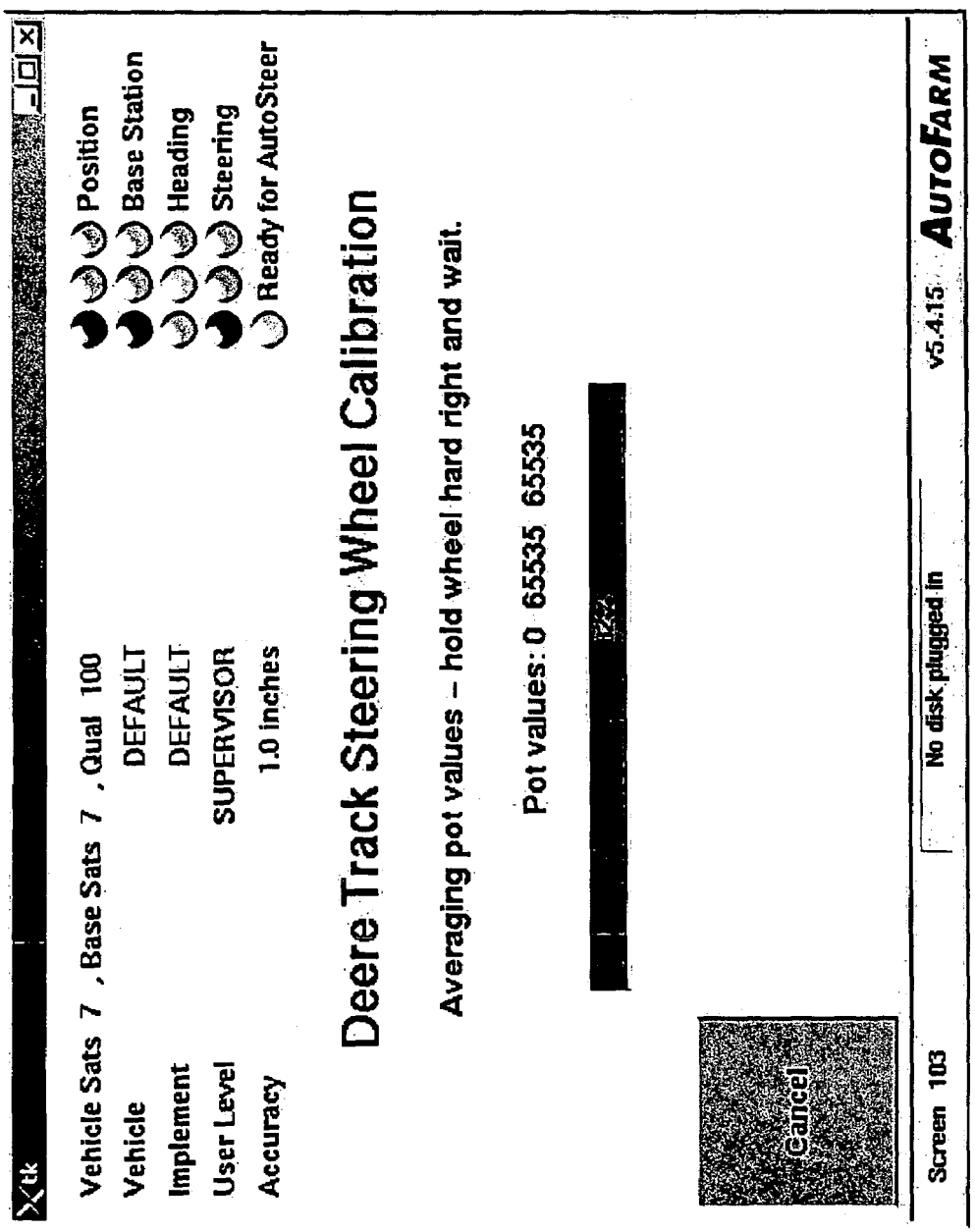
Figure 67:
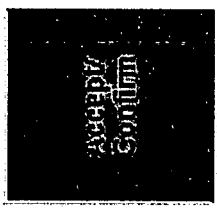

FIG. 61 through 66 show the steps used to perform this calibration. First, the user is instructed to center the steering wheel (FIG. 61). When the "Start Averaging" button is pressed, the system averages the sensed voltages for some period of time (for example, 10 seconds) (FIG. 62). These values are then recorded into memory, and the user is instructed to turn the steering wheel hard left (FIG. 63). When the "Start Averaging" button is pressed, the system averages the sensed voltages for some period of time (for example, 10 seconds) (FIG. 64). These values are then recorded into memory, and the user is instructed to turn the steering wheel hard right (FIG. 65). When the "Start Averaging" button is pressed, the system averages the sensed voltages for some period of time (for example, 10 seconds) (FIG. 66). Once all three positions have been averaged, if the values are valid, the user is given the option to accept the calibration (FIG. 67). If the calibration is accepted, the values are stored to semi-permanent memory, and the calibration continues to the next step. In the case of an error or if the user does not accept the calibration values, the calibration step is restarted by the calibration wizard.

Note that this step of the calibration must be performed before the steering control system is able to accurately steer the vehicle. Therefore, this step is required before any of the subsequent steps, which require the control system to actually steer the vehicle.

CAN Bus Steered Tracked Tractor

The calibration steps used to calibrate the steering of an CAN Bus steered tracked tractor are identical or similar to the steps used to calibrate the steering of a wheeled tractor, as described below:

Step 1: System Test

The System Test is only a minor modification to the System Test described above for a wheeled vehicle.

Step 2: GPS Master Antenna Location Entry

The GPS Master Antenna Location Entry is identical to the GPS Master Antenna Location Entry described above for a wheeled vehicle.

Step 3: GPS Multi-Antenna Self-Calibration

The GPS Multi-Antenna Self-Calibration is identical to the GPS Multi-Antenna Self-Calibration described above for a wheeled vehicle.

Step 4: Steering Actuator Calibration

The Steering Actuator Calibration is only a minor modification to the Steering Actuator Calibration described above for a wheeled vehicle.

Step 5: Control System Gain Tuning—On-Path

Step 6: Control System Gain Tuning—Line Acquisition

The Control System Gain Tuning steps (both On-Path and Line Acquisition) are only a minor modification to the Control System Gain Tuning steps described above for a wheeled vehicle.

Electronically-Steered Rubber Tire Gantry Crane

The calibration steps used to calibrate the steering of an electronically-steered rubber tire gantry crane are mostly identical or similar to the steps used to calibrate the steering of a wheeled tractor, as described below:

Step 1: System Test

The System Test is only a minor modification to the System Test described above for a wheeled vehicle.

Step 2: GPS Master Antenna Location Entry

The GPS Master Antenna Location Entry is identical to the GPS Master Antenna Location Entry described above for a wheeled vehicle.

Step 3: Wheel Base Measurement Entry

The Wheel Base Measurement Entry is identical to the Wheel Base Measurement Entry described above for a wheeled vehicle.

Step 4: GPS Multi-Antenna Self-Calibration

The GPS Multi-Antenna Self-Calibration is identical to the GPS Multi-Antenna Self-Calibration described above for a wheeled vehicle.

Step 5: Pressure Transducer Calibration

The Pressure Transducer Calibration is only a minor modification to the Pressure Transducer Calibration described above for a wheeled vehicle.

Step 6: Wheel Angle Sensor Calibration

The Wheel Angle Sensor Calibration is somewhat different that the calibration for an electronically-steered rubber tire gantry crane. This calibration is described below.

Step 7: Control System Gain Tuning—On-Path

Step 8: Control System Gain Tuning—Line Acquisition

The Control System Gain Tuning steps (both On-Path and Line Acquisition) are only a minor modification to the Control System Gain Tuning steps described above for a wheeled vehicle.

Step 6—Wheel Angle Sensor Calibration

The next step of the calibration for a rubber tire gantry is the Wheel Angle Sensor Calibration. The overall objective of this calibration is the same as for a wheeled tractor—to map raw wheel angle sensor measurements to a physical wheel angle, an average of the physical wheel angle of the left and right steering tire (it is known in the art that, in many cases, the left and right wheel of a front wheel steered vehicle are designed to be different), an articulation angle, or a characteristic of the physical motion of the vehicle (such as heading rate, or curvature). The preferred embodiment maps the wheel angle sensor to the curvature of the vehicle, where the curvature of the vehicle is the heading rate of the vehicle divided by the speed of the vehicle.

There are many ways to perform this calibration. For example, external measurements can be taken to map wheel angle sensor measurements to physical wheel angles. Also, automated procedures for calibrating a sensor using vehicle motion are described in other publications. Such procedures can readily be used within this calibration wizard. These are only provided as examples. There are many other ways to perform this calibration, all of which can be included into the calibration wizard.

The preferred technique for performing the wheel angle sensor calibration for a rubber tire gantry is to first guide the user through the process of recording the hard left and hard right values for the wheel angle sensor and then to determine the straight ahead value for the wheel angle sensor using vehicle motion. This is done instead of the circle driving method used for the wheeled tractor because, due to a lack of ground space, it is generally not possible to drive a gantry crane in circles.

Figure 68:
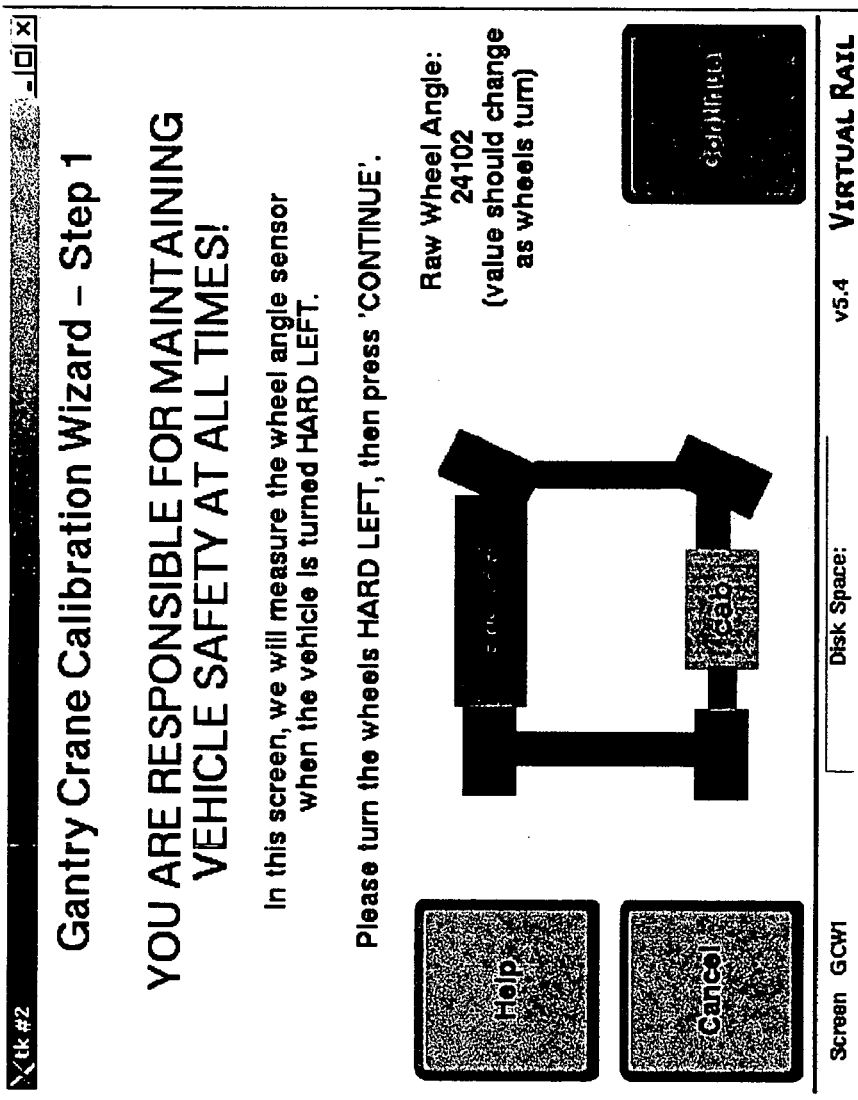
FIGS. 68-71 are illustrations of screen displays from a calibration wizard of an embodiment guiding a user through a wheel angle sensor calibration step for an electronically-steered rubber tire gantry crane.
Figure 69:
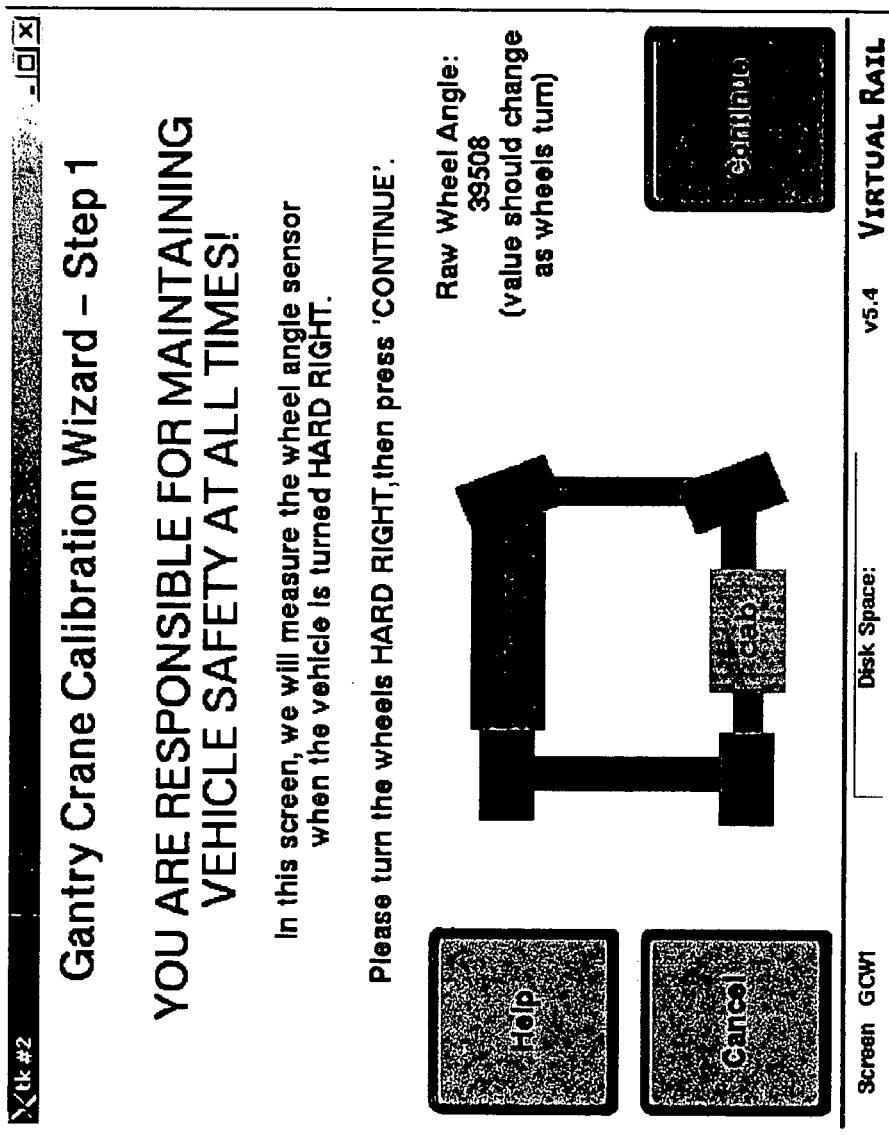

The calibration wizard first guides the user to turn the wheels to the hard left position and then press the "Continue" button (FIG. 68). The calibration wizard next guides the user to turn the wheels to the hard right position and then press the "Continue" button (FIG. 69). In both of these screens, the user can watch the measured wheel angle value as the wheels move. At the end of these two steps, an error can occur if both numbers are equal or if either number lies outside of the expected range for the sensor. If no error condition exists, the calibration wizard moves on to the next step.

Figure 70:
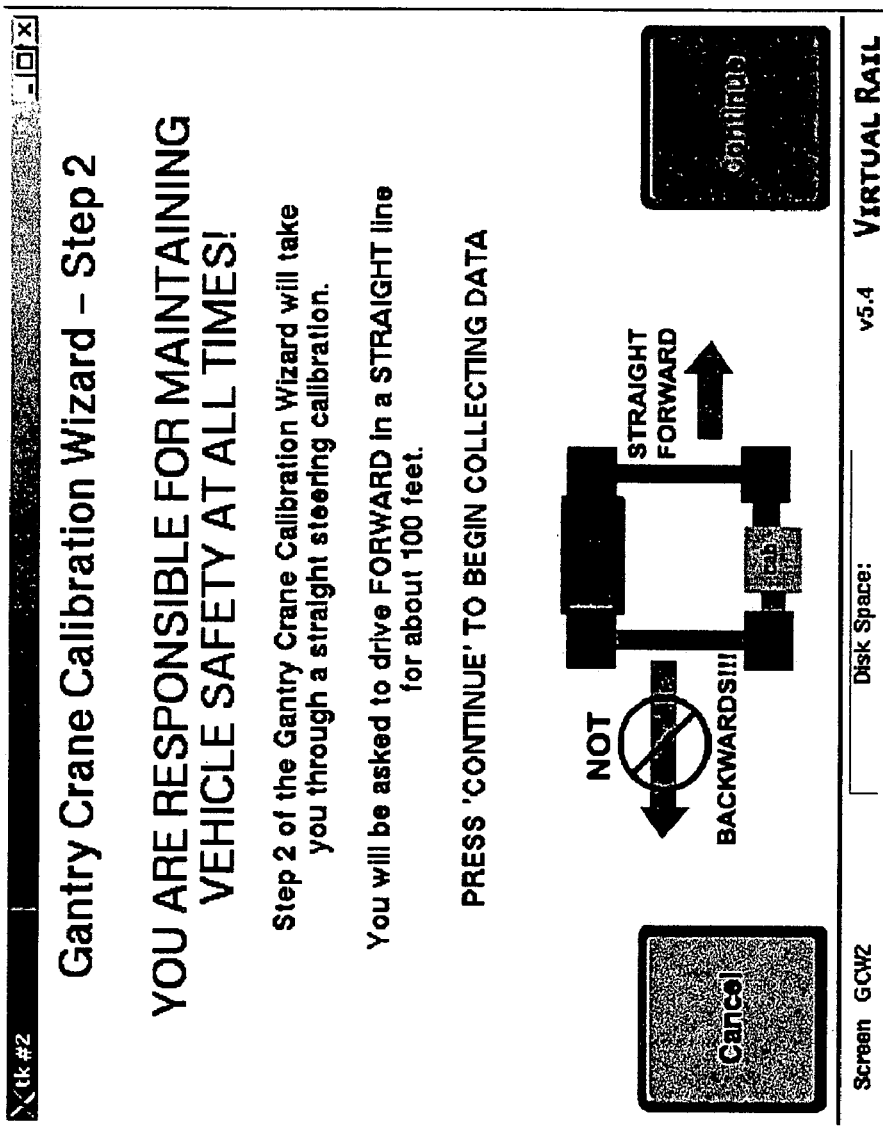
Figure 71:
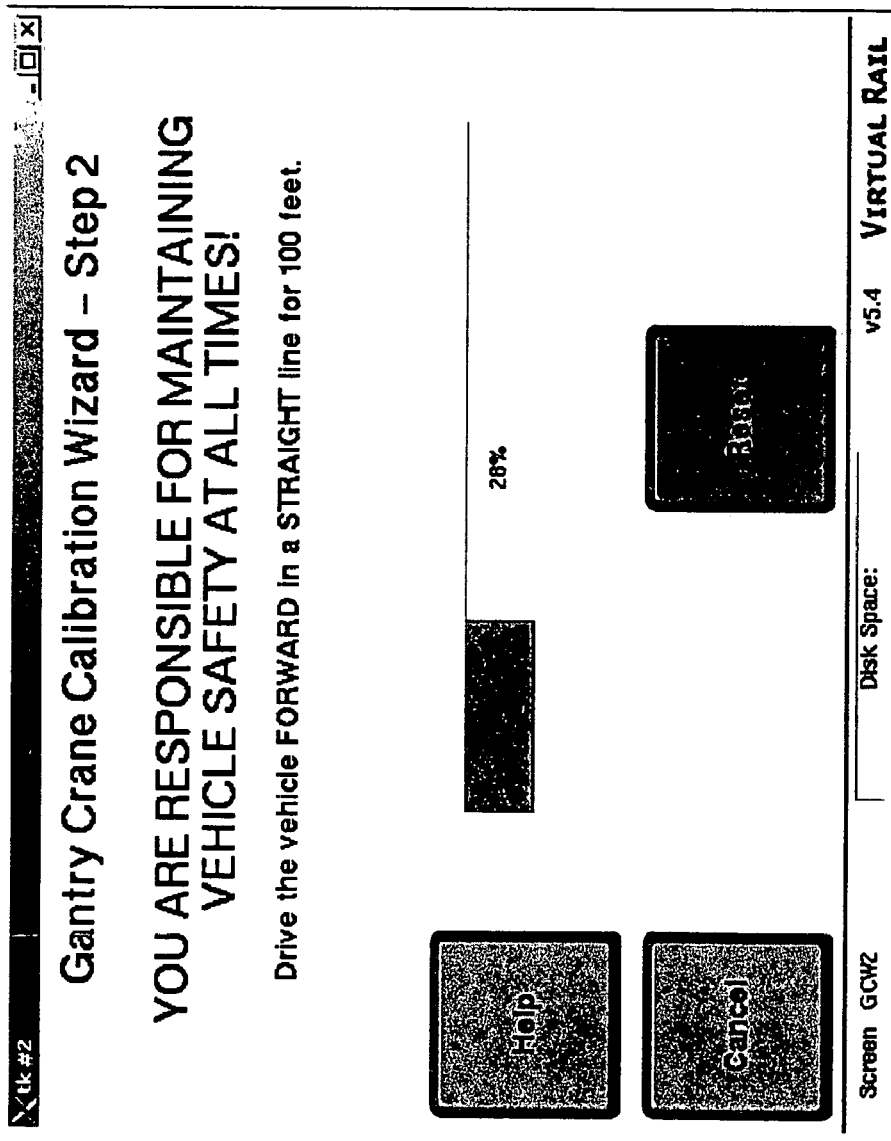

The next step of the calibration asks the user to drive the vehicle forward in a straight line for a pre-defined distance (for example, 100 feet) (FIG. 70). After pressing the "Continue" button, the system tracks how far the vehicle has traveled using GPS or some other sensor. The system indicates the distance traveled so far to the user (FIG. 71). Once the full distance has been traveled, the wheel angle measurement for the centered position is computed, e.g., by taking the average wheel angle measurement during the entire straight path.

If the line followed by the vehicle is not sufficiently straight, the user is warned, and the straight line driving step of the calibration is restarted. Straightness can be determined in one of many ways. For example, if the difference between the minimum and maximum vehicle heading during the pass exceeds a pre-defined amount (such as 5 degrees), the path may be considered to be not sufficiently straight.

The hard left, hard right, and straight ahead wheel angle sensor values are used to compute a best line to fit the data points collected (for example, using a polynomial fit—$2^{nd}$ order polynomial fit is the preferred embodiment). An error is reported to the user, and the calibration is restarted from the beginning if the center value does not lie between the hard left and hard right values.

During the straight line driving calibration process, a constant heading bias can also be calibrated (in addition to measuring the straight ahead wheel angle sensor value, as described above). The calibrated heading bias is the difference between the mean measured heading of the vehicle during the pass and the heading of the straight line driven by the vehicle. The heading of the line driven can be computed using the vehicle positions during the pass. For example, a straight line can be fitted through the data using a least-squares technique, or a straight line can be fitted through the first and last point on the line. This is important since a heading bias can have a significant negative impact on control system performance.

The forgoing detailed description has described only a few of the many possible implementations of the present invention. For this reason, this detailed description is intended by way of illustration, and not by way of limitation. It is only the following claims, including all equivalents, that are intended to define the scope of this invention.

What is claimed is:

1. A vehicle control system with user-guided calibration comprising:

a vehicle control system, wherein calibration of the vehicle control system comprises a plurality of calibration steps and wherein at least one of the plurality of calibration steps must be performed before at least one other of the plurality of calibration steps in order for the vehicle control system to control state trajectory of a vehicle within a degree of performance;

wherein the vehicle control system comprises:

an output device; and circuitry operative to provide an output, via the output device, that guides a user through the plurality of calibration steps in a particular order to ensure that the at least one of the plurality of calibration steps is performed before the at least one other of the plurality of calibration steps.

2. The vehicle control system of claim 1, wherein the vehicle control system controls a ground vehicle.

3. The vehicle control system of claim 2, wherein the ground vehicle comprises a farm vehicle.

4. The vehicle control system of claim 2, wherein the ground vehicle comprises a rubber tire gantry crane.

5. The vehicle control system of claim 1, wherein the vehicle control system controls an air vehicle.

6. The vehicle control system of claim 1, wherein the vehicle control system controls a water vehicle.

7. The vehicle control system of claim 1, wherein the circuitry comprises a processor executing computer-executable instructions.

8. The vehicle control system of claim 1, wherein the output device comprises a display device.

9. The vehicle control system of claim 8, wherein the circuitry is operative to display, on the display device, a graphical user interface.

10. the vehicle control system of claim 9 further comprising a second display device, wherein the first-mentioned display device is dedicated to displaying the graphical user interface.

11. The vehicle control system of claim 1, wherein the output device comprises an audio output device.

12. The vehicle control system of claim 1, wherein the output device comprises an audio output device but not a display device.

13. The vehicle control system of claim 1, wherein the output device comprises both a display device and an audio output device.

14. The vehicle control system of claim 1 further comprising an input device.

15. The vehicle control system of claim 14, wherein the input device is integrated with the output device.

16. The vehicle control system of claim 14, wherein the input device and the output device are separate devices.

17. The vehicle control system of claim 1, wherein the circuitry is operative to provide a help menu.

18. The vehicle control system of claim 1, wherein the circuitry is operative to confirm that one or more of the plurality of calibration steps was completed successfully.

19. The vehicle control system of claim 1, wherein the output provides instructions for physical installation of the vehicle control system.

20. The vehicle control system of claim 1, wherein the plurality of calibration steps comprises one or more of the following: (a) user entry of physical vehicle parameters; (b) user entry of a relative position of a GPS antenna on a vehicle comprising the vehicle control system relative to another point on the vehicle; (c) a self-survey of relative positions of two or more GPS antenna on the vehicle; (d) a calibration of on-board inertial measurement units; (e) a confirmation that manual steering is operational after installation of automatic steering components; (f) a confirmation that automatic steering is operational after installation of automatic steering components; (g) a calibration of a sensor to detect when the user is trying to turn a steering wheel; (h) a calibration of a wheel angle sensor; (i) a calibration of a wheel angle actuator; (j) tuning of gains based on wheel angle sensing and actuation; (k) tuning of gains based on GPS-based heading sensing and actuation; (l) tuning of gains based on gyro-based heading sensing and actuation; and (m) tuning of gains based on vehicle position sensing and actuation.

21. The vehicle control system of claim 1, wherein the plurality of calibration steps comprises wheel angle calibration, and wherein the wheel angle calibration is based on an interactive plot display.

22. The vehicle control system of claim 1, wherein the plurality of calibration steps comprises wheel angle calibration, and wherein the wheel angle calibration is based on vehicle motion.

23. The vehicle control system of claim 1, wherein the plurality of calibration steps comprises wheel actuator calibration, and wherein the wheel actuator calibration is based on an interactive plot display.

24. The vehicle control system of claim 1, wherein the plurality of calibration steps comprises wheel actuator calibration, and wherein the wheel actuator calibration is based on automatically-generated steering commands.

25. The vehicle control system of claim 1, wherein the plurality of calibration steps comprises gain tuning, and wherein the output shows control system performance to provide the user with feedback to tune at least some of a plurality of calibration parameters.

26. The vehicle control system of claim 1, wherein the plurality of calibration steps comprises gain tuning that is performed automatically based on vehicle motion and automatically-generated steering commands.

27. The vehicle control system of claim 1, wherein at least one of the plurality of calibration steps is performed automatically without user intervention.

28. The vehicle control system of claim 1, wherein the circuitry is operative to select a subset of calibration steps from a set of calibration steps based on an identified type of vehicle and guide a user through the subset of calibration steps.

29. The vehicle control system of claim 1, wherein the vehicle control system is calibrated using only sensors that are on a vehicle and that are used for vehicle control.

30. The vehicle control system of claim 1, wherein vehicle steering is calibrated using vehicle motion and vehicle motion sensors.

31. A vehicle control system with user-guided calibration comprising:
  a vehicle control system, wherein calibration of the vehicle control system comprises a plurality of calibration steps;
  wherein the vehicle control system comprises:
    an output device; and
    circuitry operative to provide an output, via the output device, that guides a user through the plurality of calibration steps, wherein the circuitry is operative to determine which of the calibration steps, if any, to present as a next calibration step based on whether a given calibration step is successful.

32. The vehicle control system of claim 31, wherein the circuitry is operative to skip a calibration step in response to an unsuccessful calibration step.

33. The vehicle control system of claim 31, wherein the circuitry is operative to skip a calibration step in response to a successful calibration step.

34. The vehicle control system of claim 31, wherein the circuitry is operative to return to a previous calibration step in response to an unsuccessful calibration step.

35. The vehicle control system of claim 31, wherein the circuitry is operative to repeat a calibration step in response to an unsuccessful calibration step.

36. The vehicle control system of claim 31, wherein the circuitry is operative to present a help menu in response to an unsuccessful calibration step.

37. The vehicle control system of claim 31, wherein the circuitry is operative to suspend calibration of the vehicle control system in response to an unsuccessful calibration step.

38. The vehicle control system of claim 31, wherein the vehicle control system controls a ground vehicle.

39. The vehicle control system of claim 38, wherein the ground vehicle comprises a farm vehicle.

40. The vehicle control system of claim 38, wherein the ground vehicle comprises a rubber tire gantry crane.

41. The vehicle control system of claim 31, wherein the vehicle control system controls an air vehicle.

42. The vehicle control system of claim 31, wherein the vehicle control system controls a water vehicle.

43. The vehicle control system of claim 31, wherein the circuitry comprises a processor executing computer-executable instructions.

44. The vehicle control system of claim 31, wherein the output device comprises a display device.

45. The vehicle control system of claim 44, wherein the circuitry is operative to display, on the display device, a graphical user interface.

46. The vehicle control system of claim 45 further comprising a second display device, wherein the first-mentioned display device is dedicated to displaying the graphical user interface.

47. The vehicle control system of claim 31, wherein the output device comprises an audio output device.

48. The vehicle control system of claim 31, wherein the output device comprises an audio output device but not a display device.

49. The vehicle control system of claim 31, wherein the output device comprises both a display device and an audio output device.

50. The vehicle control system of claim 31 further comprising an input device.

51. The vehicle control system of claim 50, wherein the input device is integrated with the output device.

52. The vehicle control system of claim 50, wherein the input device and the output device are separate devices.

53. The vehicle control system of claim 31, wherein the circuitry is operative to provide a help menu.

54. The vehicle control system of claim 31, wherein the circuitry is operative to confirm that one or more of the plurality of calibration steps was completed successfully.

55. The vehicle control system of claim 31, wherein the output provides instructions for physical installation of the vehicle control system.

56. The vehicle control system of claim 31, wherein the plurality of calibration steps comprises one or more of the following: (a) user entry of physical vehicle parameters; (b) user entry of a relative position of a GPS antenna on a vehicle comprising the vehicle control system relative to another point on the vehicle; (c) a self-survey of relative positions of two or more GPS antenna on the vehicle; (d) a calibration of on-board inertial measurement units; (e) a confirmation that manual steering is operational after installation of automatic steering components; (f) a confirmation that automatic steering is operational after installation of automatic steering components; (g) a calibration of a sensor to detect when the user is trying to turn a steering wheel; (h) a calibration of a wheel angle sensor; (i) a calibration of a wheel angle actuator; (j) tuning of gains based on wheel angle sensing and actuation; (k) tuning of gains based on GPS-based heading sensing and actuation; (l) tuning of gains based on gyro-based heading sensing and actuation; and (m) tuning of gains based on vehicle position sensing and actuation.

57. The vehicle control system of claim 31, wherein the plurality of calibration steps comprises wheel angle calibration, and wherein the wheel angle calibration is based on an interactive plot display.

58. The vehicle control system of claim 31, wherein the plurality of calibration steps comprises wheel angle calibration, and wherein the wheel angle calibration is based on vehicle motion.

59. The vehicle control system of claim 31, wherein the plurality of calibration steps comprises wheel actuator calibration, and wherein the wheel actuator calibration is based on an interactive plot display.

60. The vehicle control system of claim 31, wherein the plurality of calibration steps comprises wheel actuator calibration, and wherein the wheel actuator calibration is based on automatically-generated steering commands.

61. The vehicle control system of claim 31, wherein the plurality of calibration steps comprises gain tuning, and wherein the output shows control system performance to provide the user with feedback to tune at least some of a plurality of calibration parameters.

62. The vehicle control system of claim 31, wherein the plurality of calibration steps comprises gain tuning that is performed automatically based on vehicle motion and automatically-generated steering commands.

63. The vehicle control system of claim 31, wherein at least one of the plurality of calibration steps is performed automatically without user intervention.

64. The vehicle control system of claim 31, wherein the circuitry is operative to select a subset of calibration steps from a set of calibration steps based on an identified type of vehicle and guide a user through the subset of calibration steps.

65. The vehicle control system of claim 31, wherein the vehicle control system is calibrated using only sensors that are on a vehicle and that are used for vehicle control.

66. The vehicle control system of claim 31, wherein vehicle steering is calibrated using vehicle motion and vehicle motion sensors.

67. A vehicle control system with user-guided calibration comprising:
a vehicle control system, wherein calibration of the vehicle control system comprises a plurality of calibration steps and wherein at least one of the plurality of calibration steps must be performed before at least one other of the plurality of calibration steps in order for the vehicle control system to control state trajectory of a vehicle within a degree of performance, wherein the plurality of calibration steps comprises a calibration of a sensor to detect when the user is trying to turn a steering wheel, a calibration of a wheel angle sensor, and a calibration of a wheel angle actuator;
wherein the vehicle control system comprises:
an output device; and
circuitry operative to provide an output, via the output device, that guides a user through the plurality of calibration steps in a particular order to ensure that the at least one of the plurality of calibration steps is performed before the at least one other of the plurality of calibration steps, wherein the circuitry is further operative to determine which of the calibration steps, if any, to present as a next calibration step based on whether a given calibration step is successful.

68. The vehicle control system of claim 67, wherein the plurality of calibration steps further comprises tuning of gains based on wheel angle sensing and actuation.

69. The vehicle control system of claim 67, wherein the plurality of calibration steps further comprises tuning of gains based on GPS-based heading sensing and actuation.

70. The vehicle control system of claim 67, wherein the plurality of calibration steps further comprises user entry of physical vehicle parameters.

71. The vehicle control system of claim 67, wherein the plurality of calibration steps further comprises a calibration of on-board inertial measurement units.

72. The vehicle control system of claim 1, wherein the vehicle control system comprises at least one sensor to determine a state of the vehicle and at least one component to change the state of the vehicle.

73. The vehicle control system of claim 31, wherein the vehicle control system comprises at least one sensor to determine a state of a vehicle and at least one component to change the state of the vehicle.

74. The vehicle control system of claim 67, wherein the vehicle control system comprises at least one sensor to determine a state of the vehicle and at least one component to change the state of the vehicle.

* * * * *